(12) United States Patent
Kodama et al.

(10) Patent No.: US 11,732,194 B2
(45) Date of Patent: Aug. 22, 2023

(54) CHOLESTERIC LIQUID CRYSTAL LAYER, LAMINATE, OPTICALLY ANISOTROPIC BODY, REFLECTIVE FILM, METHOD FOR PRODUCING CHOLESTERIC LIQUID CRYSTAL LAYER, ANTI-COUNTERFEIT MEDIUM, AND DETERMINATION METHOD

(71) Applicant: FUJIFILM Corporation, Tokyo (JP)

(72) Inventors: Keisuke Kodama, Minami-ashigara (JP); Mitsuyoshi Ichihashi, Minami-ashigara (JP); Shunya Katoh, Minami-ashigara (JP); Takeshi Nakamori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 436 days.

(21) Appl. No.: 17/028,823

(22) Filed: Sep. 22, 2020

(65) Prior Publication Data

US 2021/0116615 A1    Apr. 22, 2021

Related U.S. Application Data

(63) Continuation of application No. PCT/JP2019/004066, filed on Feb. 5, 2019.

(30) Foreign Application Priority Data

Mar. 23, 2018 (JP) .................................. 2018-057162
Aug. 31, 2018 (JP) .................................. 2018-163806
Dec. 27, 2018 (JP) .................................. 2018-245312

(51) Int. Cl.
*G02B 5/08* (2006.01)
*C09K 19/58* (2006.01)
(Continued)

(52) U.S. Cl.
CPC .......... *C09K 19/586* (2013.01); *B42D 25/328* (2014.10); *G02B 5/3016* (2013.01);
(Continued)

(58) Field of Classification Search
CPC .......... C09K 19/586; C09K 2019/2078; B42D 25/328; G02B 5/3016
See application file for complete search history.

(56) References Cited

U.S. PATENT DOCUMENTS 6,175,400 B1    1/2001   Duncan et al.
2003/0142256 A1 7/2003   Maeda et al.
(Continued)

FOREIGN PATENT DOCUMENTS

CN    101393361 A    3/2009
CN    101542331 A    9/2009
(Continued)

OTHER PUBLICATIONS

WO2017/030176A1 machine English translation (Year: 2017).*
(Continued)

*Primary Examiner* — Anne M Hines
(74) *Attorney, Agent, or Firm* — Birch, Stewart, Kolasch & Birch, LLP

(57) ABSTRACT

Provided are a cholesteric liquid crystal layer having an excellent reflection anisotropy, a low haze, and a high circular polarization degree of reflected light, and a method for producing the same. In addition, provided are a laminate, an optically anisotropic body, and a reflective film, each of which including the cholesteric liquid crystal layer. A cholesteric liquid crystal layer formed using a liquid crystal compound, in which, in at least one main plane out of a pair of main planes of the cholesteric liquid crystal layer, a direction of a molecular axis of the liquid crystal compound changes while continually rotating along at least one in-
(Continued)

plane direction, the molecular axis of the liquid crystal compound is tilted with respect to the main plane of the cholesteric liquid crystal layer, and an arrangement direction of bright portions and dark portions derived from the cholesteric liquid crystalline phase, as observed under a scanning electron microscope in a cross section perpendicular to the main plane, is tilted with respect to the main plane of the cholesteric liquid crystal layer.

22 Claims, 20 Drawing Sheets

(51) Int. Cl.
| | |
|---|---|
| *B42D 25/328* | (2014.01) |
| *G02B 5/30* | (2006.01) |
| *C09K 19/36* | (2006.01) |
| *G01N 21/21* | (2006.01) |
| *C09K 19/20* | (2006.01) |

(52) U.S. Cl.
CPC ...... *C09K 19/36* (2013.01); *C09K 2019/2078* (2013.01); *G01N 21/21* (2013.01); *G01N 2021/216* (2013.01); *G01N 2201/0683* (2013.01); *G02B 5/0841* (2013.01)

(56) References Cited

U.S. PATENT DOCUMENTS

| | | |
|---|---|---|
| 2006/0257586 A1 | 11/2006 | Umeya |
| 2010/0026450 A1 | 2/2010 | Hoshino et al. |
| 2010/0039595 A1 | 2/2010 | Hayashi et al. |
| 2012/0224126 A1 | 9/2012 | Chang et al. |
| 2015/0205182 A1 | 7/2015 | Leister |
| 2020/0081170 A1 | 3/2020 | Saitoh et al. |
| 2020/0271842 A1 | 8/2020 | Yoshida |

FOREIGN PATENT DOCUMENTS

| | | |
|---|---|---|
| CN | 110637240 A | 12/2019 |
| EP | 3 546 992 A1 | 10/2019 |
| JP | 10-213709 A | 8/1998 |
| JP | 2003-215342 A | 7/2003 |
| JP | 2006-64758 A | 3/2006 |
| JP | 2006-317656 A | 11/2006 |
| JP | 2013-545141 A | 12/2013 |
| WO | WO 94/16355 A1 | 7/1994 |
| WO | WO 2017/030176 A1 | 2/2017 |
| WO | WO 2018/096879 A1 | 5/2018 |
| WO | WO 2018/097007 A1 | 5/2018 |
| WO | WO 2018/212348 A1 | 11/2018 |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2019/004066, dated Oct. 8, 2020, with an English translation.

International Search Report (Form PCT/ISA/210) for International Application No. PCT/JP2019/004066, dated May 7, 2019.

Chinese Office Action and Search Report for corresponding Chinese Application No. 201980020980.2, dated Oct. 29, 2021, with an English translation.

Japanese Notice of Reasons for Refusal for corresponding Japanese Application No. 2020-507411, dated Oct. 26, 2021, with an English translation.

Extended European Search Report for European Application No. 19772351.3, dated May 6, 2021.

Gu Kaifa, "The Synthesis of Colorants for Color Display of the Smectic Liquid Crystal," Jun. 30, 2013, 67 pages total, with an English abstract.

Chinese Office Action and Search Report for corresponding Chinese Application No. 201980020980.2, dated Mar. 31, 2022, with an English translation.

Leaw et al., "Liquid crystal physical get formed by cholesteryl stearate for light scattering display material," Journal of Colloid and Interface Science, vol. 483, 2016, pp. 41-48, 8 pages total.

* cited by examiner

CHOLESTERIC LIQUID CRYSTAL LAYER, LAMINATE, OPTICALLY ANISOTROPIC BODY, REFLECTIVE FILM, METHOD FOR PRODUCING CHOLESTERIC LIQUID CRYSTAL LAYER, ANTI-COUNTERFEIT MEDIUM, AND DETERMINATION METHOD

CROSS-REFERENCE TO RELATED APPLICATIONS

This application is a Continuation of PCT International Application No. PCT/JP2019/004066 filed on Feb. 5, 2019, which claims priority under 35 U.S.C. § 119(a) to Japanese Patent Application No. 2018-057162, filed on Mar. 23, 2018, Japanese Patent Application No. 2018-163806, filed on Aug. 31, 2018 and, Japanese Patent Application No. 2018-245312, filed on Dec. 27, 2018. Each of the above applications is hereby expressly incorporated by reference, in its entirety, into the present application.

BACKGROUND OF THE INVENTION

1. Field of the Invention

The present invention relates to a cholesteric liquid crystal layer, a laminate, an optically anisotropic body, a reflective film, a method for producing a cholesteric liquid crystal layer, an anti-counterfeit medium, and a determination method.

2. Description of the Related Art

A cholesteric liquid crystal layer is known as a layer having properties of selectively reflecting either dextrorotatory circularly polarized light or levorotatory circularly polarized light in a specific wavelength range. Therefore, such a layer in which the cholesteric liquid crystalline phase is fixed has been developed for various applications, and for example, it is used as a projected image display member (for example, a reflection element) such as a projection screen.

In addition, recently, attempts have been made to impart reflection anisotropy to a cholesteric liquid crystal layer (JP2006-317656A). In a case where the cholesteric liquid crystal layer has reflection anisotropy, for example, in a case where light is incident from a normal direction of the cholesteric liquid crystal layer, the light is reflected in a direction different from the normal direction.

JP2006-317656A discloses an "anisotropic optical element having anisotropic optical properties with respect to a normal direction of an element plane, comprising a molecularly aligned cholesteric liquid crystal layer consisting of polymerizable liquid crystals showing cholesteric regularity and formed to have a flat layer plane, characterized in that a helical axis main direction defined as an average of helical axis directions of liquid crystal domains in the cholesteric liquid crystal layer is tilted by a predetermined angle with respect to the normal direction of the layer plane".

JP2006-317656A discloses, as a method for producing the anisotropic optical element, a procedure in which the temperature of a coating film including a liquid crystal compound and heated to a temperature equal to or higher than a first phase transition temperature (that is, a temperature at which the liquid crystal compound exhibits an isotropic phase) is lowered to a temperature equal to or lower than the first phase transition temperature in a state where a gas is blown to the coating film from a predetermined direction. The above-mentioned procedure results in a transition of the liquid crystal compound in the coating film from an isotropic phase to a cholesteric liquid crystalline phase, and an alignment such that the helical axis main direction of the liquid crystal domain in the coating film is tilted by a predetermined angle with respect to the normal direction of the film plane.

SUMMARY OF THE INVENTION

The present inventors produced and studied an element having a substrate and a cholesteric liquid crystal layer (reflective film) arranged on the substrate with reference to the production method described in JP2006-317656A, and then found that it is extremely difficult to adjust an angle of a liquid crystal domain in a coating film with respect to a normal direction of a film plane in a helical axis main direction. In other words, the present inventors found that, in the cholesteric liquid crystal layer obtained by the production method of JP2006-317656A, it is difficult to adjust the angle of a reflection surface derived from the cholesteric liquid crystalline phase (a plane which is orthogonal to a helical axis direction and in which liquid crystal molecules having the same azimuthal angle are present) with respect to a substrate surface, and the reflection anisotropy of the cholesteric liquid crystal layer does not satisfy the recent requirements. That is, it was clarified that it is necessary to further improve the reflection anisotropy of the cholesteric liquid crystal layer.

In addition, the cholesteric liquid crystal layer is required to have a high transparency (in other words, a low haze property) and a high circular polarization degree of reflected light reflected by the cholesteric liquid crystal layer.

Therefore, an object of the present invention is to provide a cholesteric liquid crystal layer having excellent reflection anisotropy, a low haze, and a high circular polarization degree of reflected light, and a method for producing the same.

Another object of the present invention is to provide a laminate, an optically anisotropic body, a reflective film, and an anti-counterfeit medium, each of which including the cholesteric liquid crystal layer, as well as a determination method using the anti-counterfeit medium.

As a result of intensive studies to achieve the foregoing objects, the present inventors have found that the foregoing objects can be achieved by a cholesteric liquid crystal layer in which a liquid crystal compound is aligned in a predetermined manner. The present invention has been completed based on these findings. In addition, the present inventors have also found a production method which is capable of forming the cholesteric liquid crystal layer.

That is, it has been found that the foregoing objects can be achieved by the following configuration.

[1] A cholesteric liquid crystal layer formed using a liquid crystal compound, in which, in at least one main plane out of a pair of main planes of the cholesteric liquid crystal layer, a direction of a molecular axis of the liquid crystal compound changes while continually rotating along at least one in-plane direction, the molecular axis of the liquid crystal compound is tilted with respect to the main plane of the cholesteric liquid crystal layer, and an arrangement direction of bright portions and dark portions derived from the cholesteric liquid crystalline phase, as observed under a scanning electron microscope in a cross section perpendicular to the main plane, is tilted with respect to the main plane of the cholesteric liquid crystal layer.

[2] The cholesteric liquid crystal layer according to [1],
in which, in both main planes of the cholesteric liquid crystal layer, the direction of the molecular axis of the liquid crystal compound changes while continually rotating along at least one in-plane direction.

[3] The cholesteric liquid crystal layer according to [1] or [2],
in which an average tilt angle formed by a line formed by the dark portion derived from the cholesteric liquid crystalline phase, as observed under a scanning electron microscope in a cross section perpendicular to the main plane, and one main plane of the cholesteric liquid crystal layer, and an average tilt angle formed by a line formed by the dark portion and the other main plane of the cholesteric liquid crystal layer are the same.

[4] The cholesteric liquid crystal layer according to any one of [1] to [3],
in which, in the main plane in which the direction of the molecular axis of the liquid crystal compound changes while continually rotating along at least one in-plane direction, a coefficient of variation of A is 0.6 or less in a case where a length by which the direction of the molecular axis of the liquid crystal compound rotates by 180° is defined as one period A.

[5] The cholesteric liquid crystal layer according to any one of [1] to [4],
in which there are a plurality of regions having different intervals between the lines formed by the bright portions derived from the cholesteric liquid crystalline phase, as observed under a scanning electron microscope in a cross section perpendicular to the main plane.

[6] The cholesteric liquid crystal layer according to any one of [1] to [5],
in which the cholesteric liquid crystal layer has, in at least one main plane thereof, two or more regions among which one direction along which the direction of the molecular axis of the liquid crystal compound changes while continuously rotating in the plane is different, and reflects light in different directions in the two or more regions.

[7] The cholesteric liquid crystal layer according to any one of [1] to [6],
in which the cholesteric liquid crystal layer has two or more regions having different pitches of helical axes derived from the cholesteric liquid crystalline phase, and
reflects light having different wavelengths in the two or more regions.

[8] A laminate comprising two or more cholesteric liquid crystal layers according to any one of [1] to [7], which are laminated,
in which at least two cholesteric liquid crystal layers among the two or more cholesteric liquid crystal layers have the same rotation direction of helical axes derived from the cholesteric liquid crystalline phase, and
bright portions and dark portions derived from the cholesteric liquid crystalline phase, as observed under a scanning electron microscope in a cross section perpendicular to the main plane, have the same tilt direction.

[9] A laminate comprising two or more cholesteric liquid crystal layers according to any one of [1] to [7], which are laminated,
in which any two cholesteric liquid crystal layers among the two or more cholesteric liquid crystal layers have opposite rotation directions of helical axes derived from the cholesteric liquid crystalline phase, and
bright portions and dark portions derived from the cholesteric liquid crystalline phase, as observed under a scanning electron microscope in a cross section perpendicular to the main plane, have opposite tilt directions.

[10] A laminate comprising:
two or more cholesteric liquid crystal layers according to any one of [1] to [7], which are laminated:
in which a liquid crystal layer, a rubbing alignment layer, or a photo alignment layer is provided between any cholesteric liquid crystal layers of two or more of the cholesteric liquid crystal layers.

[11] A laminate comprising:
a liquid crystal layer formed of a disk-like liquid crystal compound; and
the cholesteric liquid crystal layer according to any one of [1] to [7] arranged to be in contact with the liquid crystal layer,
in which a molecular axis of the disk-like liquid crystal compound is tilted with respect to a surface of the liquid crystal layer, on the surface of the liquid crystal layer on a side in contact with the cholesteric liquid crystal layer.

[12] The laminate according to [11],
in which the disk-like liquid crystal compound has an average tilt angle of molecular axes of 20 to 80°.

[13] The laminate according to [11] or [12],
in which the surface of the liquid crystal layer on the side in contact with the cholesteric liquid crystal layer has an azimuthal angle regulating force of less than 0.00020 $J/m^2$.

[14] A laminate comprising:
the cholesteric liquid crystal layer according to any one of [1] to [7], or the laminate according to any one of [8] to [13] having a cholesteric liquid crystal layer; and
an absorption layer that absorbs at least a part of light having a wavelength transmitting through the cholesteric liquid crystal layer.

[15] An optically anisotropic body consisting of:
the cholesteric liquid crystal layer according to any one of [1] to [7].

[16] A reflective film consisting of:
the cholesteric liquid crystal layer according to any one of [1] to [7].

[17] A method for producing the cholesteric liquid crystal layer according to any one of [1] to [7], comprising:
a step 1 of forming a liquid crystal layer in which a molecular axis of a disk-like liquid crystal compound is tilted with respect to a surface on at least one surface, using a composition including the disk-like liquid crystal compound; and
a step 2 of forming the cholesteric liquid crystal layer on the liquid crystal layer, using a liquid crystal composition including a liquid crystal compound.

[18] The method for producing a cholesteric liquid crystal layer according to [17],
in which the disk-like liquid crystal compound has an average tilt angle of 20 to 80°.

[19] The method for producing a cholesteric liquid crystal layer according to [17] or [18],
in which the surface of the liquid crystal layer on the side in contact with the cholesteric liquid crystal layer has an azimuthal angle regulating force of less than 0.00020 $J/m^2$.

[20] The method for producing a cholesteric liquid crystal layer according to any one of [17] to [19], further comprising, in the step 2:
a step 2-1 of forming a composition layer satisfying the following condition 1 or the following condition 2 on the liquid crystal layer; and
a step 2-2 of subjecting the liquid crystal compound in the composition layer to a cholesteric alignment treatment to form a cholesteric liquid crystal layer:

condition 1: at least a part of the liquid crystal compound in the composition layer is tilt-aligned with respect to a surface of the composition layer;

condition 2: the liquid crystal compound is aligned such that a tilt angle of the liquid crystal compound in the composition layer continuously changes along a thickness direction.

[21] The method for producing a cholesteric liquid crystal layer according to [20], in which the liquid crystal composition includes two or more chiral agents, at least one of the chiral agents is any chiral agent selected from the group consisting of a chiral agent X having a helical twisting power changed depending on irradiation with light and a chiral agent Y having a helical twisting power changed depending on a change of temperature, in a case where the liquid crystal composition includes the chiral agent X, a treatment for cholesterically aligning the liquid crystal compound in the step 2-2 is a light irradiation treatment, and in a case where the liquid crystal composition includes the chiral agent Y, a treatment for cholesterically aligning the liquid crystal compound in the step 2-2 is a cooling treatment or a heating treatment.

[22] The method for producing a cholesteric liquid crystal layer according to [20], in which the liquid crystal composition includes one chiral agent, the chiral agent is a chiral agent X having a helical twisting power changed depending on irradiation with light or a chiral agent Y having a helical twisting power changed depending on a change of temperature, in a case where the liquid crystal composition includes the chiral agent X, the treatment for cholesterically aligning the liquid crystal compound in the step 2-2 is the light irradiation treatment, and in a case where the liquid crystal composition includes the chiral agent Y, the treatment for cholesterically aligning the liquid crystal compound in the step 2-2 is the cooling treatment or the heating treatment.

[23] The method for producing a cholesteric liquid crystal layer according to [22], in which, in the composition layer, an absolute value of a weighted average helical twisting power of the chiral agent is 0.0 to 1.5 $\mu m^{-1}$.

[24] The method for producing a cholesteric liquid crystal layer according to [23], in which the absolute value of the weighted average helical twisting power is 0.0 to 0.5 $\mu m^{-1}$.

[25] The method for producing a cholesteric liquid crystal layer according to any one of [17] to [24], in which the liquid crystal composition further includes a surfactant.

[26] The method for producing a cholesteric liquid crystal layer according to any one of [20] to [25], further comprising:

a step 3 of carrying out a curing treatment for fixing a cholesteric alignment state at the time of the step 2-2 to form a cholesteric liquid crystal layer in which the cholesteric alignment state is fixed, or a curing treatment for fixing a cholesteric alignment state after the step 2-2 to form a cholesteric liquid crystal layer in which the cholesteric alignment state is fixed, in which the liquid crystal composition contains a polymerizable liquid crystal compound.

[27] The method for producing a cholesteric liquid crystal layer according to [26], in which the curing treatment is a light irradiation treatment.

[28] The method for producing a cholesteric liquid crystal layer according to any one of [17] to [27], in which the step 1 includes an alignment treatment step of applying at least one of rubbing alignment or photo alignment to a base material for forming a liquid crystal layer on a surface thereof, and in the alignment treatment step, the alignment treatment is carried out such that alignment directions are different in the plane.

[29] A method for producing a cholesteric liquid crystal layer, comprising:

laminating a cholesteric liquid crystal layer on the cholesteric liquid crystal layer according to any one of [1] to [7] or the cholesteric liquid crystal layer included in the laminate according to any one of [8] to [14].

[30] An anti-counterfeit medium comprising:

the cholesteric liquid crystal layer according to any one of [1] to [7] or the laminate according to any one of [8] to [14].

[31] A determination method for determining authenticity of an article using the anti-counterfeit medium according to [30], comprising:

detecting at least one of reflected light or transmitted light from at least one direction with respect to the anti-counterfeit medium to determine the authenticity of an article.

[32] The determination method according to [31], further comprising:

detecting an in-plane pattern of at least one of reflected light or transmitted light to determine the authenticity of an article.

[33] The determination method according to [31] or [32], further comprising:

observing at least one of reflected light or transmitted light from the anti-counterfeit medium through a circular polarization filter; and determining the authenticity of an article based on the change in the detection result depending on the presence or absence of a circular polarization filter or the difference in the type of the circular polarization filter.

According to the present invention, it is possible to provide a cholesteric liquid crystal layer having excellent reflection anisotropy, a low haze, and a high circular polarization degree of reflected light, and a method for producing the same.

In addition, according to the present invention, it is possible to provide a laminate, an optically anisotropic body, a reflective film, and an anti-counterfeit medium, each of which including the cholesteric liquid crystal layer, as well as a determination method using the anti-counterfeit medium.

DESCRIPTION OF THE PREFERRED EMBODIMENTS

Hereinafter, the present invention will be described in detail. In the present specification, the numerical range expressed by using "to" means a range including numerical values described before and after "to" as a lower limit value and an upper limit value, respectively.

In addition, in the present specification, the term "(meth)acrylate" is a notation expressing both acrylate and methacrylate, the term "(meth)acryloyl group" is a notation expressing both acryloyl group and methacryloyl group, and the term "(meth)acrylic" is a notation expressing both acrylic and methacrylic.

In the present specification, the term "same" includes an error range generally accepted in the technical field. In addition, in the present specification, the "same" regarding angles means that a difference from a strict angle is within a range of less than 5 degrees unless otherwise specified. The difference from a strict angle is preferably less than 4 degrees and more preferably less than 3 degrees.

[Cholesteric Liquid Crystal Layer]

Hereinafter, embodiments of the cholesteric liquid crystal layer according to the embodiment of the present invention will be described with reference to the drawings.

It is sufficient for the cholesteric liquid crystal layer according to the embodiment of the present invention that the optical properties of the cholesteric liquid crystalline phase are retained in the layer, and the liquid crystal compound in the layer may not exhibit liquid crystallinity.

First Embodiment

Figure 1:
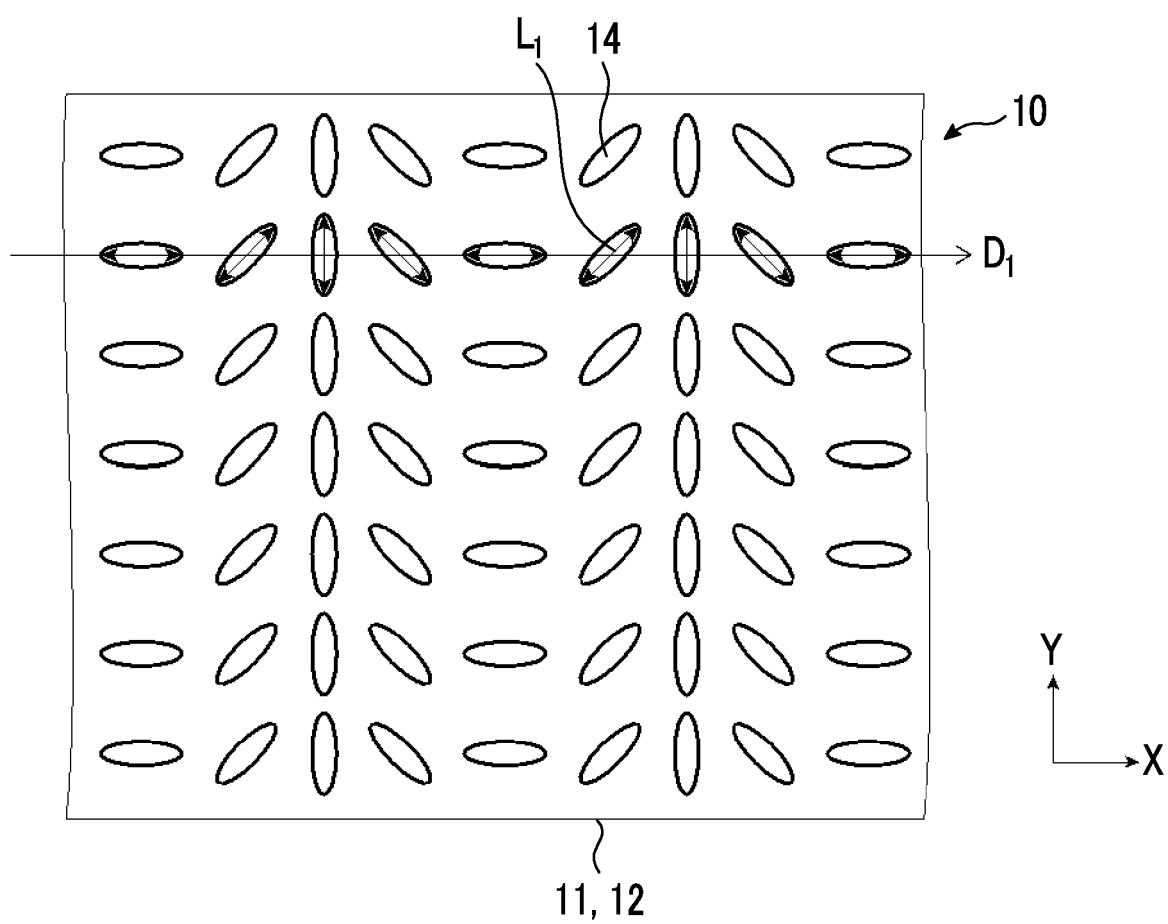
FIG. 1 is a schematic diagram of an X-Y plane of a cholesteric liquid crystal layer 10.
Figure 2:
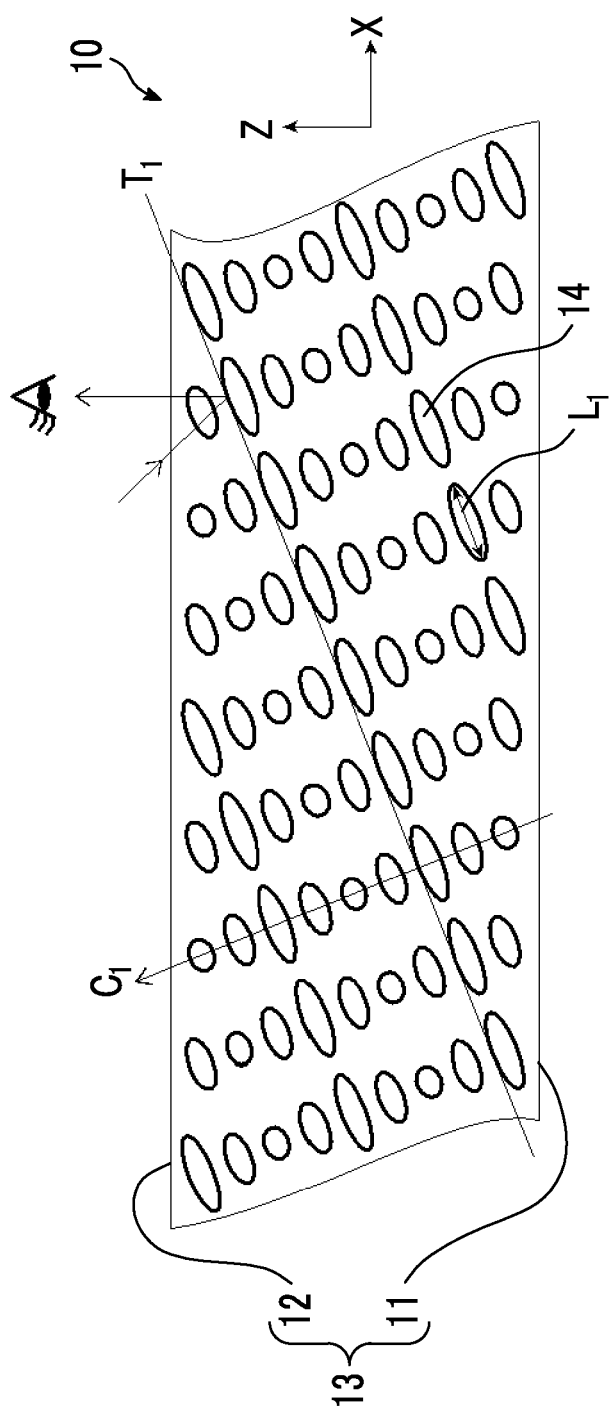
FIG. 2 is a schematic diagram of an X-Z plane of the cholesteric liquid crystal layer 10.

FIG. 1 and FIG. 2 show schematic diagrams conceptually showing an alignment state of a liquid crystal compound in the cholesteric liquid crystal layer according to the embodiment of the present invention.

FIG. 1 is a schematic diagram showing an in-plane alignment state of a liquid crystal compound in a main plane 11 and a main plane 12 of a cholesteric liquid crystal layer 10 having a pair of main planes 13 consisting of the main plane 11 and the main plane 12. In addition, FIG. 2 is a schematic cross-sectional diagram showing a state of a cholesteric liquid crystalline phase in a cross section perpendicular to the main plane 11 and the main plane 12. Hereinafter, the description will be given with the main plane 11 and the main plane 12 of the cholesteric liquid crystal layer 10 being an X-Y plane, and a cross section perpendicular to the X-Y plane being an X-Z plane. That is, FIG. 1 corresponds to a schematic diagram of the X-Y plane of the cholesteric liquid crystal layer 10, and FIG. 2 corresponds to a schematic diagram of the X-Z plane of the cholesteric liquid crystal layer 10.

It should be noted that, in the following, an aspect of a rod-like liquid crystal compound as the liquid crystal compound will be described as an example.

As shown in FIG. 1, in the X-Y plane of the cholesteric liquid crystal layer 10, a liquid crystal compound 14 is arranged along a plurality of parallel arrangement axes $D_1$ in the X-Y plane, and in the respective arrangement axes $D_1$, the direction of a molecular axis $L_1$ of the liquid crystal compound 14 changes while continuously rotating in one in-plane direction along the arrangement axis $D_1$. Here, for the sake of explanation, it is assumed that the arrangement axis $D_1$ faces an X direction. In addition, in a Y direction, the liquid crystal compounds 14 having the same direction of the molecular axis $L_1$ are aligned at equal intervals.

It should be noted that the phrase "the direction of the molecular axis $L_1$ of the liquid crystal compound 14 changes while continuously rotating in one in-plane direction along the arrangement axis $D_1$" means that an angle formed by the molecular axis $L_1$ of the liquid crystal compound 14 and the arrangement axis $D_1$ varies depending on the position in an arrangement axis $D_1$ direction, and therefore the angle formed by the molecular axis $L_1$ and the arrangement axis $D_1$ along the arrangement axis $D_1$ gradually changes from $\theta_1$ to $\theta_1+180°$ or $\theta_1-180°$. That is, in the plurality of liquid crystal compounds 14 arranged along the arrangement axis $D_1$, the molecular axis $L_1$ changes while rotating by a constant angle along the arrangement axis $D_1$ as shown in FIG. 1.

In addition, in the present specification, in a case where the liquid crystal compound 14 is a rod-like liquid crystal compound, the molecular axis $L_1$ of the liquid crystal compound 14 is intended to be a molecular long axis of the rod-like liquid crystal compound. On the other hand, in a case where the liquid crystal compound 14 is a disk-like liquid crystal compound, the molecular axis $L_1$ of the liquid crystal compound 14 is intended to be an axis parallel to the direction normal to the disc plane of the disk-like liquid crystal compound.

FIG. 2 shows a schematic diagram of an X-Z plane of the cholesteric liquid crystal layer 10.

In the X-Z plane of the cholesteric liquid crystal layer 10 shown in FIG. 2, the liquid crystal compound 14 is aligned with its molecular axis $L_1$ tilted with respect to the main plane 11 and the main plane 12 (X-Y plane).

The average angle (average tilt angle) $\theta_3$ formed by the molecular axis $L_1$ of the liquid crystal compound 14 and the main plane 11 and the main plane 12 (X-Y plane) is preferably 5 to 45° and more preferably 12 to 22°. The angle $\theta_3$ can be measured by observing the X-Z plane of the cholesteric liquid crystal layer 10 under a polarizing microscope. Above all, in the X-Z plane of the cholesteric liquid crystal layer 10, the liquid crystal compound 14 is preferably tilt-aligned in the same direction as the molecular axis $L_1$ with respect to the main plane 11 and the main plane 12 (X-Y plane).

The above-mentioned average angle is a value obtained by measuring angles formed by the molecular axis $L_1$ of the liquid crystal compound 14 and the main plane 11 and the main plane 12 at any 5 or more points in the observation of the cross section of the cholesteric liquid crystal layer with a polarizing microscope, and then arithmetically averaging the measured values.

As shown in FIG. 2, in the cholesteric liquid crystal layer 10, a helical axis $C_1$ derived from the cholesteric liquid crystalline phase is tilted at a predetermined angle with respect to the main plane 11 and the main plane 12 (X-Y plane), since the molecular axis $L_1$ has the above-described alignment. That is, a reflection surface $T_1$ of the cholesteric liquid crystal layer 10 (a plane which is orthogonal to the helical axis $C_1$ and in which a liquid crystal compound having the same azimuthal angle is present) is tilted in a substantially constant direction with respect to the main plane 11 and the main plane 12 (X-Y plane).

The "liquid crystal molecules having the same azimuthal angle" refers to liquid crystal molecules in which the alignment directions of the molecular axes are the same in a case of being projected on the main plane 11 and the main plane 12 (X-Y plane).

Figure 3:
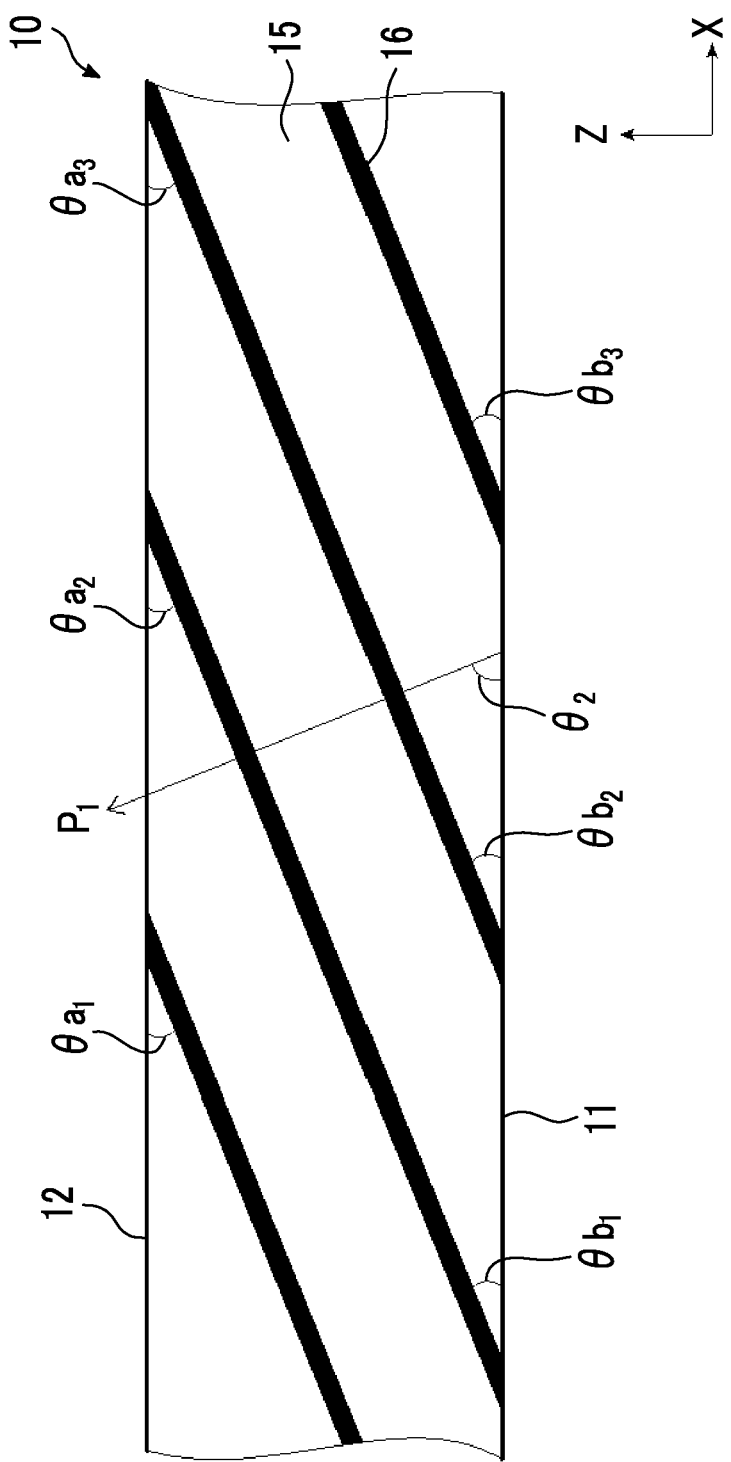
FIG. 3 is a schematic diagram in a case where the X-Z plane of the cholesteric liquid crystal layer 10 is observed under a scanning electron microscope (SEM).

In a case where the X-Z plane of the cholesteric liquid crystal layer 10 shown in FIG. 2 is observed by SEM, a striped pattern is observed in which an arrangement direction $P_1$ in which bright portions 15 and dark portions 16 are alternately arranged as shown in FIG. 3 is tilted at a predetermined angle $\theta_2$ with respect to the main plane 11 and the main plane 12 (X-Y plane). It should be noted that two bright portions 15 and two dark portions 16 in FIG. 3 correspond to one helical pitch (one helical turn).

In the cholesteric liquid crystal layer 10, the molecular axis $L_1$ of the liquid crystal compound 14 is substantially orthogonal to the arrangement direction $P_1$ in which the bright portions 15 and the dark portions 16 are alternately arranged.

The angle formed by the molecular axis $L_1$ and the arrangement direction $P_1$ is preferably 80 to 90° and more preferably 85 to 90°.

Hereinafter, the reason why various characteristics of the present invention are obtained will be described.

<Reflection Anisotropy>

Figure 4:
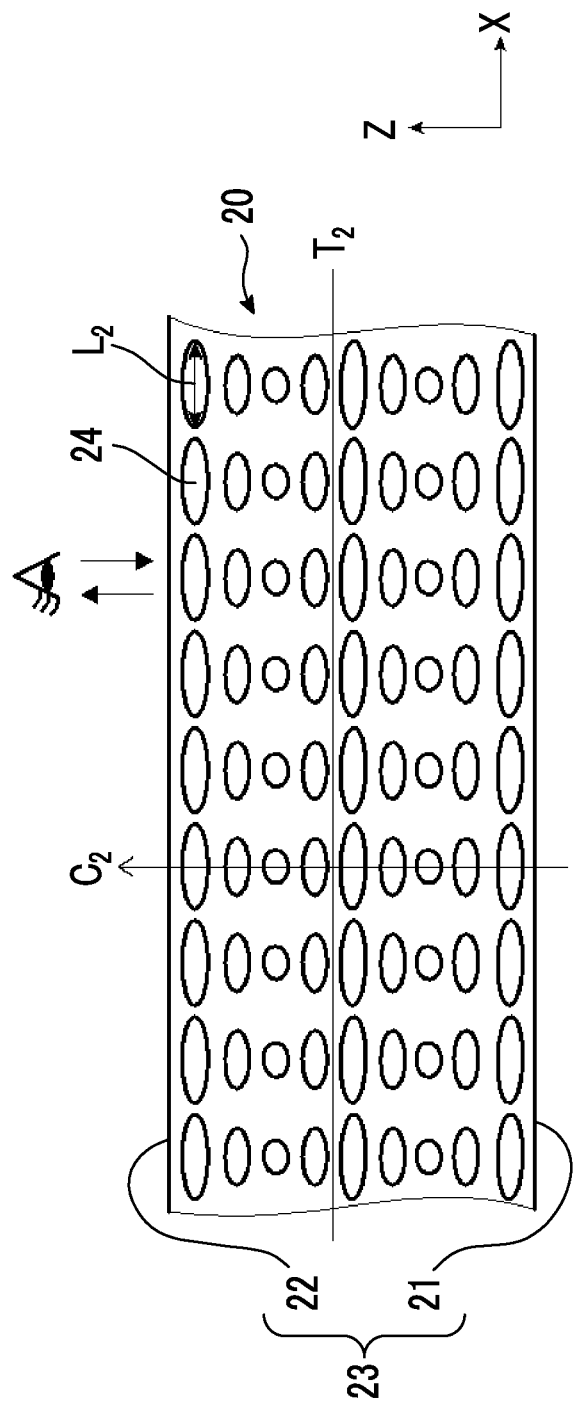
FIG. 4 is a schematic diagram of an X-Z plane of a conventional cholesteric liquid crystal layer 20.

Here, FIG. 4 shows a schematic cross-sectional diagram of a conventional cholesteric liquid crystal layer. Specifically, FIG. 4 shows a state of the cholesteric liquid crystal layer in a cross section perpendicular to a main plane 23 of a cholesteric liquid crystal layer 20 having a pair of main planes 23 consisting of a main plane 21 and a main plane 22. Hereinafter, the description will be given with the main plane 21 and the main plane 22 of the cholesteric liquid crystal layer 20 being an X-Y plane, and a cross section perpendicular to the X-Y plane being an X-Z plane. That is, FIG. 4 corresponds to a schematic diagram of the cholesteric liquid crystal layer 20 on the X-Z plane.

Figure 5:
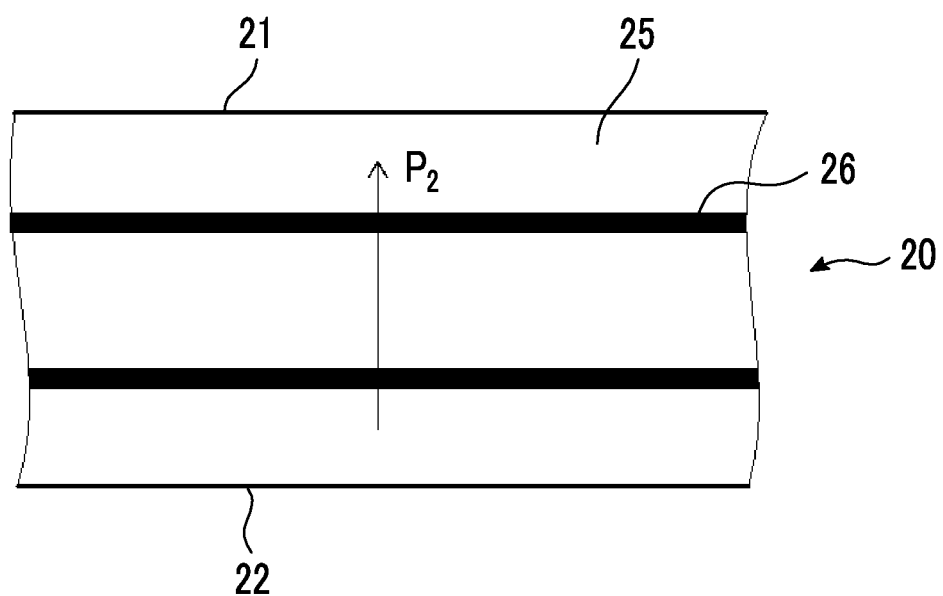
FIG. 5 is a schematic diagram in a case where the X-Z plane of the conventional cholesteric liquid crystal layer 20 is observed by SEM.

In the cholesteric liquid crystal layer 20 shown in FIG. 4, the helical axis $C_2$ derived from the cholesteric liquid crystalline phase is perpendicular to the main plane 21 and the main plane 22 (X-Y plane), and the reflection surface $T_2$ is a plane parallel to the main plane 21 and the main plane 22 (X-Y plane). In addition, the molecular axis $L_2$ of the liquid crystal compound 24 is not tilted with respect to the main plane 21 and the main plane 22 (X-Y plane). In other words, the molecular axis $L_2$ is parallel to the main plane 21 and the main plane 22 (X-Y plane). Therefore, as shown in FIG. 5, in a case where the X-Z plane of the cholesteric liquid crystal layer 20 is observed by SEM, an arrangement direction $P_2$ in which the bright portions 25 and the dark portions 26 are alternately arranged is perpendicular to the main plane 21 and the main plane 22 (X-Y plane).

Since the cholesteric liquid crystalline phase is specularly reflective, for example, in a case where light is incident on the cholesteric liquid crystal layer 20 in a normal direction, the light is reflected in the normal direction (see the arrow in FIG. 4). For this reason, in a case where the cholesteric liquid crystal layer 20 is applied to a projection screen or the like, in order for an observer in front of a projection screen to observe cholesteric reflected light of the image light projected from a light source (projector) onto the projection screen with good visibility, it is necessary to install the light source in the vicinity of the observer.

On the other hand, in the cholesteric liquid crystal layer 10 shown in FIG. 1 and FIG. 2, the reflection surface $T_1$ thereof is tilted in a predetermined direction with respect to the main plane 11 and the main plane 12 (X-Y plane), thus having reflected light anisotropy. For example, in a case where light is incident on the cholesteric liquid crystal layer 10 from an oblique direction, the light is reflected by the reflection surface $T_1$ in a normal direction of the main plane 11 and the main plane 12 (X-Y plane) (see the arrow in FIG. 2).

As a result, in a case where the cholesteric liquid crystal layer 10 is applied to a projection screen or the like, in order for an observer in front of a projection screen to observe cholesteric reflected light of the image light projected from a light source (projector) onto the projection screen with good visibility, it is not necessary to install the light source in the vicinity of the observer, and the light source can be installed at a desired position.

<Haze>

As described above, in the cholesteric liquid crystal layer 10, in the X-Z plane, the liquid crystal compound 14 is aligned with its molecular axis $L_1$ tilted with respect to the main plane 11 and the main plane 12 (X-Y plane), and in the main plane 11 and the main plane 12 (X-Y plane), the direction of the molecular axis $L_1$ of the liquid crystal compound 14 changes while continuously rotating in one in-plane direction along the arrangement axis $D_1$. With the above-mentioned configuration, the cholesteric liquid crystal layer 10 is presumed to have a high linearity in the bright-dark lines consisting of the bright portions and the dark portions derived from the cholesteric liquid crystalline phase observed by SEM in the X-Z plane, and as a result, the cholesteric liquid crystal layer 10 has a low haze and a high transparency.

Figure 6:
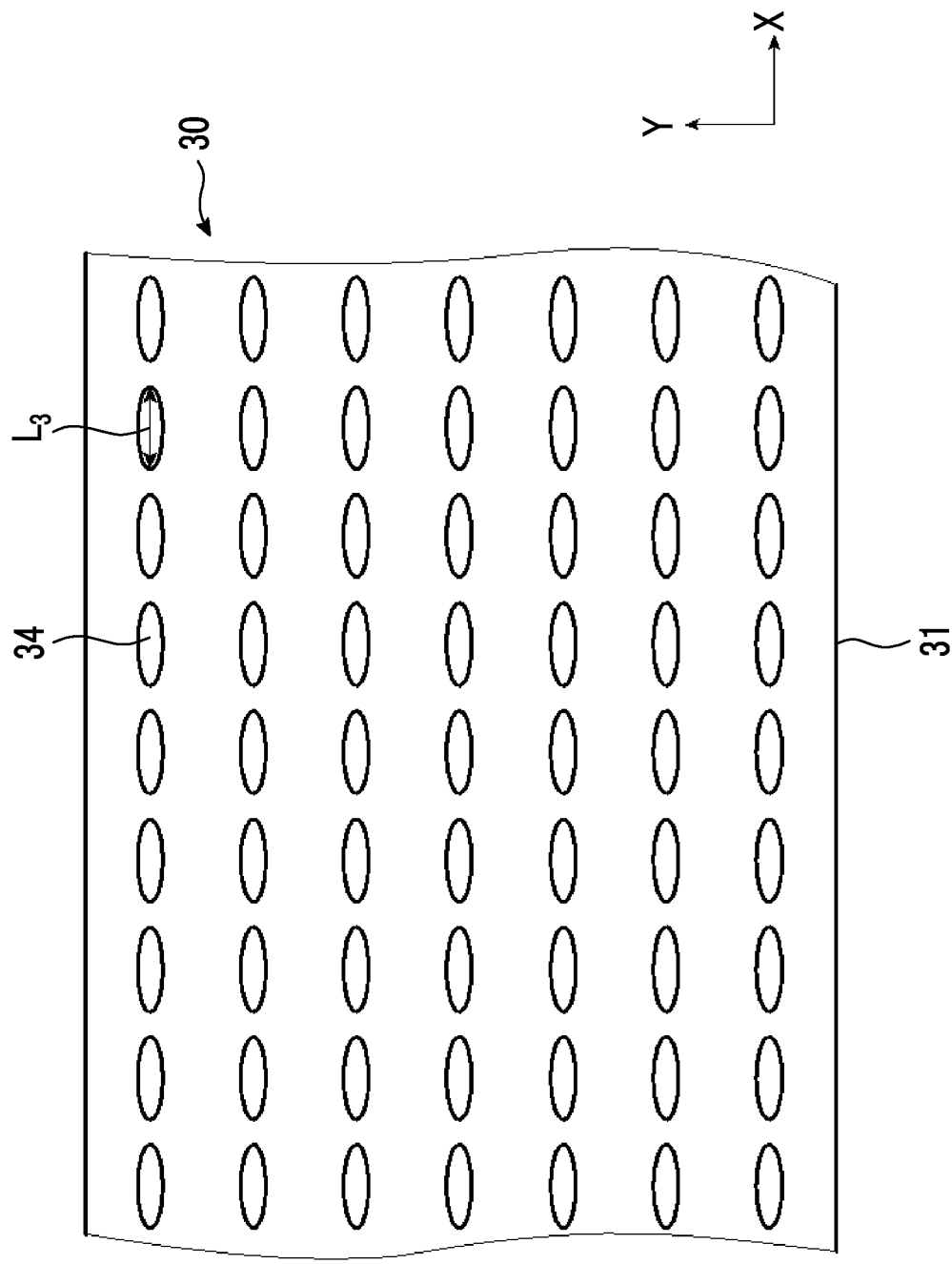
FIG. 6 is a schematic diagram of an X-Y plane of a cholesteric liquid crystal layer 30.

Here, as an example, FIG. 6 shows a schematic diagram of a main plane 31 of a cholesteric liquid crystal layer 30 having a pair of main planes 33 consisting of a main plane 31 and a main plane 32.

Hereinafter, the description will be given with the main plane 31 and the main plane 32 of the cholesteric liquid crystal layer 30 being an X-Y plane, and a cross section perpendicular to the X-Y plane being an X-Z plane.

As shown in FIG. 6, in the cholesteric liquid crystal layer 30, on the main plane 31, a molecular axis $L_3$ of a liquid crystal compound 34 is aligned so as to face a certain direction in the plane.

In addition, in the X-Z plane (not shown), the cholesteric liquid crystal layer 30 has the same alignment as in the X-Z plane of the cholesteric liquid crystal layer 10 shown in FIG. 1. That is, in the cholesteric liquid crystal layer 30, the liquid crystal compound 34 is aligned in a predetermined direction with the molecular axis $L_3$ tilted with respect to the main plane 31 and the main plane 32 (X-Y plane), and the helical axis derived from the cholesteric liquid crystalline phase is tilted at a predetermined angle with respect to the main plane 31 and the main plane 32 (X-Y plane).

Figure 7:
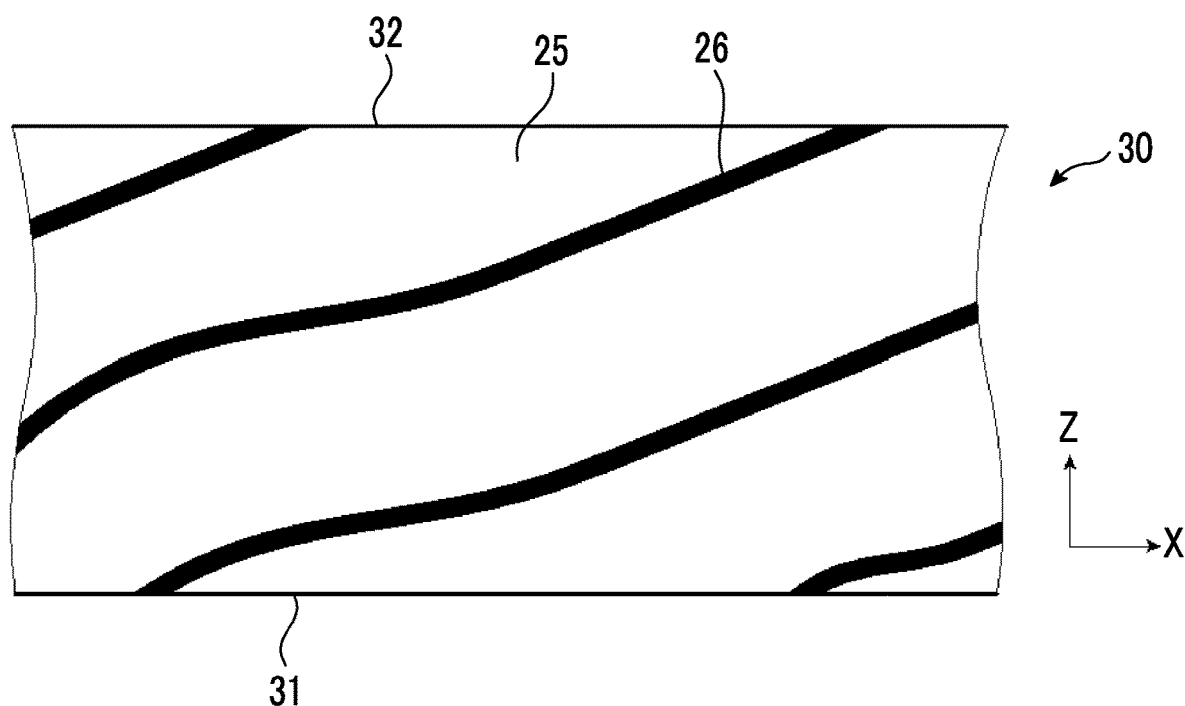
FIG. 7 is a schematic diagram in a case where the X-Z plane of the conventional cholesteric liquid crystal layer 30 is observed by SEM.

As shown in FIG. 7, the bright-dark lines consisting of the bright portions and the dark portions derived from the cholesteric liquid crystalline phase observed by SEM on the X-Z plane of the cholesteric liquid crystal layer 30 are likely to have a wave-like structure on the side of the main plane 31 having the molecular alignment shown in FIG. 6. As a result, the haze of the cholesteric liquid crystal layer 30 tends to increase slightly.

That is, the cholesteric liquid crystal layer 10 shown in FIG. 1 to FIG. 3 has a high linearity in lines formed by the bright portions 15 (bright lines) and lines formed by the dark portions 16 (dark lines) derived from the cholesteric liquid crystalline phase observed by SEM in the X-Z plane (see FIG. 3), a low haze, and a more excellent transparency. Above all, in a case where the average tilt angle formed by the line formed by the dark portion 16 derived from the cholesteric liquid crystalline phase and the main plane 11, and the average tilt angle formed by the line formed by the dark portion 16 and the main plane 12 are the same, the cholesteric liquid crystal layer 10 has a lower haze and a more excellent transparency.

The average tilt angle is obtained as an average value of the angles formed by the lines formed by the dark portions 16 and the main plane 11 or the main plane 12 in the bright-dark lines (see FIG. 3) derived from the cholesteric liquid crystalline phase observed by SEM on the X-Z plane. That is, the average tilt angle on the main plane 12 side is obtained as an average value of the tilt angles $\theta_{a1}$, $\theta_{a2}$, ..., $\theta_{an}$ formed by the lines formed by the dark portions 16 on the main plane 12 side and the main plane 12. The average tilt angle on the main plane 11 side is obtained as an average value of the tilt angles $\theta_{b1}$, $\theta_{b2}$, ..., $\theta_{bn}$ formed by the lines formed by the dark portions 16 on the main plane 11 side and the main plane 11.

The cholesteric liquid crystal layer 10 has a lower haze and a more excellent transparency, and therefore the difference between the average tilt angle on the main plane 11 side and the average tilt angle on the main plane 12 side is, for example, preferably 0 to 20°, more preferably 0 to 5°, and still more preferably 0 to 1°. The average tilt angle is a value obtained by measuring angles formed by the lines formed by the dark portions 16 derived from the cholesteric liquid crystalline phase and the main plane 11 (or the main plane 12) at any 5 or more points in the image observed by SEM and then arithmetically averaging the measured values.

<Circular Polarization Degree of Reflected Light>

Figure 8:
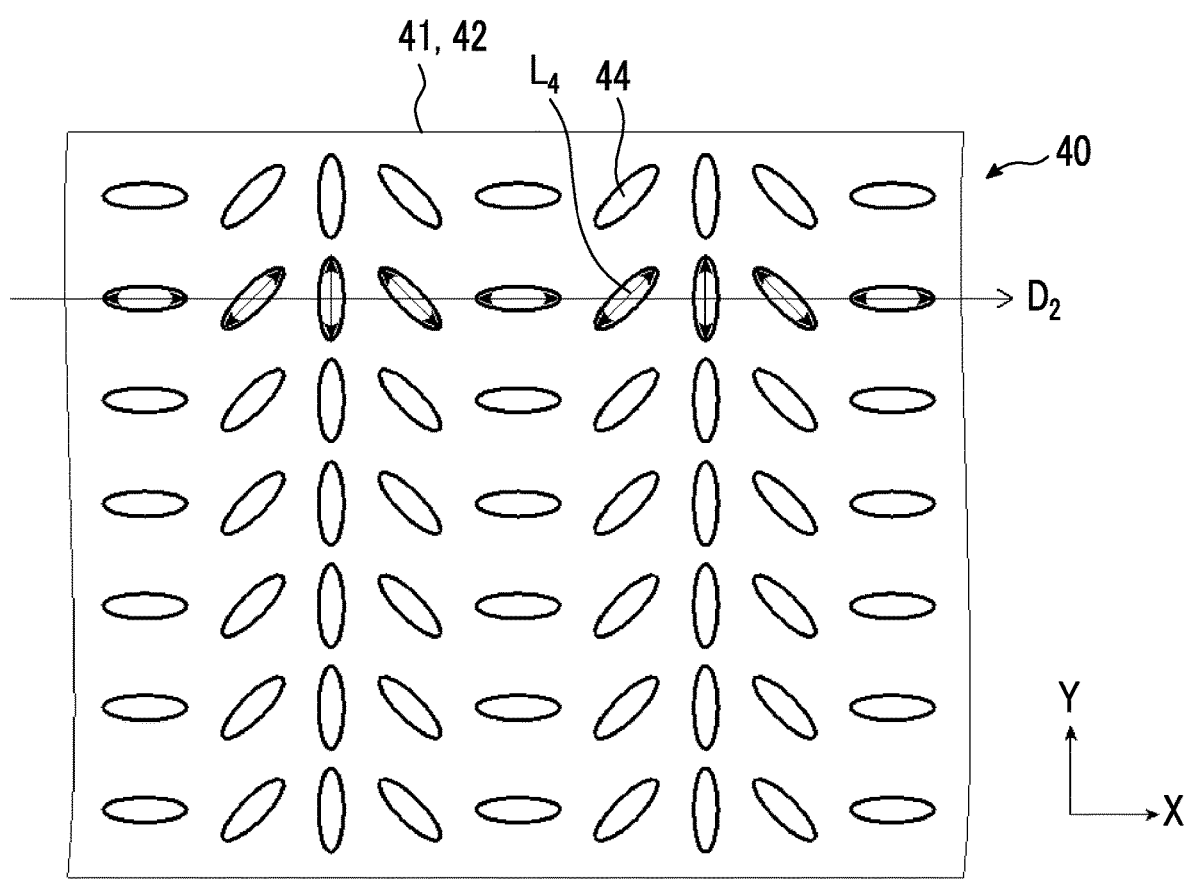
FIG. 8 is a schematic diagram of an X-Y plane of a conventional cholesteric liquid crystal layer 40.
Figure 9:
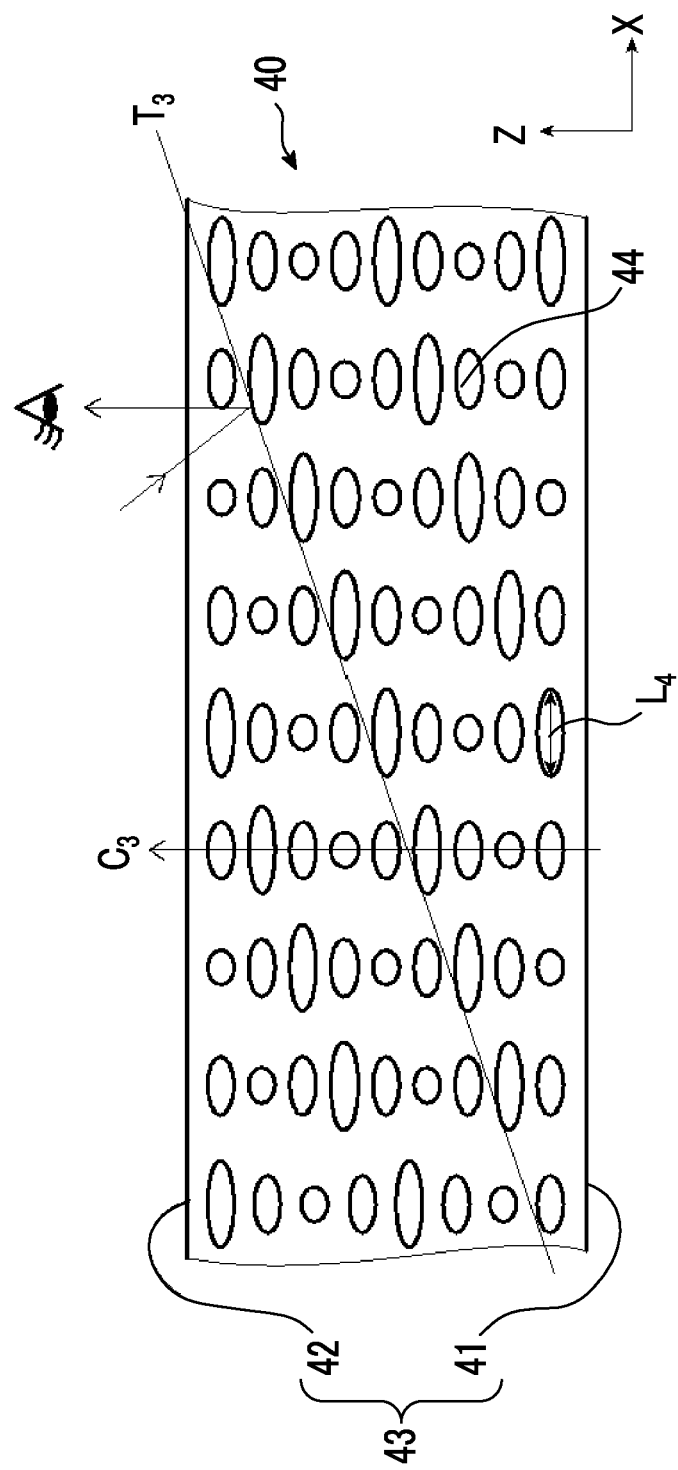
FIG. 9 is a schematic diagram of an X-Z plane of the conventional cholesteric liquid crystal layer 40.

Here, FIG. 8 and FIG. 9 show schematic diagrams of a conventional cholesteric liquid crystal layer. Specifically, FIG. 8 is a schematic diagram conceptually showing an alignment state of a liquid crystal compound in a main plane 41 and a main plane 42 of a cholesteric liquid crystal layer 40 having a pair of main planes 43 consisting of the main plane 41 and the main plane 42. In addition, FIG. 9 shows a state of the cholesteric liquid crystal layer in a cross section perpendicular to the main plane 43 of the cholesteric liquid crystal layer 40. Hereinafter, the description will be given with the main plane 41 and the main plane 42 of the cholesteric liquid crystal layer 40 being an X-Y plane, and a cross section perpendicular to the X-Y plane being an X-Z plane. That is, FIG. 9 is a schematic diagram of the cholesteric liquid crystal layer 40 on the X-Y plane, and FIG. 9 is a schematic diagram of the cholesteric liquid crystal layer 40 on the X-Z plane.

As shown in FIG. 8, in the X-Y plane of the cholesteric liquid crystal layer 40, a liquid crystal compound 44 is arranged along a plurality of parallel arrangement axes $D_2$ in the X-Y plane, and in the respective arrangement axes $D_2$, the direction of a molecular axis $L_4$ of the liquid crystal compound 44 changes while continuously rotating in one in-plane direction along the arrangement axis $D_2$. That is, the alignment state of the liquid crystal compound 44 on the X-Y plane of the cholesteric liquid crystal layer 40 is the same as the alignment state of the liquid crystal compound 14 on the X-Y plane of the cholesteric liquid crystal layer 10 shown in FIG. 2.

As shown in FIG. 9, in the X-Z plane of the cholesteric liquid crystal layer 40, the molecular axis $L_4$ of the liquid crystal compound 44 is not tilted with respect to the main plane 41 and the main plane 42 (X-Y plane). In other words, the molecular axis $L_4$ is parallel to the main plane 41 and the main plane 42 (X-Y plane).

The cholesteric liquid crystal layer 40 has the X-Y plane shown in FIG. 8 and the X-Z plane shown in FIG. 9, and therefore the helical axis $C_3$ derived from the cholesteric liquid crystalline phase is perpendicular to the main plane 41 and the main plane 42 (X-Y plane), and the reflection surface $T_3$ is tilted in a predetermined direction with respect to the main plane 41 and the main plane 42 (X-Y plane). In a case where the X-Z plane of the cholesteric liquid crystal layer 40 is observed by SEM, a striped pattern is observed in which an arrangement direction in which bright portions and dark portions are alternately arranged is tilted at a predetermined angle with respect to the main plane 41 and the main plane 42 (X-Y plane) (not shown).

On the other hand, in the cholesteric liquid crystal layer 10 shown in FIG. 1 and FIG. 2, the molecular axis $L_1$ is substantially orthogonal to the arrangement direction $P_1$ in which the bright portions 15 and the dark portions 16 observed by SEM observation in the X-Z plane are alternately arranged. That is, the direction of the helical axis $C_1$ is substantially parallel to the arrangement direction $P_1$ in which the bright portions 15 and the dark portions 16 are alternately arranged. As a result, the light incident from an oblique direction and the helical axis $C_1$ are more likely to be parallel to each other, and the light reflected by the reflection surface has a high circular polarization degree. On the other hand, in a case of the cholesteric liquid crystal layer 40, the helical axis $C_3$ is perpendicular to the main plane 41 and the main plane 42 (X-Y plane), and therefore the angle formed by the incident direction of the light incident from an oblique direction and the direction of the helical axis $C_3$ becomes larger. That is, the incident direction of the light incident from an oblique direction and the direction of the helical axis $C_3$ become more not parallel. Therefore, in the cholesteric liquid crystal layer 10, the circular polarization degree of the light reflected by the reflection surface is higher than that of the cholesteric liquid crystal layer 40.

Other Embodiments

The cholesteric liquid crystal layer 10 of the first embodiment shows a configuration in which the direction of the molecular axis $L_1$ of the liquid crystal compound 14 changes while continuously rotating in one in-plane direction along the arrangement axis $D_1$ on both main plane 11 and main plane 12; but may have a configuration in which the direction of the molecular axis $L_1$ of the liquid crystal compound 14 changes while continuously rotating in one in-plane direction along the arrangement axis $D_1$ only on one main plane of the main plane 11 and the main plane 12.

In addition, in the cholesteric liquid crystal layer 10 of the first embodiment, the arrangement axis $D_1$ existing on the main plane 11 and the arrangement axis $D_1$ existing on the main plane 12 are preferably parallel to each other.

In addition, the cholesteric liquid crystal layer 10 of the first embodiment may have a configuration in which there are a plurality of regions having different intervals between the lines (bright lines) formed by the bright portions 15 derived from the cholesteric liquid crystalline phase observed by SEM in the X-Z plane. As described above, two bright portions 15 and two dark portions 16 correspond to one helical pitch. That is, in each region where the intervals between the bright lines derived from the cholesteric liquid crystalline phase are different from each other, the helical pitch is different from region to region, and therefore a central wavelength, of selective reflection is also different from region to region. By making the cholesteric liquid crystal layer 10 have the above-mentioned configuration, the reflection wavelength range can be further widened.

As a specific example of the above-mentioned configuration, there is a configuration in which the cholesteric liquid crystal layer 10 has a region A1 having a central wavelength of selective reflection in a red light wavelength range, a region A2 having a central wavelength of selective reflection in a green light wavelength range, and a region A3 having a central wavelength of selective reflection in a blue light wavelength range. The region A1, the region A2, and the region A3 can be formed by mask exposure (patterned exposure) which is carried out by irradiating the main plane 11 (or the main plane 12) with light from an oblique direction (which is preferably carried out by irradiating light from a direction substantially parallel to the arrangement direction $P_1$). In particular, it is preferable that the cholesteric liquid crystal layer 10 has a region in which the helical pitch continuously changes in any in-plane direction of the main plane 11 (or the main plane 12). Specifically, it is preferable that the region A1, the region A2, and the region A3 are continuously arranged in any in-plane direction of the main plane 11 (or the main plane 12). In this case, the cholesteric liquid crystal layer 10 has a region in which the intervals between the lines formed by the bright portions 15 derived from the cholesteric liquid crystalline phase observed by SEM in the X-Z plane are continuously changed.

Although the configuration in which the cholesteric liquid crystal layer 10 has the region A1, the region A2, and the region A3 has been described above, the present invention is not limited thereto. The cholesteric liquid crystal layer 10 may have a configuration having two or more regions having different selective reflection wavelengths. In addition, the central wavelength of selective reflection may be infrared or ultraviolet.

In addition, in the cholesteric liquid crystal layer according to the embodiment of the present invention, the coefficient of variation of one period A is preferably 0.6 or less, more preferably 0.0 to 0.4, and still more preferably 0.0 to 0.1 in a case where the length by which the direction of the molecular axis of the liquid crystal compound rotates by 180° is defined as one period Λ, in the main plane in which the direction of the molecular axis of the liquid crystal compound changes while continuously rotating along at least one in-plane direction.

By setting the coefficient of variation of one period Λ to be 0.6 or less, the haze can be further reduced, and the circular polarization degree of the reflected light can be further increased.

The coefficient of variation of one period Λ is preferably in the above range on both main plane sides of the cholesteric liquid crystal layer.

The one period Λ corresponds to an interval between the bright-dark lines in the observation with a reflection polarizing microscope. Therefore, the coefficient of variation (standard deviation/average value) of one period Λ may be calculated by measuring the intervals of the bright-dark lines in the observation with a reflection polarizing microscope at 10 points on both main planes of the cholesteric liquid crystal layer.

In addition, the cholesteric liquid crystal layer according to the embodiment of the present invention may have a configuration which has, in at least one main plane of the cholesteric liquid crystal layer, two or more regions among which one direction along which the direction of the molecular axis of the liquid crystal compound changes while continuously rotating in the plane is different, and reflects light in different directions in the two or more regions. That is, the cholesteric liquid crystal layer according to the embodiment of the present invention may have a configuration which has two or more regions in which the directions of the arrangement axes are different.

Figure 16:
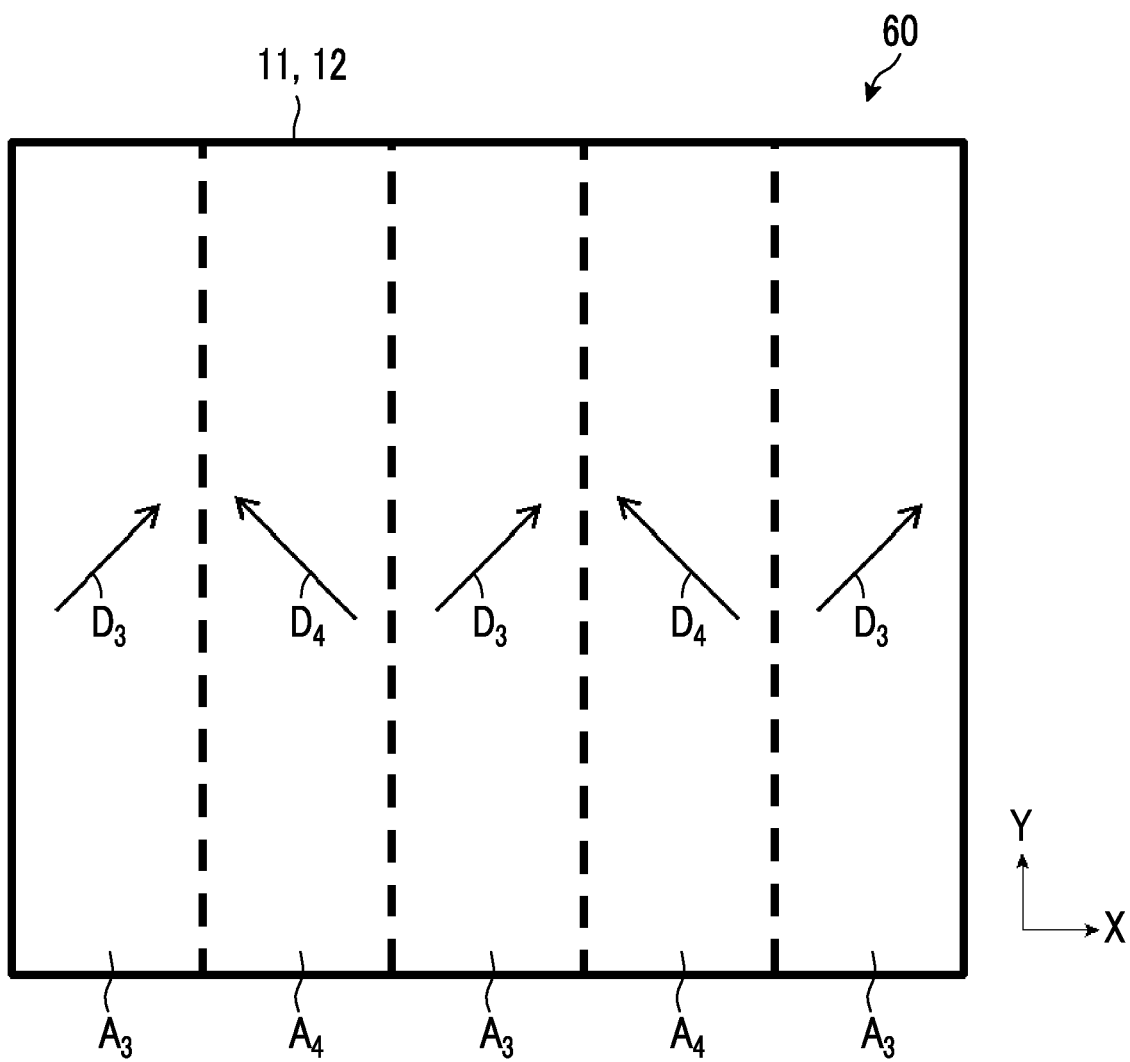
FIG. 16 is a schematic diagram of an X-Y plane of a cholesteric liquid crystal layer 60.

FIG. 16 shows an example of the configuration which has two or more regions in which the directions of the arrangement axes are different.

FIG. 16 is a schematic diagram showing an X-Y plane of a cholesteric liquid crystal layer 60.

The cholesteric liquid crystal layer 60 shown in FIG. 16 has a configuration in which regions $A_3$ and $A_4$ extending in the Y direction are alternately arranged in the X direction.

In the region $A_3$, liquid crystal compounds are arranged along arrangement axes $D_3$ in the X-Y plane, and in the respective arrangement axes $D_3$, the direction of a molecular axis of the liquid crystal compound changes while continuously rotating in one in-plane direction along the arrangement axis $D_3$. Although the liquid crystal compound is not shown in FIG. 16, it is the same as the liquid crystal compound 14 shown in FIG. 1, except that the direction of the arrangement axis is different. In addition, although FIG. 16 shows one arrangement axis $D_3$, the liquid crystal compounds are aligned along a plurality of parallel arrangement axes $D_3$ in the X-Y plane of the region $A_3$.

In the example shown in FIG. 16, the arrangement axis $D_3$ faces the upper right direction in the figure.

On the other hand, in the region A, liquid crystal compounds are arranged along arrangement axes $D_4$ in the X-Y plane, and in the respective arrangement axes $D_4$, the direction of a molecular axis of the liquid crystal compound changes while continuously rotating in one in-plane direction along the arrangement axis $D_4$. Although the liquid crystal compound is not shown in FIG. 16, it is the same as the liquid crystal compound 14 shown in FIG. 1, except that the direction of the arrangement axis is different. In addition, although FIG. 16 shows one arrangement axis $D_4$, the liquid crystal compounds are aligned along a plurality of parallel arrangement axes $D_4$ in the X-Y plane of the region $A_4$.

In the example shown in FIG. 16, the arrangement axis $D_4$ faces the upper left direction in the figure.

That is, the cholesteric liquid crystal layer 60 has a configuration in which regions having different arrangement axis directions are formed in a stripe shape.

By such a configuration having a plurality of regions having different arrangement axis directions, it is possible to have a configuration in which light is reflected in different directions in each region. This point will be described with reference to FIG. 17 to FIG. 19.

Figure 17:
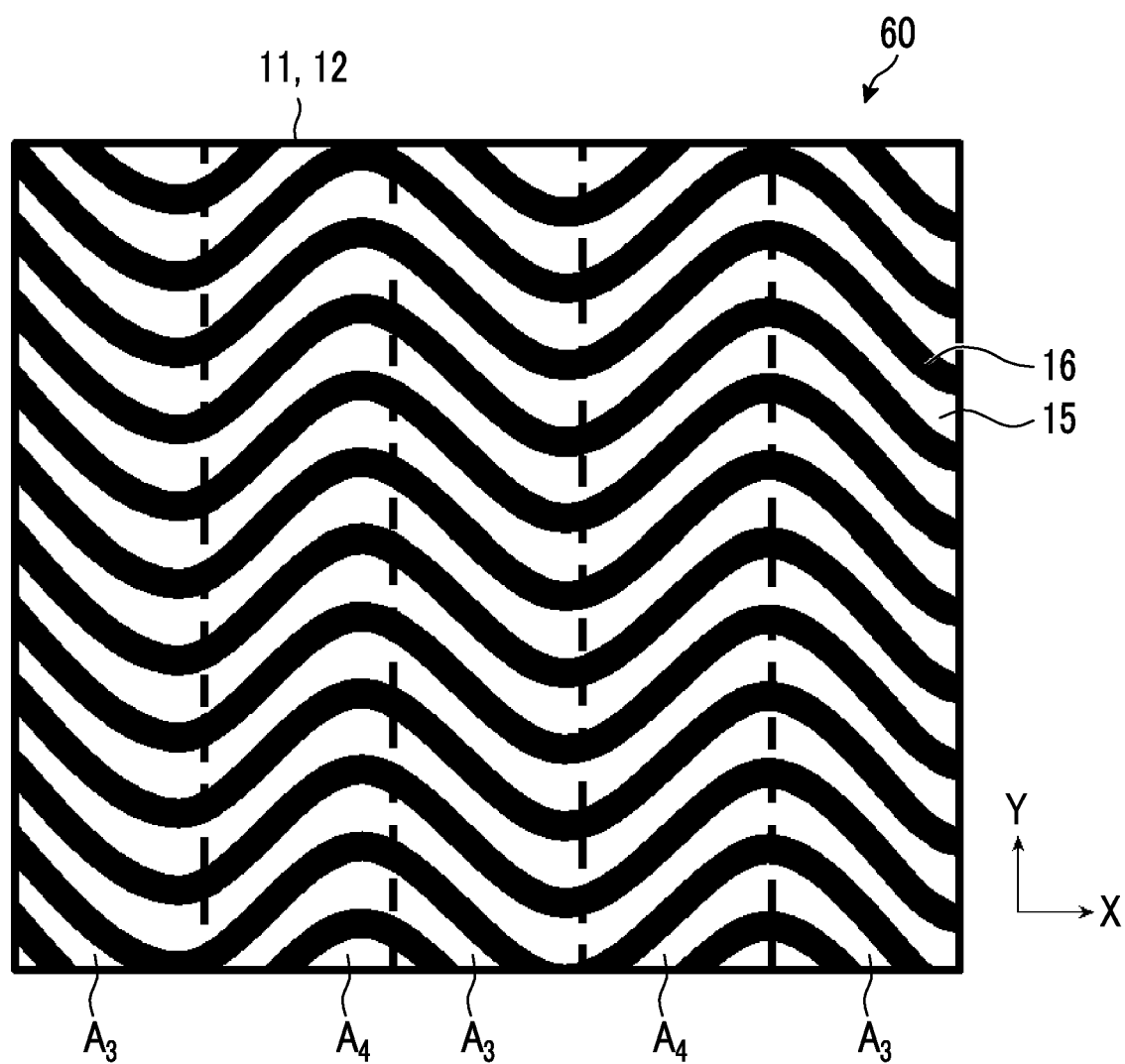
FIG. 17 is a schematic diagram in a case where the X-Y plane of the cholesteric liquid crystal layer 60 is observed by SEM.

FIG. 17 is a schematic diagram in a case where the X-Y plane of the cholesteric liquid crystal layer 60 shown in FIG. 16 is observed by SEM.

In a case where the cholesteric liquid crystal layer 60 shown in FIG. 16 and having a configuration in which regions having different arrangement axis directions are formed in a stripe shape is observed by SEM, a striped pattern in which the bright portions 15 and the dark portions 16 are alternately arranged in the Y direction is observed as shown in FIG. 17.

Here, in the region $A_3$, the arrangement axis $D_3$ faces the upper right direction in FIG. 16, and therefore the bright portions 15 and the dark portions 16 in the region $A_3$ extend in the upper left direction in FIG. 17. On the other hand, in the region $A_4$, the arrangement axis $D_4$ faces the upper left direction in FIG. 16, and therefore the bright portions 15 and the dark portions 16 in the region $A_4$ extend in the upper right direction in FIG. 17.

Therefore, as shown in FIG. 17, the bright-dark lines in the cholesteric liquid crystal layer 60 are observed as wavy lines in the X direction.

Figure 18:
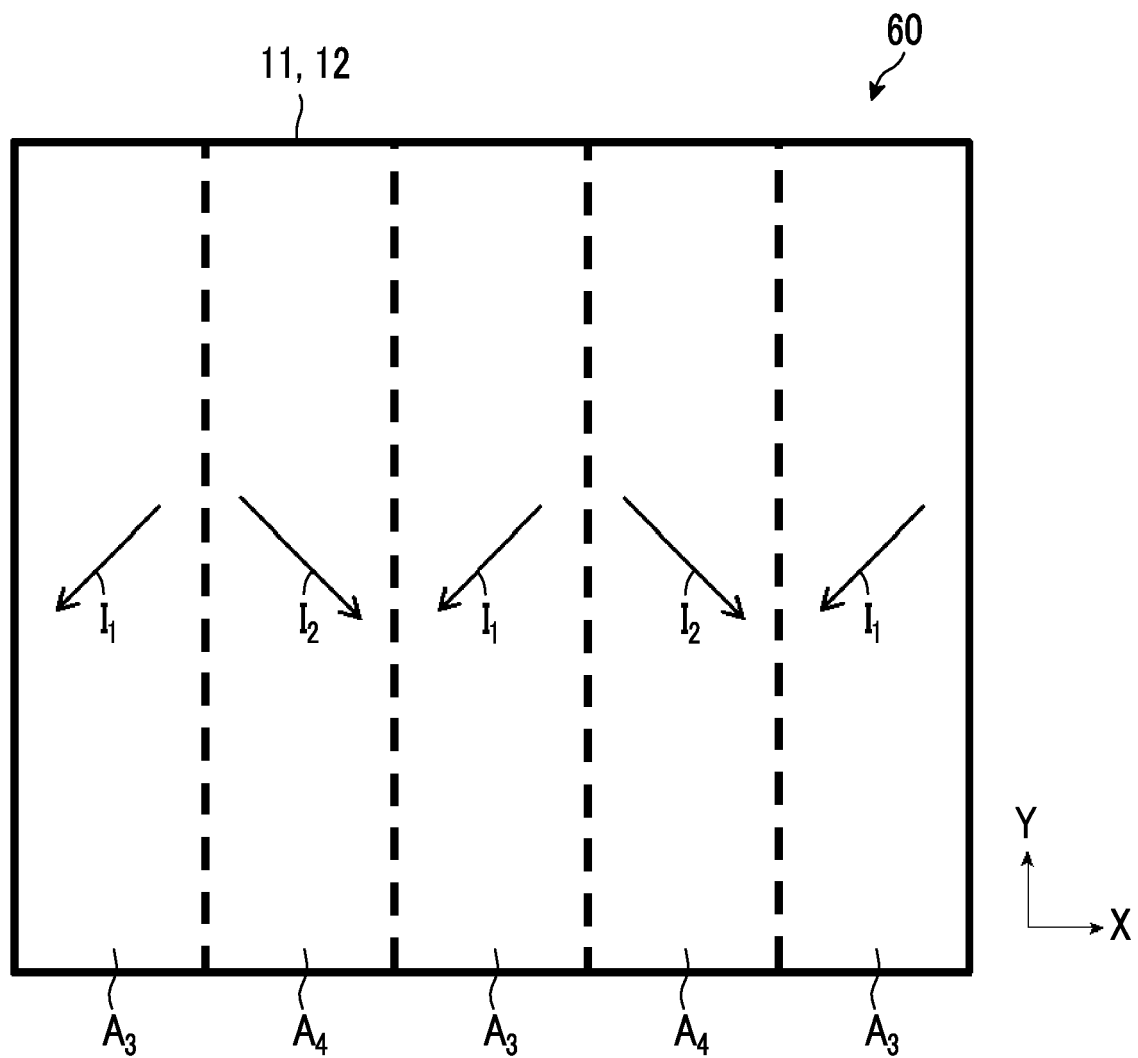
FIG. 18 is a schematic diagram for describing a direction of light reflected by the cholesteric liquid crystal layer 60.

The bright-dark lines coincide with the reflection surface. Therefore, for example, in a case where light is vertically incident on the main plane of the cholesteric liquid crystal layer 60 from a Z direction, as shown in FIG. 18, in the region $A_3$, the light is reflected in the lower left direction in FIG. 18 (arrow $I_1$). On the other hand, in the region $A_4$, the light is reflected in the lower right direction in FIG. 18 ($I_2$).

Figure 19:
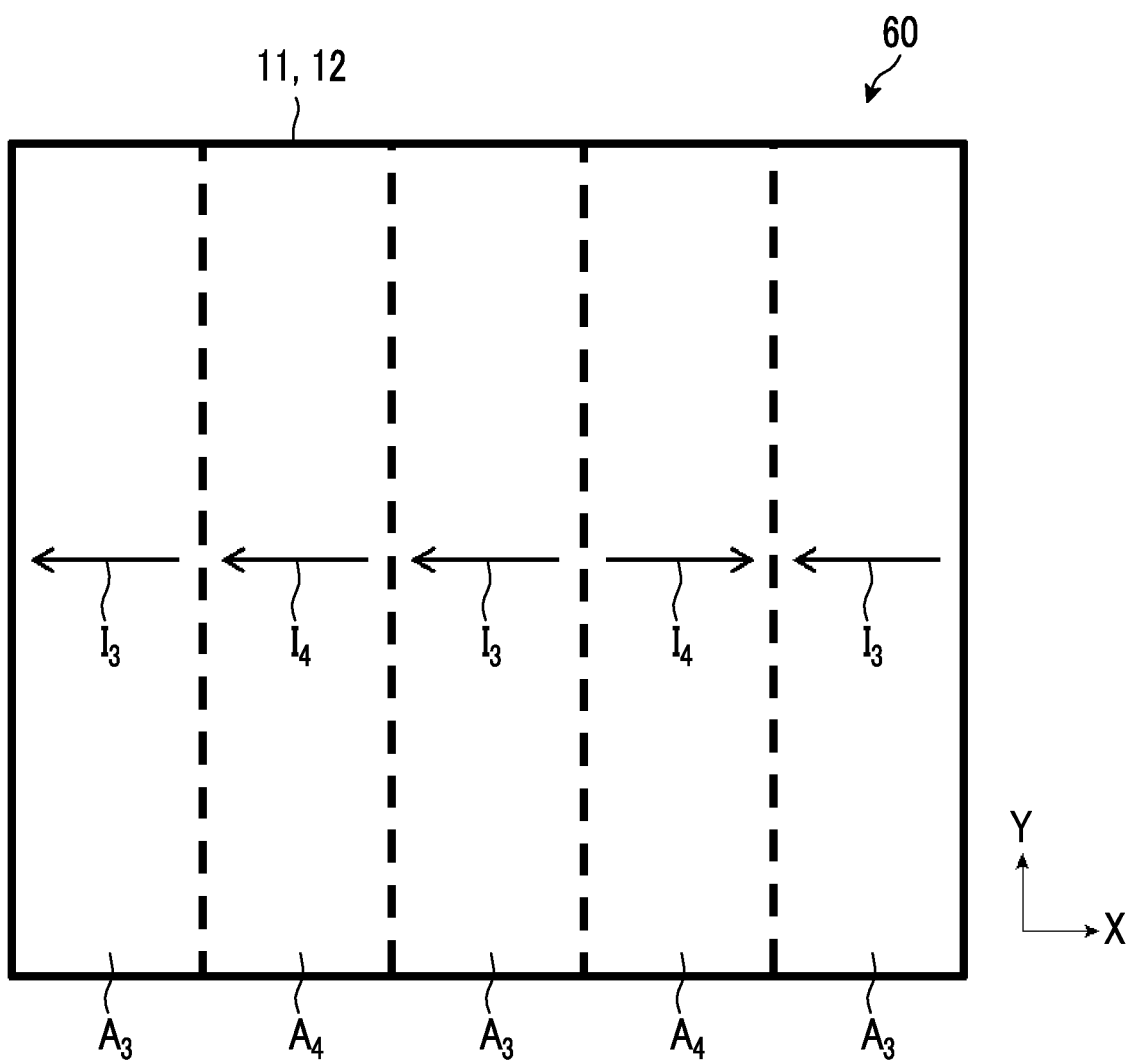
FIG. 19 is a schematic diagram for describing the direction of light reflected by the cholesteric liquid crystal layer 60.

In addition, for example, in a case where light is incident on the main plane of the cholesteric liquid crystal layer 60 from a direction tilted in the Y direction of the Z direction (a lower front of a paper surface in FIG. 19), as shown in FIG. 19, in the region $A_3$, the light is reflected to the left direction in FIG. 19 (arrow $I_3$). On the other hand, in the region $A_4$, the light is reflected to the right direction in FIG. 19 ($I_4$). On the other hand, the light from an upper front of the paper surface in FIG. 19 is not reflected. In a case where light is incident on the main plane of the cholesteric liquid crystal layer 60 from the upper front of the paper surface in FIG. 19, an optical axis of the light is substantially orthogonal to the arrangement direction of the bright-dark portions of the cholesteric liquid crystal. In this case, the reflected light is not observed for the following three reasons. The first point is that the reflectance is small because the distribution of the refractive index anisotropy on the optical axis of incidence ray is small. The second point is that a traveling direction of light is almost unchanged, and therefore the light is not reflected on the front side of the paper surface. The third point is that visible light is not reflected because the reflection wavelength of the cholesteric liquid crystal layer shifts to an extremely short wavelength side.

Therefore, both transparency and brightness can be achieved.

As described above, in a case where the cholesteric liquid crystal layer having the regions in which the directions of the arrangement axes are different is used as a screen, light is scattered in a plurality of directions, which therefore can improve the visibility. In addition, the light scattering direction is random in the conventional scattering cholesteric liquid crystal, but since the above-mentioned cholesteric liquid crystal layer has anisotropy in a reflection direction, it is possible to achieve both transparency and brightness. Further, as described above, a viewing angle can be expanded in a specific direction.

Note that, in the example shown in FIG. 16, the cholesteric liquid crystal layer 60 is configured to have two types of regions having different arrangement axis directions, but the present invention is not limited thereto, and the cholesteric liquid crystal layer 60 may be configured to have three or more types of regions having different arrangement axis directions.

In addition, the cholesteric liquid crystal layer 60 has a configuration in which two types of regions having different arrangement axis directions are alternately formed in a stripe shape, but the present invention is not limited thereto, and each region can have various shapes as long as it has a configuration having a plurality of regions, and the arrangement thereof can be any arrangement.

In addition, in the example shown in FIG. 16, the direction of the arrangement axis $D_3$ of the region $A_3$ and the direction of the arrangement axis $D_4$ of the region $A_4$ in the cholesteric liquid crystal layer 60 are configured to be substantially orthogonal to each other, but the present invention is not limited thereto and it is sufficient that the directions of the arrangement axes are different in individual regions.

In addition, the arrangement axes may be smoothly connected to each other in the vicinity of the boundaries between the regions having different arrangement axis directions.

In addition, in the example shown in FIG. 16, the configuration has a plurality of regions in which the direction of the arrangement axis is constant, but the present invention is not limited thereto and may be configured such that the direction of the arrangement axis gradually changes in the plane. Especially in a case where it is used as a screen, it is preferable that the direction of the arrangement axis gradually changes in the plane such that there is no unevenness in the visually recognizable angle.

[Use]

The cholesteric liquid crystal layer is a layer showing selective reflection properties with respect to light in a predetermined wavelength range. The cholesteric liquid crystal layer functions as a circularly polarized selective reflective layer that selectively reflects either the dextrorotatory circularly polarized light or the levorotatory circularly polarized light in the selective reflection wavelength range and transmits the other sense circularly polarized light. A film including one or two or more cholesteric liquid crystal layers can be used for various purposes. In a film including two or more layers of a cholesteric liquid crystal layer, the senses of circularly polarized light reflected by the cholesteric liquid crystal layers may be the same or opposite to each other depending on the application. In addition, the central wavelengths of selective reflection of the cholesteric liquid crystal layers, which will be described later, may be the same as or different from each other depending on the application.

In the present specification, the term "sense" for circularly polarized light means dextrorotatory circularly polarized light or levorotatory circularly polarized light. The sense of circularly polarized light is defined such that, in a case where light is viewed as it proceeds toward an observer and in a case where the distal end of the electric field vector rotates clockwise as time increases, the sense is dextrorotatory circularly polarized light, and in a case where it rotates counterclockwise, the sense is levorotatory circularly polarized light. In the present specification, the term "sense" may be used for the twisted direction of the helix of the cholesteric liquid crystal. Selective reflection by the cholesteric liquid crystal reflects dextrorotatory circularly polarized light and transmits levorotatory circularly polarized light in a case where the twisted direction (sense) of the helix of the cholesteric liquid crystal is right-handed, whereas it reflects levorotatory circularly polarized light and transmits dextrorotatory circularly polarized light in a case where the sense is left-handed.

For example, a film including a cholesteric liquid crystal layer exhibiting selective reflection properties in the visible light wavelength range (wavelength of 400 to 750 nm) can be used as a screen for projected image display and a half mirror. In addition, by controlling the reflection wavelength range, such a film can be used as a filter that improves the color purity of display light of a color filter or a display (for example, see JP2003-294948A).

In addition, the cholesteric liquid crystal layer can be used for various applications such as a polarizing element, a reflective film (reflective layer), an anti-reflection film, a view angle compensation film, a holography, a security, a sensor, a real image projection mirror (front projection, rear projection), a mirror for virtual image projection, a decorative sheet, a heat shield sheet, a light shield sheet, and an alignment film, which are constituent elements of optical elements.

In addition, the above-mentioned cholesteric liquid crystal layer can also be used as a linearly polarized light reflecting member by combining a phase difference plate or a polarizing plate.

Hereinafter, the application as a projected image display member which is a particularly preferred application will be described.

By the above-mentioned function of the cholesteric liquid crystal layer, a projected image can be formed by reflecting circularly polarized light of either sense at the wavelength showing selective reflection among the projected light. The projected image may be visually recognized as such by being displayed on the surface of the projected image display member or may be a virtual image which appears to float above the projected image display member as viewed from an observer.

The central wavelength λ of the selective reflection depends on the pitch P of the helical structure (=the period of the helix) in a cholesteric liquid crystalline phase and follows the relationship of the average refractive index n of the cholesteric liquid crystal layer and λ=n×P. Here, the central wavelength λ of the selective reflection of the cholesteric liquid crystal layer means a wavelength at the center position of the reflection peak of a circularly polarized reflection spectrum measured from the normal direction of the cholesteric liquid crystal layer. As can be seen from the above Expression, the central wavelength of the selective reflection can be adjusted by adjusting the pitch of the helical structure. Since the pitch of the cholesteric liquid crystalline phase depends on the type of the chiral agent or the addition concentration thereof, a desired pitch can be obtained by adjusting these factors. As a method for measuring sense or pitch of helix, methods described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

In addition, a projected image display member capable of displaying full color projected images can be produced by preparing and laminating cholesteric liquid crystal layers having an apparent central wavelength of the selective reflection in the red light wavelength range, the green light wavelength range, and the blue light wavelength range, respectively.

By adjusting the central wavelength of the selective reflection of each cholesteric liquid crystal layer according to the emission wavelength range of the light source used for projection and the mode of use of the projected image display member, a clear projected image can be displayed with high efficiency of light utilization. In particular, by adjusting the central wavelengths of the selective reflection of the cholesteric liquid crystal layer respectively according to the light emission wavelength range of the light source used for projection or the like, a clear color projected image can be displayed with high efficiency of light utilization.

In addition, for example, in a case where the projected image display member is configured to be transmissive to light in the visible light region, a half mirror that can be used as a combiner for a head-up display can be obtained. The projected image display half mirror can display the image projected from the projector so as to be visible, and in a case where the projected image display half mirror is observed from the same surface side where the image is displayed, the information or scenery on the opposite surface side can be observed at the same time.

In addition, the cholesteric liquid crystal layer can be suitably applied to an optically anisotropic body or a reflective film (reflective layer). In addition, the optically anisotropic body is intended to refer to a substance which has optical anisotropy.

In addition, the reflective film is as described above.

[Method for Producing Cholesteric Liquid Crystal Layer]

The production method for producing the cholesteric liquid crystal layer of the present embodiment may be, for example, a method of using a predetermined liquid crystal layer as an alignment substrate of the cholesteric liquid crystal layer, and using a liquid crystal composition including a chiral agent X having a helical twisting power (HTP) changed depending on irradiation with light, or a chiral agent Y having a helical twisting power changed depending on a change of temperature.

Hereinafter, the method for producing a cholesteric liquid crystal layer according to the embodiment of the present invention will be described in detail.

One embodiment of the method for producing a cholesteric liquid crystal layer according to the embodiment of the present invention includes the following step 1 and step 2.

Step 1: a step 1 of forming a liquid crystal layer in which a molecular axis of a disk-like liquid crystal compound is tilted with respect to a surface on at least one surface, using a composition including the disk-like liquid crystal compound, and Step 2: a step 2 of forming the cholesteric liquid crystal layer according to the embodiment of the present invention on the liquid crystal layer, using a composition including a liquid crystal compound.

Hereinafter, the step 1 and the step 2 will be described in detail by taking the cholesteric liquid crystal layer 10 of the first embodiment described above as an example.

[Step 1]

Step 1 is a step of forming a liquid crystal layer using a composition including a disk-like liquid crystal compound.

On at least one surface of the liquid crystal layer, the molecular axis of the disk-like liquid crystal compound is tilted with respect to the surface. In other words, on at least one surface of the liquid crystal layer, the disk-like liquid crystal compound is aligned such that the molecular axis thereof is tilted with respect to the surface. In the production method of the present invention, a cholesteric liquid crystal layer is formed on a surface where the disk-like liquid crystal compound is tilt-aligned (hereinafter, also referred to as "tilt alignment surface") of a liquid crystal layer having such a tilt alignment surface.

The specific method of the step 1 is not particularly limited and preferably includes the following step 1-1 and the following step 1-2. In the following, a method of forming a composition layer using a substrate having a rubbing alignment film having a pre-tilt angle arranged on the surface thereof (step 1-1) will be shown as the method of tilt-aligning the disk-like liquid crystal compound, but the method of tilt-aligning the disk-like liquid crystal compound is not limited thereto and may be, for example, a method of adding a surfactant to a composition for forming a liquid crystal layer (for example, the following step 1-1'). In this case, in the step 1, the following step 1-1' may be carried out in place of the step 1-1.

Step 1-1': a step of forming a composition layer on a substrate (a rubbing alignment film may not be arranged on the surface thereof), using a composition including a disk-like liquid crystal compound and a surfactant In addition, in a case where the disk-like liquid crystal compound has a polymerizable group, in the step 1, it is preferable to carry out a curing treatment on the composition layer, as will be described later.

Step 1-1: a step of forming a composition layer on a substrate having a rubbing alignment film having a pre-tilt angle arranged on the surface thereof, using a composition including a disk-like liquid crystal compound (composition for forming a liquid crystal layer)

Step 1-2: a step of aligning the disk-like compound in the composition layer

Hereinafter, the step 1 will be described.

<Substrate>

The substrate is a plate that supports a composition layer which will be described later. Among others, a transparent substrate is preferable. The transparent substrate is intended to refer to a substrate having a visible light transmittance of 60% or more and preferably has a visible light transmittance of 80% or more and more preferably 90% or more.

The material constituting the substrate is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer.

The substrate may contain various additives such as an ultraviolet (UV) absorber, a matting agent fine particle, a plasticizer, a deterioration inhibitor, and a release agent.

In addition, the substrate preferably has low birefringence in the visible light region. For example, the phase difference at a wavelength of 550 nm of the substrate is preferably 50 nm or less and more preferably 20 nm or less.

The thickness of the substrate is not particularly limited, but it is preferably 10 to 200 µm and more preferably 20 to 100 µm from the viewpoint of thinning and handleability.

The thickness is intended to refer to an average thickness, and is obtained by measuring thicknesses at any five places of the substrate and then arithmetically averaging the measured values. Regarding the method of measuring the thickness, the same applies to the thickness of the liquid crystal layer and the thickness of the cholesteric liquid crystal layer which will be described later.

The type of the rubbing alignment film having a pre-tilt angle is not particularly limited, and for example, a polyvinyl alcohol alignment film or a polyimide alignment film can be used.

<Composition for Forming Liquid Crystal Layer>

Hereinafter, the composition for forming a liquid crystal layer will be described.

(Disk-Like Liquid Crystal Compound)

The composition for forming a liquid crystal layer includes a disk-like liquid crystal compound.

The disk-like liquid crystal compound is not particularly limited, and known compounds can be used, but among them, those having a triphenylene skeleton are preferable.

The disk-like liquid crystal compound may have a polymerizable group. The type of the polymerizable group is not particularly limited, and a functional group capable of addition polymerization reaction is preferable, and a polymerizable ethylenically unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

(Polymerization Initiator)

The composition for forming a liquid crystal layer may include a polymerization initiator. In particular, in a case where the disk-like liquid crystal compound has a polymerizable group, the composition for forming a liquid crystal layer preferably includes a polymerization initiator.

The polymerization initiator is preferably a photopolymerization initiator capable of initiating a polymerization reaction upon irradiation with ultraviolet rays. Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the polymerization initiator in the composition for forming a liquid crystal layer (the total amount of polymerization initiators in a case where a plurality of polymerization initiators are included) is not particularly limited, but it is preferably 0.1% to 20% by mass and more preferably 1.0% to 8.0% by mass with respect to the total mass of the disk-like liquid crystal compound.

(Surfactant)

The composition for forming a liquid crystal layer may include a surfactant that can be unevenly distributed on the substrate-side surface of the composition layer and/or the surface of the composition layer opposite to the substrate. In a case where the composition for forming a liquid crystal layer includes a surfactant, the disk-like compound is easily aligned at a desired tilt angle.

Examples of the surfactant include an onium salt compound (as described in JP2012-208397A), a boronic acid compound (as described in JP2013-054201A), a perfluoroalkyl compound (as described in JP4592225B, for example, FTERGENT of Neos Corporation), and a polymer containing these functional groups.

The surfactants may be used alone or in combination of two or more thereof.

The content of the surfactant in the composition for forming a liquid crystal layer (the total amount of surfactants in a case where a plurality of surfactants are included) is not particularly limited, but it is preferably 0.01% to 10% by mass, more preferably 0.01% to 5.0% by mass, and still more preferably 0.01% to 2.0% by mass with respect to the total mass of the disk-like compound.

(Solvent)

The composition for forming a liquid crystal layer may include a solvent.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate. These solvents may be used alone or in combination of two or more thereof.

(Other Additives)

The composition for forming a liquid crystal layer may include one or two or more other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a surface-active substance, a dispersant, and a color material such as a dye and a pigment.

<Procedure of Step 1-1>

In the step 1-1, the step of forming a composition layer on a substrate is preferably a step of forming a coating film of the above-mentioned composition for forming a liquid crystal layer on the substrate.

The application method is not particularly limited, and examples thereof include a wire bar coating method, an extrusion coating method, a direct gravure coating method, a reverse gravure coating method, and a die-coating method.

If necessary, a treatment for drying the coating film applied onto the substrate may be carried out after application of the composition for forming a liquid crystal layer. By carrying out the drying treatment, the solvent can be removed from the coating film.

The thickness of the coating film is not particularly limited and is preferably 0.1 to 20 μm, more preferably 0.2 to 15 μm, and still more preferably 0.5 to 10 μm.

<Procedure of Step 1-2>

The step 1-2 is preferably a step of aligning the disk-like compound in the composition layer by heating the coating film.

As to preferred heating conditions, it is preferable to heat the composition layer at 40° C. to 150° C. (preferably 60° C. to 100° C.) for 0.5 to 5 minutes (preferably 0.5 to 2 minutes). In a case of heating the composition layer, it is preferable not to heat the composition layer to a temperature at which the liquid crystal compound is in an isotropic phase (Iso). In a case where the composition layer is heated above the temperature at which the disk-like liquid crystal compound is in an isotropic phase, the number of defects in the tilt-aligned liquid crystal phase increases, which is not preferable.

[Curing Treatment]

In addition, in a case where the disk-like liquid crystal compound has a polymerizable group, it is preferable to carry out a curing treatment on the composition layer.

The method of the curing treatment is not particularly limited, and examples thereof include a photo curing treatment and a thermal curing treatment. Among them, a light irradiation treatment is preferable, and an ultraviolet irradiation treatment is more preferable. In a case where the disk-like liquid crystal compound has a polymerizable group, the curing treatment is preferably a polymerization reaction upon irradiation with light (particularly ultraviolet irradiation), and more preferably a radical polymerization reaction upon irradiation with light (particularly ultraviolet irradiation).

For ultraviolet irradiation, a light source such as an ultraviolet lamp is used.

The irradiation energy amount of ultraviolet rays is not particularly limited, but it is generally preferably about 100 to 800 mJ/cm$^2$. The irradiation time of the ultraviolet rays is not particularly limited, but it may be determined as appropriate from the viewpoint of both sufficient strength and productivity of the obtained layer.

[Average Tilt Angle of Disk-Like Liquid Crystal Compound, and Azimuthal Angle Regulating Force of Tilt Alignment Surface of Liquid Crystal Layer]

In the tilt alignment surface of the liquid crystal layer, the average tilt angle of the disk-like liquid crystal compound with respect to the surface of the liquid crystal layer is, for example, preferably 20 to 90°, more preferably 20 to 80°, still more preferably 30 to 80°, and even still more preferably 30 to 65°.

The average tilt angle is a value obtained by measuring angles formed by the molecular axis of the disk-like liquid crystal compound and the surface of the liquid crystal layer at any 5 or more points in the observation of the cross section of the liquid crystal layer with a polarizing microscope, and then arithmetically averaging the measured values.

The average tilt angle of the disk-like liquid crystal compound with respect to the surface of the liquid crystal layer in the tilt alignment surface of the liquid crystal layer can be measured by observing a cross section of the liquid crystal layer with a polarizing microscope.

In addition, the azimuthal angle regulating force of the tilt alignment surface of the liquid crystal layer is, for example, 0.00030 J/m$^2$ or less, preferably less than 0.00020 J/m$^2$, more preferably 0.00010 J/m$^2$ or less, and still more preferably 0.00005 J/m$^2$ or less. The lower limit thereof is not particularly limited and is, for example, 0.00000 J/m$^2$ or more.

The azimuthal angle regulating force of the liquid crystal layer on the tilt alignment surface can be measured by the method described in J. Appl. Phys. 1992, 33, L1242.

By adjusting the tilt angle of the disk-like liquid crystal compound on the tilt alignment surface of the liquid crystal layer, there is an advantage that the tilt angle of the molecular axis of the liquid crystal compound in the cholesteric liquid crystal layer with respect to the main plane can be easily adjusted to a predetermined angle. That is, taking the above-mentioned cholesteric liquid crystal layer 10 (see FIG. 1 and FIG. 2) as an example, there is an advantage that the average angle $\theta_3$ of the molecular axis $L_1$ of the liquid crystal compound 14 in the cholesteric liquid crystal layer 10 with respect to the main plane 11 can be easily adjusted.

In addition, by adjusting the azimuthal angle regulating force in the tilt alignment surface of the liquid crystal layer, the direction of the molecular axis of the liquid crystal compound is likely to change while continuously rotating in one in-plane direction on the main plane in the cholesteric liquid crystal layer. That is, taking the above-mentioned cholesteric liquid crystal layer 10 (see FIG. 1 and FIG. 2) as an example, by adjusting the azimuthal angle regulating force in the tilt alignment surface of the liquid crystal layer, the liquid crystal compound 14 is arranged along a plurality of parallel arrangement axes $D_1$ in the X-Y plane, and in the respective arrangement axes $D_1$, the direction of a molecular axis $L_1$ of the liquid crystal compound 14 is likely to change while continuously rotating in one in-plane direction along the arrangement axis $D_1$.

[Step 2]

The step 2 is a step of forming the cholesteric liquid crystal layer of the present embodiment on the liquid crystal layer using a composition including a liquid crystal compound. Hereinafter, the step 2 will be described.

The step 2 preferably includes the following step 2-1 and the following step 2-2.

Step 2-1:

A step of forming a composition layer satisfying the following condition 1 or the following condition 2 on the liquid crystal layer formed in the step 1.

Condition 1: at least a part of the liquid crystal compound in the composition layer is tilt-aligned with respect to a surface of the composition layer Condition 2: the liquid crystal compound is aligned such that a tilt angle of the liquid crystal compound in the composition layer continuously changes along a thickness direction Step 2-2:

a step of subjecting the liquid crystal compound in the composition layer to a cholesteric alignment treatment to form a cholesteric liquid crystal layer.

Hereinafter, the step 2-1 and the 2-2 will be described.

<Action Mechanism of Step 2-1>

Figure 10:
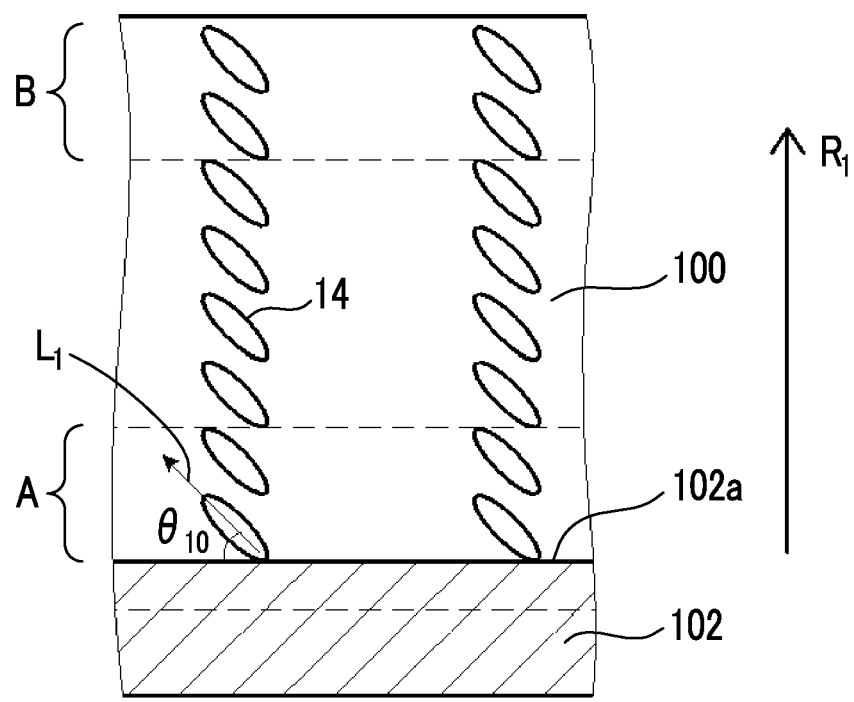
FIG. 10 is a schematic cross-sectional diagram for describing an example of an embodiment of a composition layer satisfying a condition 1 in a step 2-1.

First, FIG. 10 shows a schematic cross-sectional diagram of a composition layer satisfying the condition 1 obtained in the step 2-1. The liquid crystal compound 14 shown in FIG. 10 is a rod-like liquid crystal compound.

As shown in FIG. 10, a composition layer 100 is formed on a liquid crystal layer 102 formed using a disk-like liquid crystal compound. The liquid crystal layer 102 has, on the surface in contact with the composition layer 100, a tilt alignment surface 102a in which the molecular axis of the disk-like liquid crystal compound is tilted with respect to the surface of the liquid crystal layer 102. The liquid crystal layer 102 and the tilt alignment surface 102a will be described later.

As shown in FIG. 10, in the composition layer 100 arranged on the tilt alignment surface 102a of the liquid crystal layer 102, the liquid crystal compound 14 is loosely alignment-regulated by the tilt alignment surface 102a, and thus is aligned so as to be tilted with respect to the tilt alignment surface 102a. In other words, in the composition layer 100, the liquid crystal compound 14 is aligned in a fixed direction (uniaxial direction) such that the molecular axis $L_1$ of the liquid crystal compound 14 forms a predetermined angle $\theta_{10}$ with respect to the surface of the composition layer 100.

FIG. 10 shows an embodiment in which the liquid crystal compound 14 is aligned over the entire area of the composition layer 100 in a thickness direction $R_1$ such that the molecular axis $L_1$ forms a predetermined angle 10 with respect to the tilt alignment surface 102a, but the composition layer satisfying the condition 1 obtained in the step 2-1 may be sufficient such that a part of the liquid crystal compound 14 is tilt-aligned; and, in at least one of the surface of the composition layer 100 on the tilt alignment surface 102a side (corresponding to region A in FIG. 10) or the surface of the composition layer 100 opposite to the tilt alignment surface 102a side (corresponding to region B in FIG. 10), the liquid crystal compound 14 is preferably aligned such that the molecular axis $L_1$ forms a predetermined angle $\theta_{10}$ with respect to the surface of the composition layer 100, and the liquid crystal compound 14 is more preferably tilt-aligned on the surface of the composition layer 100 on the tilt alignment surface 102a side such that the molecular axis $L_1$ forms a predetermined angle $\theta_{10}$ with respect to the surface of the composition layer 100. In at least one of the region A or the region B, in a case where the liquid crystal compound 14 is aligned such that the molecular axis $L_1$ forms a predetermined angle $\theta_{10}$ with respect to the surface of the composition layer 100, and then in a case where the liquid crystal compound 14 is brought into a cholesteric liquid crystalline phase state in the subsequent step 2-2, the cholesteric alignment of the liquid crystal compound 14 in the other region can be induced by an alignment regulating force based on the aligned liquid crystal compound 14 in the region A and/or the region B.

In addition, although not shown, the composition layer satisfying the above-mentioned condition 2 corresponds to the composition layer 12 shown in FIG. 1 in which the liquid crystal compound 14 is hybrid-aligned with respect to the surface of the composition layer 100. That is, this corresponds to an aspect in which the angle $\theta_{10}$ continuously changes in a thickness direction, in the above description of FIG. 1. Specifically, the liquid crystal compound 14 is aligned such that its tilt angle $\theta_{20}$ (an angle of the molecular axis $L_1$ with respect to the surface of the composition layer 100) continuously changes along the thickness direction $R_1$ of the composition layer 100.

The composition layer satisfying the condition 2 obtained in the step 2-1 may be sufficient such that a part of the liquid crystal compound 14 is hybrid-aligned; and, in at least one of the surface of the composition layer 100 on the tilt alignment surface 102a side (corresponding to region A in FIG. 10) or the surface of the composition layer 100 opposite to the tilt alignment surface 102a side (corresponding to region B in FIG. 10), the liquid crystal compound 14 is preferably hybrid-aligned with respect to the tilt alignment surface 102a, and the liquid crystal compound 14 is more preferably hybrid-aligned with respect to the surface of the composition layer 100 on the surface of the tilt alignment surface 102a side.

The angles $\theta_{10}$ and $\theta_{20}$ are not particularly limited unless they are 0° in the entire composition layer (in a case where the angle $\theta_{10}$ is 0° in the entire composition layer, the molecular axis $L_1$ of the liquid crystal compound 14 is parallel to the tilt alignment surface 102a in a case where the liquid crystal compound 14 is a rod-like liquid crystal compound). In other words, it does not prevent that the angles $\theta_{10}$ and $\theta_{20}$ are 0° in a partial region of the composition layer.

The angles $\theta_{10}$ and $\theta_{20}$ are, for example, 0 to 90°. Above all, the angles $\theta_{10}$ and $\theta_{20}$ are preferably 0 to 50° and more preferably 0 to 10°.

The composition layer obtained by the step 2-1 is preferably a composition layer satisfying the condition 1 or the condition 2 and more preferably a composition layer satisfying the condition 2 in that the cholesteric liquid crystal layer is more excellent in reflection anisotropy.

<Action Mechanism of Step 2-2>

After obtaining the composition layer satisfying the condition 1 or the condition 2 by the step 2-1, the liquid crystal compound in the composition layer is cholesterically aligned in the step 2-2 (in other words, the liquid crystal compound is brought into a cholesteric liquid crystalline phase) to form a cholesteric liquid crystal layer.

As a result, the cholesteric liquid crystal layer of the present embodiment (the cholesteric liquid crystal layer 10 shown in FIG. 1 and FIG. 2) is obtained.

<Action Mechanism of Liquid Crystal Composition>

As described above, the present inventors have found, as one of the methods for achieving the method for producing a cholesteric liquid crystal layer, a method of using a liquid crystal composition including a chiral agent X having a helical twisting power (HTP) changed depending on irradiation with light, or a chiral agent Y having a helical twisting power changed depending on a change of temperature. Hereinafter, the action mechanism of the liquid crystal composition including the chiral agent X and the action mechanism of the liquid crystal composition including the chiral agent Y will be described in detail.

The helical twisting power (HTP) of the chiral agent is a factor indicating the helical alignment ability expressed by Expression (1A).

HTP=1/(length of helical pitch (unit: μm)×concentration of chiral agent in liquid crystal composition (% by mass)) [μm$^{-1}$]   Expression (1A)

The length of the helical pitch refers to the length of the pitch P (=period of the helix) of the helical structure of the cholesteric liquid crystalline phase and can be measured by the method described on page 196 of the Liquid Crystal Handbook (published by Maruzen Co., Ltd.).

In addition, the value of HTP is influenced not only by the type of chiral agent but also by the type of liquid crystal compound contained in the composition. Therefore, for example, in a case where a composition including a predetermined chiral agent X and a liquid crystal compound A and a composition including a predetermined chiral agent X and a liquid crystal compound B different from the liquid crystal compound A are prepared, and HTPs of both compositions are measured at the same temperature, the values of HTPs thus measured may be different therebetween.

In addition, the helical twisting power (HTP) of the chiral agent is also expressed as Expression (1B).

HTP=(average refractive index of liquid crystal compound)/{(concentration of chiral agent in liquid crystal composition (% by mass))×(central reflection wavelength (nm))} [μm$^{-1}$]   Expression (1B):

In a case where the liquid phase composition includes two or more types of chiral agents, the "concentration of chiral agent in liquid crystal composition" in Expressions (1A) and (1B) corresponds to the sum of the concentrations of all the chiral agents.

(Action Mechanism of Liquid Crystal Composition Including Chiral Agent X)

Hereinafter, a method for forming a cholesteric liquid crystal layer using a liquid crystal composition including the chiral agent X will be described.

In a case where a cholesteric liquid crystal layer is formed using a liquid crystal composition including a chiral agent X, a composition layer satisfying the condition 1 or the condition 2 is formed in the step 2-1, and then the composition layer is subjected to a light irradiation treatment in the step 2-2, whereby the liquid crystal compound in the composition layer is cholesterically aligned. That is, in the step 2-2, the liquid crystal compound in the composition layer is cholesterically aligned by changing the helical twisting power of the chiral agent X in the composition layer by the light irradiation treatment.

Here, in a case where the liquid crystal compound in the composition layer is aligned into a cholesteric liquid crystalline phase state, the helical twisting power that induces the helix of the liquid crystal compound is considered to roughly correspond to the weighted average helical twisting power of the chiral agents included in the composition layer. The weighted average helical twisting power here is represented by Expression (1C), for example, in a case where two types of chiral agents (chiral agent A and chiral agent B) are used in combination.

Weighted average helical twisting power (μm$^{-1}$)=
(helical twisting power of chiral agent $A$ (μm$^{-1}$)×concentration of chiral agent $A$ in liquid crystal composition (% by mass)+helical twisting power of chiral agent $B$) (μm$^{-1}$)×concentration of chiral agent $B$ in liquid crystal composition (% by mass))/(concentration of chiral agent $A$ in liquid crystal composition (% by mass)+ concentration of chiral agent $B$ in liquid crystal composition (% by mass))   Expression (1C)

However, in Expression (1C), in a case where the helical direction of the chiral agent is right-handed, the helical twisting power has a positive value. In addition, in a case where the helical direction of the chiral agent is left-handed, the helical twisting power has a negative value. That is, for example, in a case of a chiral agent having a helical twisting power of 10 μm$^{-1}$, the helical twisting power is expressed as 10 μm$^{-1}$ in a case where the helical direction of the helix induced by the chiral agent is right-handed. On the other hand, in a case where the helical direction of the helix induced by the chiral agent is left-handed, the helical twisting power is expressed as −10 μm$^{-1}$.

The weighted average helical twisting power (μm$^{-1}$) obtained by Expression (1C) can also be calculated from Expression (1A) and Expression (1B).

Hereinafter, for example, the weighted average helical twisting power in a case where the composition layer includes the chiral agent A and the chiral agent B having the following characteristics will be described.

Figure 11:
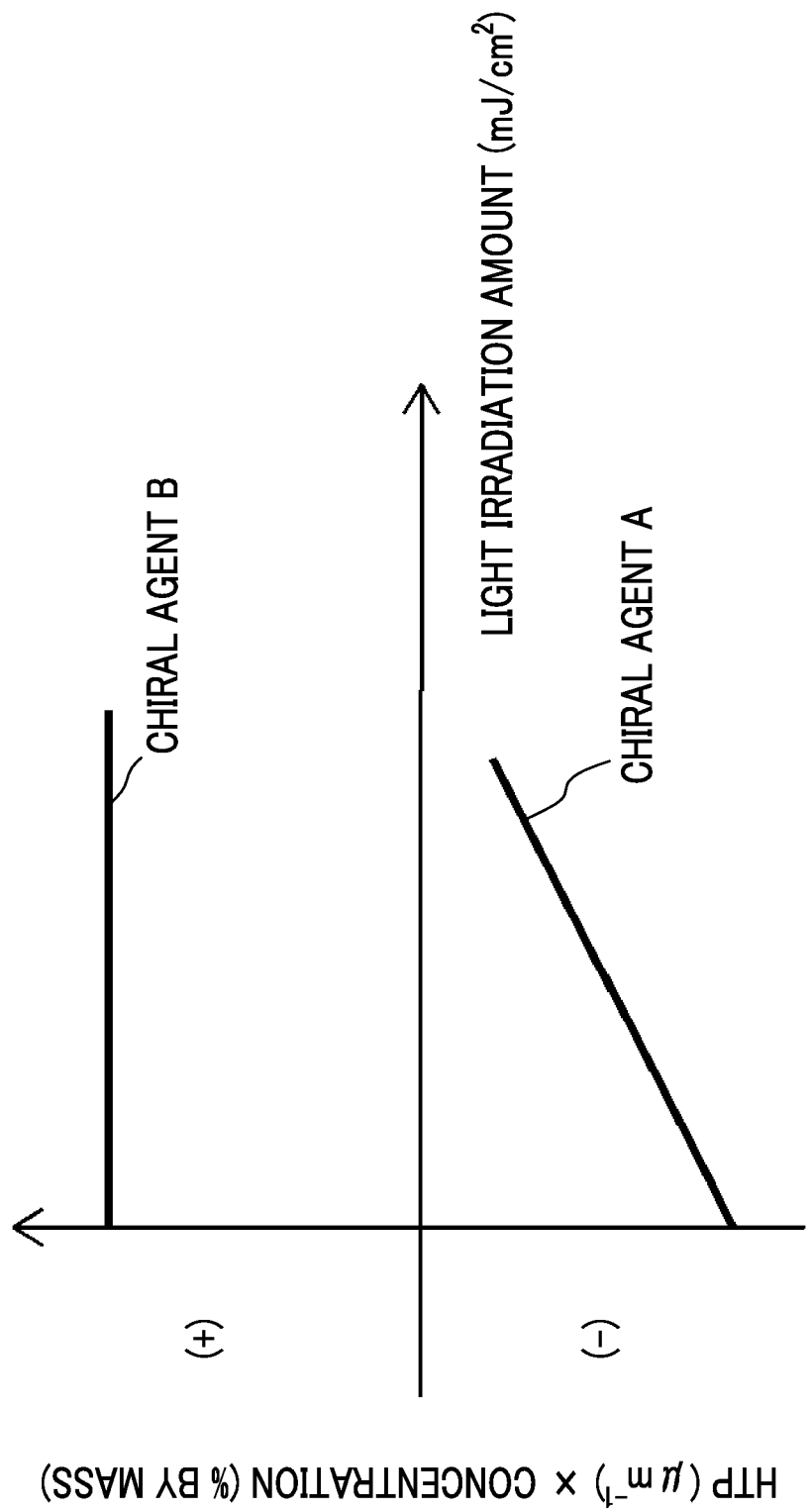
FIG. 11 is a schematic diagram of a graph plotting a relationship between a helical twisting power (HTP) ($\mu m^{-1}$)×a concentration (% by mass) and a light irradiation amount ($mJ/cm^2$) for each of chiral agent A and chiral agent B.

As shown in FIG. 11, the chiral agent A is a chiral agent that corresponds to the chiral agent X, has a left-handed (−) helical twisting power, and reduces the helical twisting power depending on irradiation with light.

In addition, as shown in FIG. 11, the chiral agent B is a chiral agent which has a right-handed (+) helical twisting power opposite to that of the chiral agent A, and has a helical twisting power that is not changed depending on irradiation with light. Here, "helical twisting power of chiral agent A ($\mu m^{-1}$)×concentration of chiral agent A (% by mass)" and "helical twisting power of chiral agent B ($\mu m^{-1}$)×concentration of chiral agent B (% by mass)" at the time of no light irradiation treatment are equal. In addition, in FIG. 11, with regard to the "helical twisting power of chiral agent ($\mu m^{-1}$)×concentration (% by mass) of chiral agent" on the vertical axis, the more the value thereof deviates from zero, the larger the helical twisting power becomes.

Figure 12:
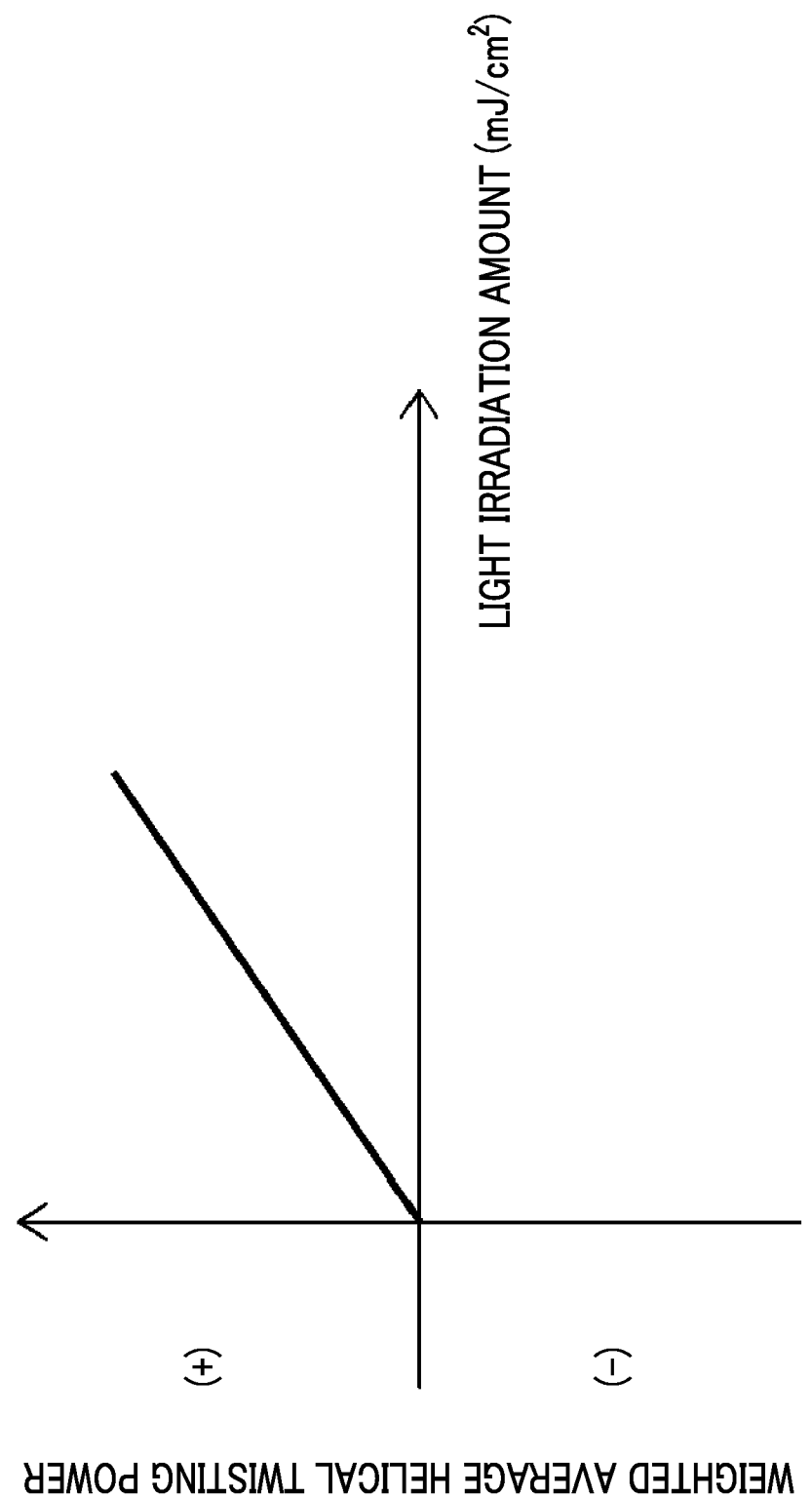
FIG. 12 is a schematic diagram of a graph plotting the relationship between a weighted average helical twisting power ($\mu m^{-1}$) and a light irradiation amount ($mJ/cm^2$) in a system in which chiral agent A and chiral agent B are used in combination.

In a case where the composition layer includes the chiral agent A and the chiral agent B, the helical twisting power that induces the helix of the liquid crystal compound matches the weighted average helical twisting power of the chiral agent A and the chiral agent B. As a result, in a system in which the chiral agent A and the chiral agent B are used in combination, as shown in FIG. 12, it is considered that a larger light irradiation amount leads to an increase in helical twisting power that induces the helix of the liquid crystal compound in the direction (+) of the helix induced by the chiral agent B (which corresponds to chiral agent Y).

In the method for producing a cholesteric liquid crystal layer of the present embodiment, the absolute value of the weighted average helical twisting power of the chiral agent in the composition layer formed in the step 2-1 is not particularly limited, but from the viewpoint of easy formation of the composition layer, it is, for example, preferably 0.0 to 1.9 $\mu m^{-1}$, more preferably 0.0 to 1.5 $m^{-1}$, still more preferably 0.0 to 0.5 $\mu m^{-1}$, and most preferably zero (see FIG. 11). On the other hand, in the light irradiation treatment of the step 2-2, the absolute value of the weighted average helical twisting power of the chiral agent in the composition layer is not particularly limited as long as the liquid crystal compound can be cholesterically aligned, but it is preferably 10.0 $\mu m^{-1}$ or more, more preferably 10.0 to 200.0 $\mu m^{-1}$, and still more preferably 20.0 to 200.0 $\mu m^{-1}$.

That is, in the step 2-1, the helical twisting power of the chiral agent X in the composition layer is offset to almost zero, and therefore the liquid crystal compound in the composition layer can be aligned into tilt alignment or hybrid alignment. Next, the light irradiation treatment in the step 2-2 is used as a trigger to change the helical twisting power of the chiral agent X such that the weighted average helical twisting power of the chiral agent in the composition layer is increased either in the right-handed direction (+) or in the left-handed direction (−), whereby the cholesteric liquid crystal layer of the present embodiment (for example, the cholesteric liquid crystal layer 10) can be obtained.

(Action Mechanism of Liquid Crystal Composition Including Chiral Agent Y)

Next, a method for forming a cholesteric liquid crystal layer using a liquid crystal composition including a chiral agent Y will be described.

In a case where a cholesteric liquid crystal layer is formed using a liquid crystal composition including a chiral agent Y, a composition layer satisfying the condition 1 or the condition 2 is formed in the step 2-1, and then the composition layer is subjected to a cooling treatment or a heating treatment in the step 2-2, whereby the liquid crystal compound in the composition layer is cholesterically aligned. That is, in the step 2-2, the liquid crystal compound in the composition layer is cholesterically aligned by changing the helical twisting power of the chiral agent Y in the composition layer by the cooling treatment or the heating treatment.

As described above, in a case where the liquid crystal compound in the composition layer is aligned into a cholesteric liquid crystalline phase state, the helical twisting power that induces the helix of the liquid crystal compound is considered to roughly correspond to the weighted average helical twisting power of the chiral agents included in the composition layer. The weighted average helical twisting power here is as described above.

Hereinafter, the action mechanism of the chiral agent Y will be described by taking an embodiment in which the liquid crystal compound in the composition layer is cholesterically aligned by carrying out the cooling treatment in the step 2-2 as an example.

First, in the following, for example, the weighted average helical twisting power in a case where the composition layer includes the chiral agent A and the chiral agent B having the following characteristics will be described.

Figure 13:
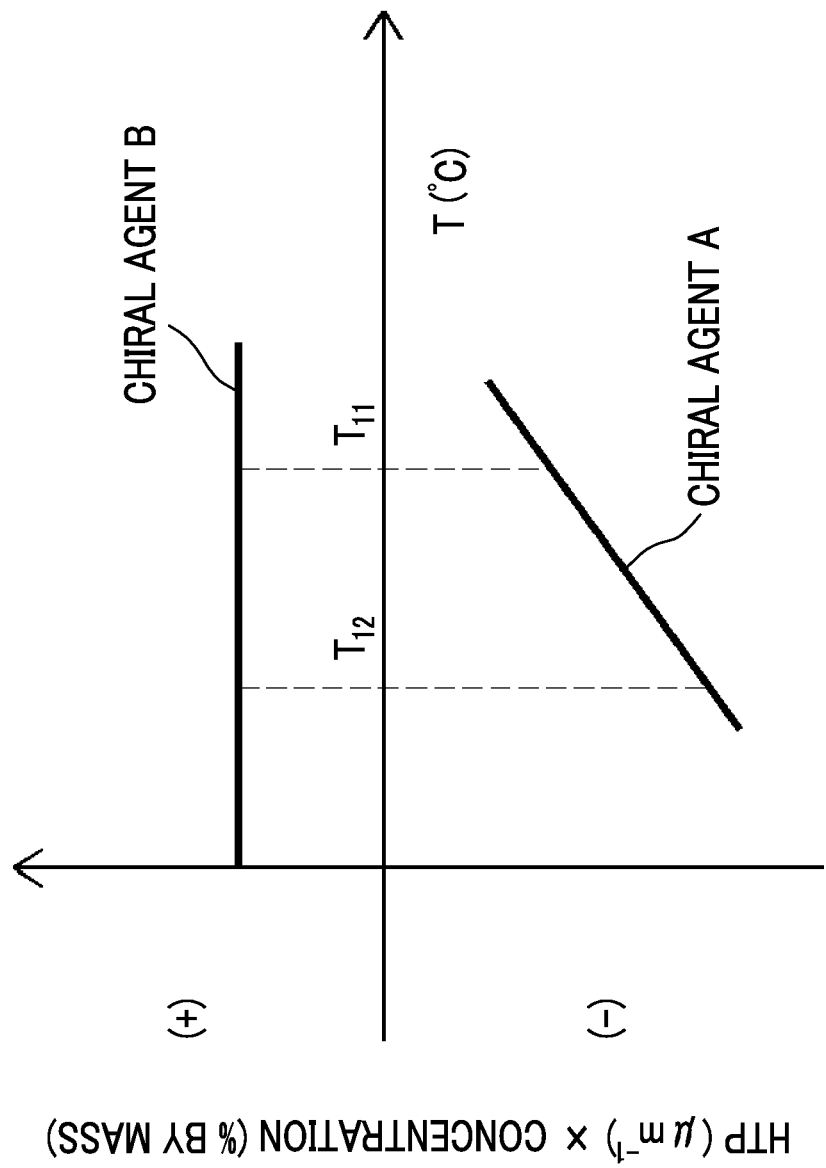
FIG. 13 is a schematic diagram of a graph plotting a relationship between a HTP ($\mu m^{-1}$)×a concentration (% by mass) and a temperature (° C.) for each of chiral agent A and chiral agent B.

As shown in FIG. 13, the chiral agent A corresponds to the chiral agent Y and is a chiral agent which has a left-handed (−) helical twisting power at a temperature $T_{11}$ at which an alignment treatment of the liquid crystal compound for forming the composition layer satisfying the condition 1 or the condition 2 is carried out in the step 1 and at a temperature $T_{12}$ at which the cooling treatment in the step 2-2 is carried out and whose left-handed (−) helical twisting power is increased as the temperature becomes lower. In addition, as shown in FIG. 13, the chiral agent B is a chiral agent which has a right-handed (+) helical twisting power opposite to that of the chiral agent A, and has a helical twisting power that is not changed depending on a change of temperature. Here, "helical twisting power of chiral agent A ($\mu m^{-1}$)×concentration of chiral agent A (% by mass)" and "helical twisting power of chiral agent B ($\mu m^{-1}$)×concentration of chiral agent B (% by mass)" at the temperature $T_1$ are equal.

In a case where the composition layer includes the chiral agent A and the chiral agent B, the helical twisting power that induces the helix of the liquid crystal compound matches the weighted average helical twisting power of the chiral agent A and the chiral agent B. As a result, in a system in which the chiral agent A and the chiral agent B are used in combination, as shown in FIG. 14, it is considered that a lower temperature region leads to an increase in helical twisting power that induces the helix of the liquid crystal compound in the direction (−) of the helix induced by the chiral agent A (which corresponds to chiral agent Y).

In the method for producing a cholesteric liquid crystal layer of the present embodiment, the absolute value of the weighted average helical twisting power of the chiral agent in the composition layer is not particularly limited, but in a case of forming a composition layer satisfying the condition 1 or the condition 2 of the step 2-1 (that is, in a case of the present embodiment, at the temperature $T_1$ at which an alignment treatment of a liquid crystal compound for forming a composition layer satisfying the condition 1 or the condition 2 is carried out), it is preferably 0.0 to 1.9 $\mu m^{-1}$, more preferably 0.0 to 1.5 $\mu m^{-1}$, still more preferably 0.0 to 0.5 $\mu m^{-1}$, and most preferably zero, from the viewpoint of easy formation of the composition layer.

Figure 14:
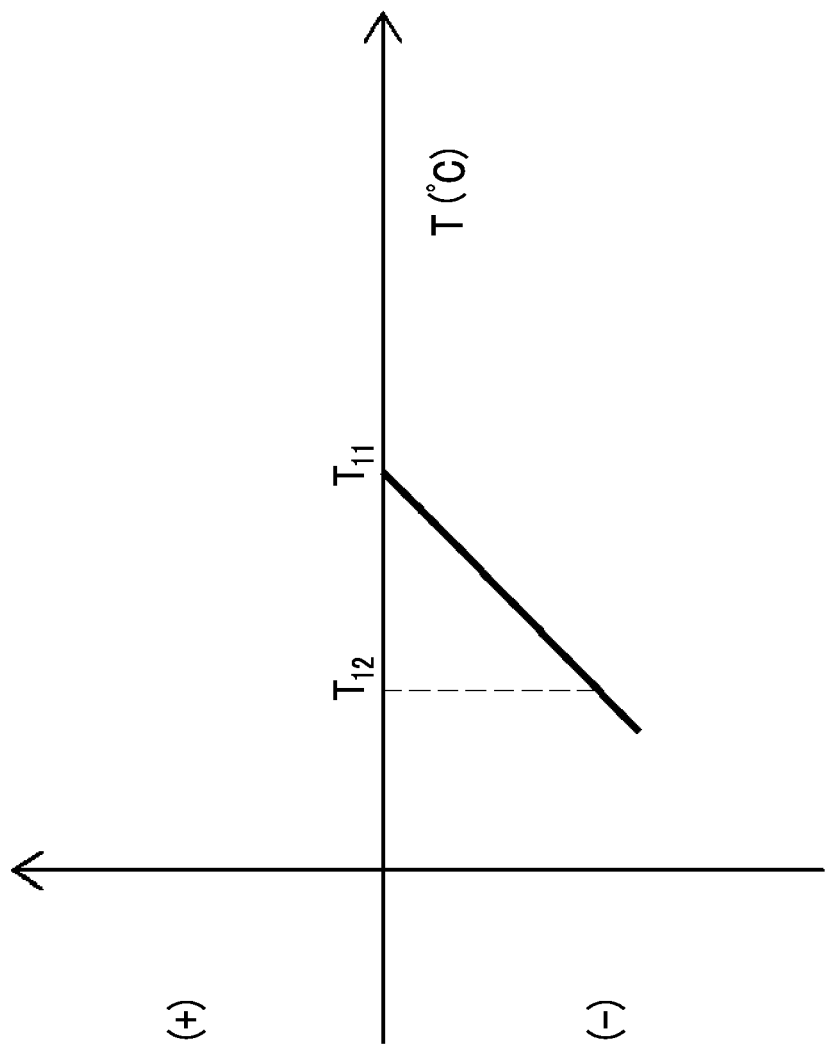
FIG. 14 is a schematic diagram of a graph plotting the relationship between a weighted average helical twisting power ($\mu m^{-1}$) and a temperature (° C.) in a system in which chiral agent A and chiral agent B are used in combination.

On the other hand, at the temperature $T_{12}$ at which the cooling treatment in the step 2-2 is carried out, the absolute value of the weighted average helical twisting power of the chiral agent in the composition layer is not particularly limited as long as the liquid crystal compound can be cholesterically aligned, but it is preferably 10.0 $\mu m^{-1}$ or more, more preferably 10.0 to 200.0 $\mu m^{-1}$, and still more preferably 20.0 to 200.0 $\mu m^{-1}$ (see FIG. 14).

That is, at the temperature $T_{11}$, the helical twisting power of the chiral agent Y is offset to almost zero, and therefore the liquid crystal compound can be brought into tilt alignment or hybrid alignment. Next, the cooling treatment or the heating treatment (temperature change to temperature $T_{12}$) in the step 2-2 is used as a trigger to increase the helical twisting power of the chiral agent Y such that the weighted average helical twisting power of the chiral agent in the composition layer is increased either in the right-handed direction (+) or in the left-handed direction (−), whereby the cholesteric liquid crystal layer of the present embodiment (for example, the cholesteric liquid crystal layer 10) can be obtained.

<Procedure of Step 2>

Hereinafter, the procedure of the step 2 will be described in detail. It should be noted that, in the following, an aspect in which a liquid crystal composition including the chiral agent X is used and an aspect in which a liquid crystal composition including the chiral agent Y is used will be separately described in detail.

(Aspect Using Liquid Crystal Composition Including Chiral Agent X)

Hereinafter, the procedure of the step 2 using the liquid crystal composition including the chiral agent X (hereinafter, also referred to as "step 2X") will be described.

The step 2X includes at least the following step 2X-1 and step 2X-2.

Step 2X-1: a step of forming a composition layer satisfying the following condition 1 or the following condition 2 on a liquid crystal layer, using a liquid crystal composition including a chiral agent X and a liquid crystal compound Step 2X-2: a step of subjecting the composition layer to a light irradiation treatment to result in cholesteric alignment of the liquid crystal compound in the composition layer, thereby forming a cholesteric liquid crystal layer condition 1: at least a part of the liquid crystal compound in the composition layer is tilt-aligned with respect to a surface of the composition layer;

condition 2: the liquid crystal compound is aligned such that a tilt angle of the liquid crystal compound in the composition layer continuously changes along a thickness direction In addition, in a case where the liquid crystal compound has a polymerizable group, in the step 2X, it is preferable to carry out a curing treatment on the composition layer, as will be described later.

Hereinafter, the materials used in each step and the procedure of each step will be described in detail.

<<Step 2X-1>>

The step 2X-1 is a step of forming a composition layer satisfying the above condition 1 or the above condition 2 on a liquid crystal layer, using a liquid crystal composition including a chiral agent X and a liquid crystal compound (hereinafter, also referred to as "composition X").

Hereinafter, the composition X will be described in detail, and then the procedure of the step will be described in detail.

<<<<Composition X>>>>

The composition X includes a liquid crystal compound and a chiral agent X having a helical twisting power changed depending on irradiation with light. Hereinafter, each component will be described.

As described above, the absolute value of the weighted average helical twisting power of the chiral agent in the composition layer obtained in the step 2X-1 is preferably 0.0 to 1.9 m$^{-1}$, more preferably 0.0 to 1.5 μm$^{-1}$, still more preferably 0.0 to 0.5 μm$^{-1}$, and most preferably zero, from the viewpoint of easy formation of the composition layer. Therefore, in a case where the chiral agent X has a helical twisting power exceeding the above-mentioned predetermined range in a state of no light irradiation treatment, it is preferable that the composition X includes a chiral agent that induces a helix in a direction opposite to that of the chiral agent X (hereinafter, also referred to as "chiral agent XA"), and the helical twisting power of the chiral agent X is offset to almost zero in the step 2X-1 (that is, the weighted average helical twisting power of the chiral agent in the composition layer obtained in the step 2X-1 is set to the above predetermined range). It is more preferable that the chiral agent XA is a compound that does not change the helical twisting power by the light irradiation treatment.

In addition, in a case where the liquid crystal composition includes a plurality of chiral agents X as the chiral agent and then in a case where the weighted average helical twisting power of the plurality of chiral agents X is a helical twisting power outside the above-mentioned predetermined range in a state of no light irradiation treatment, "another chiral agent XA that induces a helix in a direction opposite to that of the chiral agent X" is intended to mean a chiral agent that induces a helix in a direction opposite to that of the weighted average helical twisting power of the plurality of chiral agents X.

In a case where the chiral agent X alone has no helical twisting power in a state of no light irradiation treatment and has a property of increasing a helical twisting power depending on irradiation with light, the chiral agent XA may not be used in combination therewith.

Liquid Crystal Compound

The type of the liquid crystal compound is not particularly limited.

Generally, liquid crystal compounds can be classified into a rod-like type (rod-like liquid crystal compound) and a disk-like type (discotic liquid crystal compound, disk-like liquid crystal compound) depending on the shape thereof. Further, the rod-like type and the disk-like type are each classified into a low molecular weight type and a high molecular weight type. The high molecular weight generally refers to having a polymerization degree of 100 or more (Polymer Physics-Phase Transition Dynamics, Masao Doi, page 2, Iwanami Shoten, 1992). Any liquid crystal compound can be used in the present invention. In addition, two or more liquid crystal compounds may be used in combination.

The liquid crystal compound may have a polymerizable group. The type of the polymerizable group is not particularly limited, and a functional group capable of addition polymerization reaction is preferable, and a polymerizable ethylenically unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

A liquid crystal compound represented by Formula (I) is suitably used as the liquid crystal compound.

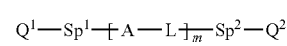

(I)

In the formula,

A represents a phenylene group which may have a substituent or a trans-1,4-cyclohexylene group which may have a substituent, at least one of A's represents a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)

—O—, —OC(=O)—, —OC(=O)O—, —CH=N—N=CH—, —CH=CH—, —C≡C—, —NHC(=O)—, —C(=O)NH—, —CH=N—, —N=CH—, —CH=CH—C(=O)O—, and —OC(=O)—CH=CH—, m represents an integer of 3 to 12, $Sp^1$ and $Sp^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, and $Q^1$ and $Q^2$ each independently represent a hydrogen atom or a polymerizable group selected from the group consisting of groups represented by Formula (Q-1) to Formula (Q-5), provided that one of $Q^1$ and $Q^2$ represents a polymerizable group.

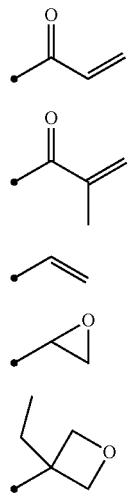

(Q-1)
(Q-2)
(Q-3)
(Q-4)
(Q-5)

A is a phenylene group which may have a substituent or a trans-1,4-cyclohexylene group which may have a substituent. In the present specification, the phenylene group is preferably a 1,4-phenylene group.

At least one of A's is a trans-1,4-cyclohexylene group which may have a substituent.

m pieces of A's may be the same as or different from each other.

m represents an integer of 3 to 12, preferably an integer of 3 to 9, more preferably an integer of 3 to 7, and still more preferably an integer of 3 to 5.

The substituent which the phenylene group and the trans-1,4-cyclohexylene group in Formula (I) may have is not particularly limited, and examples thereof include substituents selected from the group consisting of an alkyl group, a cycloalkyl group, an alkoxy group, an alkyl ether group, an amide group, an amino group, a halogen atom, and a group formed by combining two or more of these substituents. In addition, examples of the substituent include substituents represented by —C(=O)—X$^3$-Sp$^3$-Q$^3$ which will be described later. The phenylene group and the trans-1,4-cyclohexylene group may have 1 to 4 substituents. In a case of having two or more substituents, the two or more substituents may be the same as or different from each other.

In the present specification, the alkyl group may be either linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The explanation of the alkyl group in the alkoxy group is also the same as the explanation on the foregoing alkyl group. In addition, in the present specification, specific examples of the alkylene group in a case of being referred to as an alkylene group include divalent groups obtained by removing one hydrogen atom from each of the foregoing examples of the alkyl group. Examples of the halogen atom include a fluorine atom, a chlorine atom, a bromine atom, and an iodine atom.

In the present specification, the number of carbon atoms in the cycloalkyl group is preferably 3 or more and more preferably 5 or more and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

The substituent which the phenylene group and the trans-1,4-cyclohexylene group may have is preferably a substituent selected from the group consisting of an alkyl group, an alkoxy group, and —C(=O)—X$^3$-Sp$^3$-Q$^3$. Here, X$^3$ represents a single bond, —O—, —S—, or —N(Sp$^4$-Q$^4$)- or represents a nitrogen atom forming a ring structure together with Q$^3$ and Sp$^3$. Sp$^3$ and Sp$^4$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or C(=O)O—.

Q$^3$ and Q$^4$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any polymerizable group selected from the group consisting of groups represented by Formula (Q-1) to Formula (Q-5).

Specific examples of the group where one or two or more —CH$_2$— in a cycloalkyl group is substituted with —O—, —S—, —NH—, —N(CH$_3$)—, —C(=O)—, —OC(=O)—, or C(=O)O— include a tetrahydrofuranyl group, a pyrrolidinyl group, an imidazolidinyl group, a pyrazolidinyl group, a piperidyl group, a piperazinyl group, and a morpholinyl group. Among them, a tetrahydrofuranyl group is preferable, and a 2-tetrahydrofuranyl group is more preferable.

In Formula (I), L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—. L is preferably —C(=O)O— or —OC(=O)—. m pieces of L's may be the same as or different from each other.

Sp$^1$ and Sp$^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—. $Sp^1$ and $Sp^2$ are each independently preferably a linking group formed by combining one or two or more groups selected from the group consisting of a linear alkylene group having 1 to 10 carbon atoms to which a linking group selected from the group consisting of —O—, —OC(=O)—, and —C(=O)O— is bonded to both terminals thereof, —OC(=O)—, —C(=O)O—, —O—, and a linear alkylene group having 1 to 10 carbon atoms, and more preferably a linear alkylene group having 1 to 10 carbon atoms to which —O— is bonded to both terminals thereof.

$Q^1$ and $Q^2$ each independently represent a hydrogen atom or a polymerizable group selected from the group consisting of groups represented by Formula (Q-1) to Formula (Q-5). However, either $Q^1$ or $Q^2$ represents a polymerizable group.

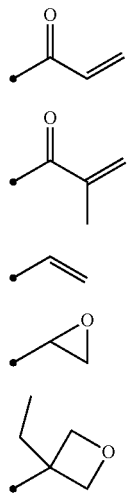

(Q-1)
(Q-2)
(Q-3)
(Q-4)
(Q-5)

The polymerizable group is preferably an acryloyl group (Formula (Q-1)) or a methacryloyl group (Formula (Q-2)).

Specific examples of the liquid crystal compound include a liquid crystal compound represented by Formula (I-11), a liquid crystal compound represented by Formula (I-21), and a liquid crystal compound represented by Formula (I-31). In addition to the foregoing compounds, known compounds such as a compound represented by Formula (I) in JP2013-112631A, a compound represented by Formula (I) in JP2010-070543A, a compound represented by Formula (I) in JP2008-291218A, a compound represented by Formula (I) in JP4725516B, a compound represented by Formula (II) in JP2013-087109A, a compound described in paragraph 0043 of JP2007-176927A, a compound represented by Formula (I-1) in JP2009-286885A, a compound represented by Formula (I) in WO2014/010325A, a compound represented by Formula (I) in JP2016-081035A, and a compound represented by Formulae (2-1) and (2-2) in JP2016-121339A can be mentioned.

A liquid crystal compound represented by Formula (I-11)

In the formula, $R^{11}$ represents a hydrogen atom, a linear or branched alkyl group having 1 to 12 carbon atoms, or —$Z^{12}$—$Sp^{12}$-$Q^{12}$, $L^{11}$ represents a single bond, —C(=O)O—, or —O(C=O)—, $L^{12}$ represents —C(=O)O—, —OC(=O)—, or —CONR²—

$R^2$ represents a hydrogen atom or an alkyl group having 1 to 3 carbon atoms, $Z^{11}$ and $Z^{12}$ each independently represent a single bond, —O—, —NH—, —N(CH₃)—, —S—, —C(=O)O—, —OC(=O)—, —OC(=O)O—, or —C(=O)NR^{12}—, $R^{12}$ represents a hydrogen atom or $Sp^{12}$-$Q^{12}$, $Sp^{11}$ and $Sp^{12}$ each independently represent a single bond, a linear or branched alkylene group having 1 to 12 carbon atoms which may be substituted with $Q^{11}$, or a linking group obtained by substituting one or more —CH₂— in a linear or branched alkylene group having 1 to 12 carbon atoms which may be substituted with $Q^{11}$ with —O—, —S—, —NH—, —N($Q^{11}$)-, or —C(=O)—, $Q^{11}$ represents a hydrogen atom, a cycloalkyl group, a group where one or more —CH₂— in a cycloalkyl group is substituted with —O—, —S—, —NH—, —N(CH₃)—, —C(=O)—, —OC(=O)—, or —C(=O)O—, or a polymerizable group selected from the group consisting of groups represented by Formula (Q-1) to Formula (Q-5), $Q^{12}$ represents a hydrogen atom or a polymerizable group selected from the group consisting of groups represented by Formula (Q-1) to Formula (Q-5), $l^{11}$ represents an integer of 0 to 2,
$m^{11}$ represents an integer of 1 or 2,
$n^{11}$ represents an integer of 1 to 3, and
a plurality of $R^{11}$'s, a plurality of $L^{11}$'s, a plurality of $L^{12}$'s, a plurality of $l^{11}$'s, a plurality of $Z^{11}$'s, a plurality of $Sp^{11}$'s, and a plurality of $Q^{11}$'s may be respectively the same as or different from each other.

In addition, the liquid crystal compound represented by Formula (I-11) contains at least one —$Z^{12}$—$Sp^{12}$-$Q^{12}$ in which $Q^{12}$ is a polymerizable group selected from the group consisting of groups represented by Formula (Q-1) to Formula (Q-5), as $R^{11}$.

In addition, in the liquid crystal compound represented by Formula (I-11), preferred is —$Z^{11}$—$Sp^{11}$-$Q^{11}$ in which $Z^{11}$ is —C(=O)O— or —C(=O)NR^{12}— and $Q^{11}$ is a polymerizable group selected from the group consisting of groups represented by Formula (Q-1) to Formula (Q-5). In addition, in the liquid crystal compound represented by Formula (I-11), $R^{11}$ is preferably —$Z^{12}$—$Sp^{12}$-$Q^{12}$ in which $Z^1$ is —C(=O)O— or —C(=O)NR^{12}—, and $Q^{12}$ is a polymerizable group selected from the group consisting of groups represented by Formula (Q-1) to Formula (Q-5).

Any 1,4-cyclohexylene group contained in the liquid crystal compound represented by Formula (I-11) is a trans-1,4-cyclohexylene group.

A suitable aspect of the liquid crystal compound represented by Formula (I-11) may be, for example, a compound in which $L^{11}$ is a single bond, $l^{11}$ is 1-(a dicyclohexyl group),

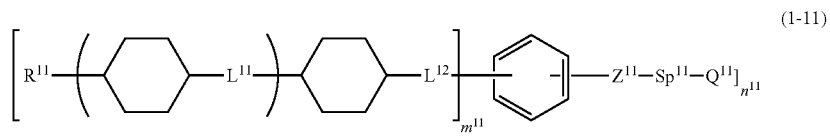

(1-11)

and $Q^{11}$ is a polymerizable group selected from the group consisting of groups represented by Formula (Q-1) to Formula (Q-5).

Another suitable aspect of the liquid crystal compound represented by Formula (I-11) may be, for example, a compound in which $m^{11}$ is 2, $l^{11}$ is 0, and two $R^{11}$'s each represent $-Z^{12}-Sp^{12}-Q^2$, and $Q^{12}$ is a polymerizable group selected from the group consisting of groups represented by Formula (Q-1) to Formula (Q-5).

The liquid crystal compound represented by Formula (I-21)

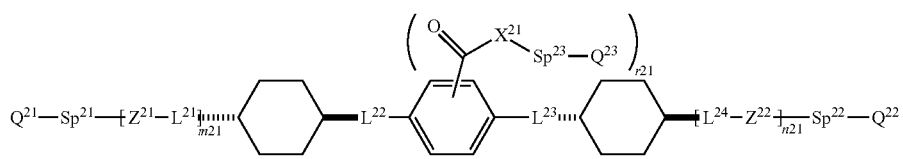

(I-21)

In the formula, $Z^{21}$ and $Z^{22}$ each independently represent a trans-1,4-cyclohexylene group which may have a substituent or a phenylene group which may have a substituent, the above substituents are each independently 1 to 4 substituents selected from the group consisting of $-CO-X^{21}-Sp^{23}-Q^{23}$, an alkyl group, and an alkoxy group, m21 represents an integer of 1 or 2, and n21 represents an integer of 0 or 1, in a case where m21 represents 2, n21 represents 0, in a case where m21 represents 2, two $Z^2$'s may be the same or different, at least one of $Z^2$ or $Z^{22}$ is a phenylene group which may have a substituent, $L^{21}$, $L^{22}$, $L^{23}$, and $L^{24}$ each independently represent a single bond or a linking group selected from the group consisting of $-CH_2O-$, $-OCH_2-$, $-(CH_2)_2OC(=O)-$, $-C(=O)O(CH_2)_2-$, $-C(=O)O-$, $-OC(=O)-$, $-OC(=O)O-$, $-CH=CH-C(=O)O-$, and $-OC(=O)-CH=CH-$, $X^{21}$ represents $-O-$, $-S-$, or $-N(Sp^{25}-Q^{25})-$ or represents a nitrogen atom forming a ring structure together with $Q^{23}$ and $Sp^{23}$, $r^{21}$ represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group where one or two or more $-CH_2-$ in a linear or branched alkylene group having 1 to 20 carbon atoms is substituted with $-O-$, $-S-$, $-NH-$, $-N(CH_3)-$, $-C(=O)-$, $-OC(=O)-$, or $-C(=O)O-$, $Q^{21}$ and $Q^{22}$ each independently represent a polymerizable group selected from the group consisting of groups represented by Formula (Q-1) to Formula (Q-5), $Q^{23}$ represents a hydrogen atom, a cycloalkyl group, a group where one or two or more $-CH_2-$ in a cycloalkyl group is substituted with $-O-$, $-S-$, $-NH-$, $-N(CH_3)-$, $-C(=O)-$, $-OC(=O)-$, or $-C(=O)O-$, any one polymerizable group selected from the group consisting of groups represented by Formula (Q-1) to Formula (Q-5), or a single bond in a case where $X^{21}$ is a nitrogen atom forming a ring structure together with $Q^{23}$ and $Sp^{23}$, and $Q^{25}$ represents a hydrogen atom, a cycloalkyl group, a group where one or two or more $-CH_2-$ in a cycloalkyl group is substituted with $-O-$, $-S-$, $-NH-$, $-N(CH_3)-$, $-C(=O)-$, $-OC(=O)-$, or $-C(=O)O-$, or any one polymerizable group selected from the group consisting of groups represented by Formula (Q-1) to Formula (Q-5), provided that in a case where $Sp^{25}$ is a single bond, $Q^{25}$ is not a hydrogen atom.

It is also preferred that the liquid crystal compound represented by Formula (I-21) has a structure in which a 1,4-phenylene group and a trans-1,4-cyclohexylene group are alternately present. For example, preferred is a structure in which m21 is 2, n21 is 0, and $Z^{21}$ is a trans-1,4-cyclohexylene group which may have a substituent or an arylene group which may have a substituent, each of which from the $Q^{21}$ side, or a structure in which m21 is 1, n21 is 1, $Z^{21}$ is an arylene group which may have a substituent, and $Z^{22}$ is an arylene group which may have a substituent.

A liquid crystal compound represented by Formula (I-31);

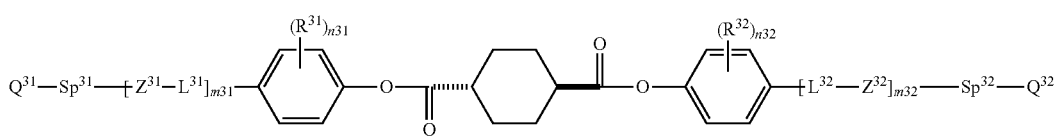

(I-31)

In the formula, $R^{31}$ and $R^{32}$ each independently represent an alkyl group, an alkoxy group, and a group selected from the group consisting of $-C(=O)-X^{31}-Sp^{33}-Q^{33}$, n31 and n32 each independently represent an integer of 0 to 4, $X^{31}$ represents a single bond, $-O-$, $-S-$, or $-N(Sp^{34}-Q^{34})-$ or represents a nitrogen atom forming a ring structure together with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, the above substituents are each independently 1 to 4 substituents selected from the group consisting of an alkyl group, an alkoxy group, and $-C(=O)-X^{31}-Sp^{33}-Q^{33}$, m31 represents an integer of 1 or 2, and m32 represents an integer of 0 to 2, in a case where m31 and m32 represent 2, two $Z^{31}$'s and $Z^{32}$'s may be the same or different, $L^{31}$ and $L^{32}$ each independently represent a single bond or a linking group selected from the group consisting of —CH$_2$O—, —OCH$_2$—, —(CH$_2$)$_2$OC(=O)—, —C(=O)O (CH$_2$)$_2$—, —C(=O)O—, —OC(=O)—, —OC(=O)O—, —CH=CH—C(=O)O—, and —OC(=O)—CH=CH—, $Sp^{31}$, $Sp^{32}$, $Sp^{33}$, and $Sp^{34}$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, $Q^{31}$ and $Q^{32}$ each independently represent a polymerizable group selected from the group consisting of groups represented by Formula (Q-1) to Formula (Q-5), and $Q^{33}$ and $Q^{34}$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any one polymerizable group selected from the group consisting of groups represented by Formula (Q-1) to Formula (Q-5), provided that $Q^{33}$ may represent a single bond in a case of forming a ring structure together with $X^{31}$ and $Sp^{33}$, and $Q^{34}$ is not a hydrogen atom in a case where $Sp^{34}$ is a single bond.

As the liquid crystal compound represented by Formula (I-31), particularly preferable compounds include a compound in which $Z^{32}$ is a phenylene group and a compound in which m32 is 0.

—O—, —S—, or —N(Sp$^4$-Q$^4$)- or represents a nitrogen atom forming a ring structure together with Q$^3$ and Sp$^3$. X$^3$ is preferably a single bond or —O—. R$^1$ and R$^2$ are preferably —C(=O)—X$^3$-Sp$^3$-Q$^3$. In addition, it is also preferred that R$^1$ and R$^2$ are the same. The bonding position of each of R$^1$ and R$^2$ to the phenylene group is not particularly limited.

Sp$^3$ and Sp$^4$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—. Sp$^3$ and Sp$^4$ are each independently preferably a linear or branched alkylene group having 1 to 10 carbon atoms, more preferably a linear alkylene group having 1 to 5 carbon atoms, and still more preferably a linear alkylene group having 1 to 3 carbon atoms. Q$^3$ and Q$^4$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any one polymerizable group selected from the group consisting of groups represented by Formula (Q-1) to Formula (Q-5).

It is also preferred that the compound represented by Formula (I) has, for example, a structure represented by Formula (II-2).

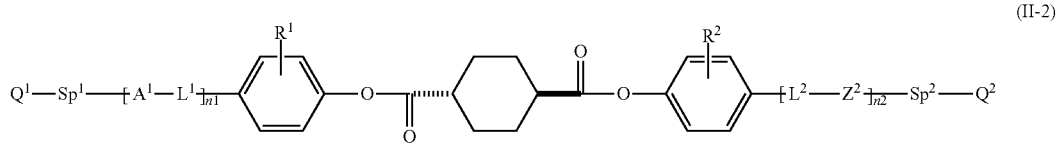

(II-2)

It is also preferred that the compound represented by Formula (I) has a partial structure represented by Formula (II).

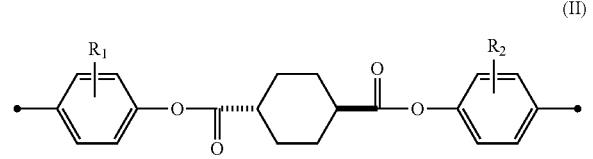

(II)

In Formula (II), black circles indicate the bonding positions with other moieties of Formula (I). It is sufficient that the partial structure represented by Formula (II) is included as a part of the partial structure represented by Formula (III) in Formula (I).

(III)

In the formula, R and R$^2$ are each independently a group selected from the group consisting of a hydrogen atom, an alkyl group, an alkoxy group, and a group represented by —C(=O)—X$^3$-Sp$^3$-Q$^3$. Here, X$^3$ represents a single bond, In the formula, A$^1$ and A$^2$ each independently represent a phenylene group which may have a substituent or a trans-1,4-cyclohexylene group which may have a substituent, and the above substituents are each independently 1 to 4 substituents selected from the group consisting of an alkyl group, an alkoxy group, and —C(=O)—X$^3$-Sp$^3$-Q$^3$, L$^1$, L$^2$, and L$^3$ each represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, and n1 and n2 each independently represent an integer of 0 to 9, and n1+n2 is 9 or less.

Each of Q$^1$, Q$^2$, Sp$^1$, and Sp$^2$ has the same definition as that of each group in Formula (I). Each of X$^3$, Sp$^3$, Q$^3$, R$^1$, and R$^2$ has the same definition as that of each group in Formula (II).

As the liquid crystal compound for use in the present invention, a compound represented by Formula (IV) and described in JP2014-198814A, in particular, a polymerizable liquid crystal compound having one (meth)acrylate group represented by Formula (IV) is also suitably used.

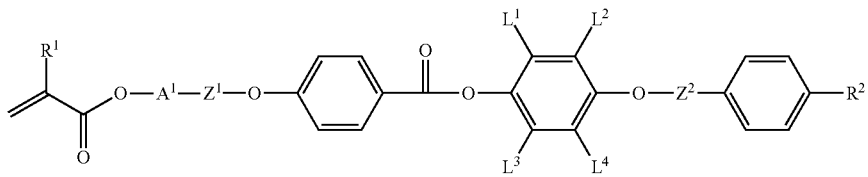

Formula (IV)

In Formula (IV), $A^1$ represents an alkylene group having 2 to 18 carbon atoms, in which one $CH_2$ or two or more non-adjacent $CH_2$'s in the alkylene group may be substituted with —O—;

$Z^1$ represents —C(=O)—, —O—C(=O)—, or a single bond;

$Z^2$ represents —C(=O)— or —C(=O)—CH=CH—;

$R^1$ represents a hydrogen atom or a methyl group;

$R^2$ represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (IV-2); and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^1$, $L^2$, $L^3$, or $L^4$ represents a group other than a hydrogen atom.

—$Z^5$-T-Sp-P  Formula (IV-2)

In Formula (IV-2), P represents an acryloyl group, a methacryl group, or a hydrogen atom, and $Z^5$ represents a single bond, —C(=O)O—, —OC(=O)—, —C(=O)NR$^1$— (where $R^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent, in which one $CH_2$ or two or more non-adjacent $CH_2$'s in the aliphatic group may be substituted with —O—, —S—, —OC(=O)—, —C(=O)O—, or —OC(=O)O—.

The compound represented by Formula (IV) is preferably a compound represented by Formula (V).

In Formula (V), n1 represents an integer of 3 to 6;

$R^{11}$ represents a hydrogen atom or a methyl group;

$Z^{12}$ represents —C(=O)— or —C(=O)—CH=CH—; and $R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

—$Z^{51}$-T-Sp-P  Formula (IV-3)

In Formula (IV-3), P represents an acryloyl group or a methacryl group;

$Z^{51}$ represents —C(=O)O— or —OC(=O)—; T represents 1,4-phenylene; and

Sp represents a divalent aliphatic group having 2 to 6 carbon atoms which may have a substituent. One $CH_2$ or two or more non-adjacent $CH_2$'s in this aliphatic group may be substituted with —O—, —OC(=O)—, —C(=O)O—, or —OC(=O)O—.

n1 represents an integer of 3 to 6, preferably 3 or 4.

$Z^{12}$ represents —C(=O)— or —C(=O)—CH=CH— and preferably represents —C(=O)—.

$R^{12}$ is a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), preferably represents a methyl group, an ethyl group, a propyl group, a methoxy group, an ethoxy group, a phenyl group, an acryloylamino group, a methacryloylamino group, or a group represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

As the liquid crystal compound for use in the present invention, a compound represented by Formula (VI) and described in JP2014-198814A, in particular, a liquid crystal compound having no (meth)acrylate group represented by Formula (VI) is also suitably used.

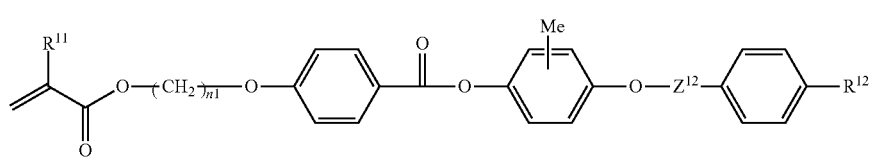

Formula (V)

Formula (VI)

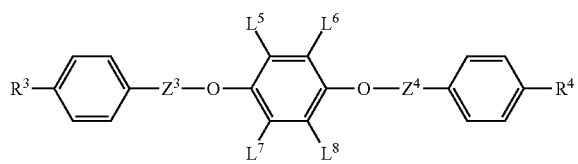

In Formula (VI), $Z^3$ represents —C(=O)— or —CH=CH—C(=O)—;

$Z^4$ represents —C(=O)— or —C(=O)—CH=CH—;

$R^3$ and $R^4$ each independently represent a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (VI-2); and $L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^5$, $L^6$, $L^7$, or $L^8$ represents a group other than a hydrogen atom.

—$Z^5$-T-Sp-P     Formula (VI-2)

In Formula (VI-2), P represents an acryloyl group, a methacryl group, or a hydrogen atom, $Z^5$ represents —C(=O)O—, —OC(=O)—, —C(=O)NR$^1$— (where $R^1$ represents a hydrogen atom or a methyl group), —NRC(=O)—, —C(=O)S—, or —SC(=O)—, T represents 1,4-phenylene, and Sp represents a divalent aliphatic group having 1 to 12 carbon atoms which may have a substituent. However, one CH$_2$ or two or more non-adjacent CH$_2$'s in this aliphatic group may be substituted with —O—, —S—, —OC(=O)—, —C(=O)O—, or —OC(=O)O—.

The compound represented by Formula (VI) is preferably a compound represented by Formula (VII).

Formula (VII)

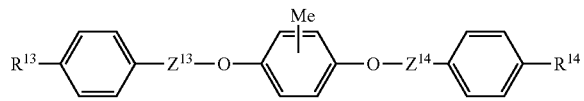

In Formula (VII), $Z^{13}$ represents —C(=O)— or —C(=O)—CH=CH—;

$Z^{14}$ represents —C(=O)— or —CH=CH—C(=O)—; and $R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

$Z^{13}$ represents —C(=O)— or —C(=O)—CH=CH— and is preferably —C(=O)—.

$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3), preferably represents a methyl group, an ethyl group, a propyl group, a methoxy group, an ethoxy group, a phenyl group, an acryloylamino group, a methacryloylamino group, or a structure represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

As the liquid crystal compound for use in the present invention, a compound represented by Formula (VIII) and described in JP2014-198814A, in particular, a polymerizable liquid crystal compound having two (meth)acrylate groups represented by Formula (VIII) is also suitably used.

Formula (VIII)

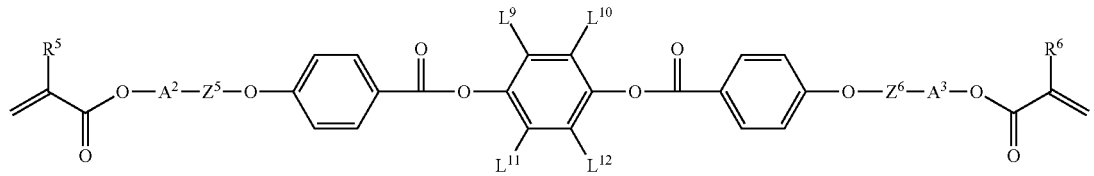

In Formula (VIII), $A^2$ and $A^3$ each independently represent an alkylene group having 2 to 18 carbon atoms, and one CH$_2$ or two or more non-adjacent CH$_2$'s in the alkylene group may be substituted with —O—;

$Z^5$ represents —C(=O)—, —OC(=O)—, or a single bond;

$Z^6$ represents —C(=O)—, —C(=O)O—, or a single bond;

$R^5$ and $R^6$ each independently represent a hydrogen atom or a methyl group; and $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^9$, $L^{10}$, $L^{11}$, or $L^{12}$ represents a group other than a hydrogen atom.

The compound represented by Formula (VIII) is preferably a compound represented by Formula (IX).

Formula (IX)

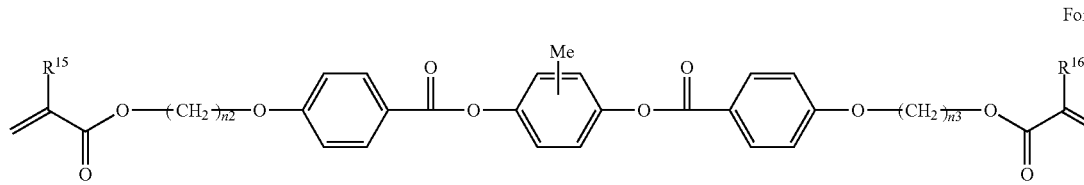

In Formula (IX), n2 and n3 each independently represent an integer of 3 to 6; and $R^{15}$ and $R^{16}$ each independently represent a hydrogen atom or a methyl group.

In Formula (IX), it is preferred that n2 and n3 each independently represent an integer of 3 to 6, and n2 and n3 are 4.

In Formula (IX), it is preferred that $R^{15}$ and $R^{16}$ each independently represent a hydrogen atom or a methyl group, and $R^{15}$ and $R^{16}$ each represent a hydrogen atom.

Such liquid crystal compounds can be produced by a known method.

In order to obtain a composition layer satisfying the above condition 1 and the above condition 2, it is preferable to use a liquid crystal compound having a large pre-tilt angle at the interface.

Chiral Agent X Having Helical Twisting Power Changed Depending on Irradiation with Light The chiral agent X is a compound that induces a helix of a liquid crystal compound, and is not particularly limited as long as it is a chiral agent having a helical twisting power (HTP) changed depending on irradiation with light.

In addition, the chiral agent X may be liquid crystalline or non-liquid crystalline. The chiral agent X generally contains an asymmetric carbon atom. However, an axial asymmetric compound or planar asymmetric compound not containing an asymmetric carbon atom can also be used as the chiral agent X. The chiral agent X may have a polymerizable group.

The chiral agent X may be, for example, a so-called photoreactive chiral agent. The photoreactive chiral agent is a compound which has a chiral moiety and a photoreactive moiety that undergoes a structural change upon irradiation with light, and greatly changes the twisting power of the liquid crystal compound in accordance with the light irradiation amount, for example.

Examples of the photoreactive moiety that undergoes a structural change upon irradiation with light include photochromic compounds (written by Kingo Uchida and Masahiro Irie, Chemical Industry, Vol. 64, p. 640, 1999, and written by Kingo Uchida and Masahiro Irie, Fine Chemical, Vol. 28(9), p. 15, 1999). In addition, the structural change means decomposition, addition, isomerization, dimerization, or the like caused upon irradiation with light to the photoreactive moiety, and the structural change may be irreversible. In addition, the chiral moiety corresponds to an asymmetric carbon described in Chemistry of Liquid Crystal, No. 22, Hiroyuki Nohira, Chemistry Review, p. 73, 1994.

Examples of the photoreactive chiral agent include photoreactive chiral agents described in paragraphs 0044 to 0047 of JP2001-159709A, optically active compounds described in paragraphs 0019 to 0043 of JP2002-179669A, optically active compounds described in paragraphs 0020 to 0044 of JP2002-179633A, optically active compounds described in paragraphs 0016 to 0040 of JP2002-179670A, optically active compounds described in paragraphs 0017 to 0050 of JP2002-179668A, optically active compounds described in paragraphs 0018 to 0044 of JP2002-180051A, optically active compounds described in paragraphs 0016 to 0055 of JP2002-338575A, and optically active compounds in paragraphs 0020 to 0049 of JP2002-179682A.

Above all, a compound having at least one photoisomerization moiety is preferable as the chiral agent X. From the viewpoint that absorption of visible light is small, photoisomerization easily occurs, and the helical twisting power difference before and after light irradiation is large, the photoisomerization moiety is preferably a cinnamoyl moiety, a chalcone moiety, an azobenzene moiety, a stilbene moiety, or a coumarin moiety, and more preferably a cinnamoyl moiety or a chalcone moiety. In addition, the photoisomerization moiety corresponds to the above-mentioned photoreactive moiety that undergoes a structural change upon irradiation with light.

In addition, from the viewpoint that the helical twisting power difference before and after light irradiation is large, the chiral agent X is preferably an isosorbide-based optically active compound, an isomannide-based optical compound, or a binaphthol-based optically active compound. That is, the chiral agent X preferably has an isosorbide skeleton, an isomannide skeleton, or a binaphthol skeleton as the chiral moiety. Above all, from the viewpoint of a larger helical twisting power difference before and after light irradiation, the chiral agent X is more preferably an isosorbide-based optically active compound or a binaphthol-based optically active compound, and still more preferably an isosorbide-based optically active compound.

Since the helical pitch of the cholesteric liquid crystalline phase depends on the type of the chiral agent X and the addition concentration thereof, a desired pitch can be obtained by adjusting these factors.

The chiral agent X may be used alone or in combination of two or more thereof.

The total content of the chiral agent in the composition X (the total content of all chiral agents in the composition X) is preferably 2.0% by mass or more and more preferably 3.0% by mass or more with respect to the total mass of the liquid crystal compound. In addition, from the viewpoint of suppressing the haze of the cholesteric liquid crystal layer, the upper limit of the total content of the chiral agent in the composition X is preferably 15.0% by mass or less and more preferably 12.0% by mass or less with respect to the total mass of the liquid crystal compound.

Optional Components

The composition X may include components other than the liquid crystal compound and the chiral agent X.

Chiral Agent XA

The chiral agent XA is preferably a chiral agent which is a compound that induces a helix of a liquid crystal compound and has a helical twisting power (HTP) that is not changed depending on irradiation with light.

In addition, the chiral agent XA may be liquid crystalline or non-liquid crystalline. The chiral agent XA generally contains an asymmetric carbon atom. However, an axial asymmetric compound or planar asymmetric compound not containing an asymmetric carbon atom can also be used as the chiral agent XA. The chiral agent XA may have a polymerizable group.

A known chiral agent can be used as the chiral agent XA.

In a case where the liquid crystal composition includes one type of the chiral agent X alone and the chiral agent X has a helical twisting power exceeding a predetermined range (for example, 0.0 to 1.9 µm$^{-1}$) in a state of no light irradiation treatment, the chiral agent XA is preferably a chiral agent that induces a helix in a direction opposite to that of the above-mentioned chiral agent X. That is, for example, in a case where the helix induced by the chiral agent X is right-handed, the helix induced by the chiral agent XA is left-handed.

In addition, in a case where the liquid crystal composition includes a plurality of chiral agents X as the chiral agent and then the weighted average helical twisting power thereof exceeds the above-mentioned predetermined range in a state of no light irradiation treatment, the chiral agent XA is preferably a chiral agent that induces a helix in a direction opposite to that of the above-mentioned weighted average helical twisting power.

Polymerization Initiator

The composition X may include a polymerization initiator. In particular, in a case where the liquid crystal compound has a polymerizable group, the composition X preferably includes a polymerization initiator.

Examples of the polymerization initiator include those similar to the polymerization initiator that may be contained in the liquid crystal layer. The polymerization initiator that may be contained in the liquid crystal layer is as described above.

The content of the polymerization initiator in the composition X (the total amount of polymerization initiators in a case where a plurality of polymerization initiators are included) is not particularly limited, but it is preferably 0.1% to 20% by mass and more preferably 1.0% to 8.0% by mass with respect to the total mass of the liquid crystal compound.

Surfactant

The composition X may include a surfactant that can be unevenly distributed on the surface of the composition layer on the tilt alignment surface 102a side and/or the surface of the composition layer opposite to the tilt alignment surface 102a.

In a case where an alignment control agent contains a surfactant in the composition X, a composition layer satisfying the above condition 1 or the above condition 2 is easily obtained, and therefore stable or rapid formation of a cholesteric liquid crystalline phase is possible.

Examples of the surfactant include those similar to the surfactant that may be contained in the liquid crystal layer. The surfactant that may be contained in the liquid crystal layer is as described above.

Above all, the composition X preferably includes a surfactant (for example, an onium salt compound (as described in JP2012-208397A)) capable of controlling the tilt angle (see FIG. 10) of the molecular axis $L_1$ of the liquid crystal compound 14 with respect to the tilt alignment surface 102a on the tilt alignment surface 102a side surface in the composition layer formed in the step 2X-1, and a surfactant (for example, a polymer having a perfluoroalkyl group in the side chain thereof) capable of controlling the tilt angle (see FIG. 10) of the molecular axis $L_1$ of the liquid crystal compound 14 with respect to the tilt alignment surface 102a on the surface opposite to the tilt alignment surface 102a side. In addition, in a case where the composition X includes the above-mentioned surfactant, the obtained cholesteric liquid crystal layer also has an advantage that the haze is small.

The surfactants may be used alone or in combination of two or more thereof.

The content of the surfactant in the composition X (the total amount of surfactants in a case where a plurality of surfactants are included) is not particularly limited, but it is preferably 0.01% to 10% by mass, more preferably 0.01% to 5.0% by mass, and still more preferably 0.01% to 2.0% by mass with respect to the total mass of the liquid crystal compound.

Solvent

The composition X may include a solvent.

Examples of the solvent include those similar to the solvent that may be contained in the liquid crystal layer. The solvent that may be contained in the liquid crystal layer is as described above.

Other Additives

The composition may contain one or two or more other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a surface-active substance, a dispersant, and a color material such as a dye and a pigment.

It is preferable that one or more of the compounds constituting the composition X are compounds having a plurality of polymerizable groups (polyfunctional compound). Further, the total content of the compounds having a plurality of polymerizable groups in the composition X is preferably 80% by mass or more with respect to the total solid content in the composition X. The solid content is a component that forms the cholesteric liquid crystal layer and does not include a solvent.

By making 80% by mass or more of the total solid content in the composition X a compound having a plurality of polymerizable groups, it is preferable in that the structure of the cholesteric liquid crystalline phase can be firmly fixed and durability can be imparted.

The compound having a plurality of polymerizable groups is a compound having two or more immobilizable groups in one molecule. In the present invention, the polyfunctional compound included in the composition X may or may not have liquid crystallinity.

<<<<Procedure of Step 2X-1>>>>

The step 2X-1 preferably includes the following step 2X-1-1 and the following step 2X-1-2.

Step 2X-1-1: a step of bringing the composition X into contact with the liquid crystal layer to form a coating film on the liquid crystal layer Step 2X-1-2: a step of heating the coating film to form a composition layer satisfying the above condition 1 or the above condition 2

Step 2X-1-1: Coating Film Forming Step

In the step 2X-1-1, the composition X described above is first applied onto a liquid crystal layer. The application method is not particularly limited, and examples thereof include a wire bar coating method, an extrusion coating method, a direct gravure coating method, a reverse gravure coating method, and a die-coating method. Prior to application of the composition X, a known rubbing treatment may be applied to the liquid crystal layer.

If necessary, a treatment for drying the coating film applied onto the liquid crystal layer may be carried out after application of the composition X. By carrying out the drying treatment, the solvent can be removed from the coating film.

The film thickness of the coating film is not particularly limited, but is preferably 0.1 to m, more preferably 0.2 to 15 m, and still more preferably 0.5 to 10 µm from the viewpoint of more excellent reflection anisotropy and haze of the cholesteric liquid crystal layer.

Step 2X-1-2: Composition Layer Forming Step

The liquid crystal phase transition temperature of the composition X is preferably in a range of 10° C. to 250° C. and more preferably in a range of 10° C. to 150° C., from the viewpoint of manufacturing suitability.

As to preferred heating conditions, it is preferable to heat the composition layer at 40° C. to 100° C. (preferably 60° C. to 100° C.) for 0.5 to 5 minutes (preferably 0.5 to 2 minutes).

In a case of heating the composition layer, it is preferable not to heat the composition layer to a temperature at which the liquid crystal compound is in an isotropic phase (Iso). In a case where the composition layer is heated above the temperature at which the liquid crystal compound is in an isotropic phase, the number of defects in the tilt-aligned liquid crystal phase or the hybrid-aligned liquid crystal phase increases, which is not preferable.

A composition layer satisfying the above condition 1 or the above condition 2 can be obtained by the step 2X-1-2.

In order to make the liquid crystal compound tilt-aligned or hybrid-aligned, it is effective to give a pre-tilt angle to the interface, and specifically, the following method can be mentioned for this purpose.

(1) An alignment control agent that is unevenly distributed at the air interface and/or the liquid crystal layer interface and controls the alignment of the liquid crystal compound is added to the composition X.

(2) A liquid crystalline compound having a large pre-tilt angle at the interface is added to the composition X as the liquid crystal compound.

<<Step 2X-2>>

The step 2X-2 is a step in which the composition layer obtained in the 2X-1 is subjected to a light irradiation treatment to change the helical twisting power of the chiral agent X, and the liquid crystal compound in the composition layer is cholesterically aligned to form a cholesteric liquid crystal layer.

By dividing a light irradiation region into a plurality of domains and adjusting a light irradiation amount for each domain, a region having a different helical pitch (a region having a different selective reflection wavelength) can be formed.

The irradiation intensity of the light irradiation in the step 2X-2 is not particularly limited and can be appropriately determined based on the helical twisting power of the chiral agent X. In general, the irradiation intensity of light irradiation in the step 2X-2 is preferably about 0.1 to 200 mW/cm$^2$. In addition, the time for light irradiation is not particularly limited, but may be appropriately determined from the viewpoint of both sufficient strength and productivity of the layer to be obtained.

In addition, the temperature of the composition layer at the time of light irradiation is, for example, 0° C. to 100° C., and preferably 10° C. to 60° C.

The light used for the light irradiation is not particularly limited as long as it is an actinic ray or radiation that changes the helical twisting power of the chiral agent X, which refers to, for example, an emission line spectrum of a mercury lamp, far ultraviolet rays represented by an excimer laser, extreme ultraviolet rays (EUV light), X-rays, ultraviolet rays, and electron beams (EB). Of these, ultraviolet rays are preferable.

Here, in the method for producing a cholesteric liquid crystal layer according to the embodiment of the present invention, in a case where the composition layer is exposed to wind, the surface state of the cholesteric liquid crystal layer to be formed may be uneven. Considering this point, in the method for producing a cholesteric liquid crystal layer according to the embodiment of the present invention, it is preferable that the wind speed of the environment to which the composition layer is exposed is low in all steps of the step 2X. Specifically, in the method for producing a cholesteric liquid crystal layer according to the embodiment of the present invention, the wind speed of the environment to which the composition layer is exposed is preferably 1 m/s or less in all steps of the step 2X.

<<Curing Treatment>>

In addition, in a case where the liquid crystal compound has a polymerizable group, it is preferable to carry out a curing treatment on the composition layer. Examples of the procedure for carrying out the curing treatment on the composition layer include the following (1) and (2).

There is further included a step 3X of (1) carrying out a curing treatment for fixing a cholesteric alignment state at the time of the step 2X-2 to form a cholesteric liquid crystal layer in which the cholesteric alignment state is fixed (that is, the curing treatment is carried out simultaneously with the step 2X-2), or (2) carrying out a curing treatment for fixing a cholesteric alignment state after the step 2X-2 to form a cholesteric liquid crystal layer in which the cholesteric alignment state is fixed.

That is, the cholesteric liquid crystal layer obtained by carrying out the curing treatment corresponds to a layer formed by fixing the cholesteric liquid crystalline phase.

Here, as the state where the cholesteric liquid crystalline phase is "fixed", the most typical and preferred aspect is a state in which the alignment of the liquid crystal compound brought into a cholesteric liquid crystalline phase is retained. The state where the liquid crystalline phase is "fixed" is not limited thereto, and specifically, it refers to a state in which, in a temperature range of usually 0° C. to 50° C. and in a temperature range of −30° C. to 70° C. under more severe conditions, this layer has no fluidity and can keep a fixed alignment state stably without causing changes in alignment state due to external field or external force. In the present invention, as will be described later, it is preferable to fix the alignment state of a cholesteric liquid crystalline phase by a curing reaction proceeding upon irradiation with ultraviolet rays.

In the layer obtained by fixing a cholesteric liquid crystalline phase, it is sufficient that the optical properties of the cholesteric liquid crystalline phase are retained in the layer, and finally the composition in the layer no longer needs to show liquid crystallinity.

The method of the curing treatment is not particularly limited, and examples thereof include a photo curing treatment and a thermal curing treatment. Among them, a light irradiation treatment is preferable, and an ultraviolet irradiation treatment is more preferable.

In addition, as described above, the liquid crystal compound is preferably a liquid crystal compound having a polymerizable group. In a case where the liquid crystal compound has a polymerizable group, the curing treatment is preferably a polymerization reaction upon irradiation with light (particularly ultraviolet irradiation), and more preferably a radical polymerization reaction upon irradiation with light (particularly ultraviolet irradiation).

For ultraviolet irradiation, a light source such as an ultraviolet lamp is used.

The irradiation energy amount of ultraviolet rays is not particularly limited, but it is generally preferably about 100 to 800 mJ/cm$^2$. The irradiation time of the ultraviolet rays is not particularly limited, but it may be determined as appropriate from the viewpoint of both sufficient strength and productivity of the obtained layer.

(Aspect Using Liquid Crystal Composition Including Chiral Agent Y)

Hereinafter, a method for producing a cholesteric liquid crystal layer using a liquid crystal composition including a chiral agent Y (hereinafter, also referred to as "step 2Y") will be described.

The production method 2Y includes at least the following step 2Y-1 and step 2Y-2.

Step 2Y-1: a step of forming a composition layer satisfying the following condition 1 or the following condition 2 on the liquid crystal layer, using a liquid crystal composition including a chiral agent Y and a liquid crystal compound Step 2Y-2: a step of subjecting the composition layer to a cooling treatment or a heating treatment to result in cholesteric alignment of the liquid crystal compound in the composition layer, thereby forming a cholesteric liquid crystal layer Condition 1: at least a part of the liquid crystal compound in the composition layer is tilt-aligned with respect to a surface of the composition layer Condition 2: the liquid crystal compound is aligned such that a tilt angle of the liquid crystal compound in the composition layer continuously changes along a thickness direction In addition, in a case where the liquid crystal compound has a polymerizable group, in the step 2Y, it is preferable to carry out a curing treatment on the composition layer, as will be described later.

Hereinafter, the materials used in each step and the procedure of each step will be described in detail.

<<Step 2Y-1>>

The step 2Y-1 is a step of forming a composition layer satisfying the above condition 1 or the above condition 2 on a liquid crystal layer, using a liquid crystal composition including a chiral agent Y and a liquid crystal compound (hereinafter, also referred to as "composition Y").

The step 2Y-1 has the same step procedure as that of the step 2X-1 described above except that the composition Y is used in place of the composition X, and thus the description thereof will be omitted.

<<<<Composition Y>>>>

The composition Y includes a liquid crystal compound and a chiral agent Y having a helical twisting power changed depending on a change of temperature. Hereinafter, each component will be described.

As described above, the absolute value of the weighted average helical twisting power of the chiral agent in the composition layer is, for example, 0.0 to 1.9 μm$^{-1}$, preferably 0.0 to 1.5 μm$^{-1}$, more preferably 0.0 to 0.5 μm$^{-1}$, and particularly preferably zero, from the viewpoint of easy formation of the composition layer at the temperature $T_{11}$ at which an alignment treatment of a liquid crystal compound for forming a composition layer satisfying the above condition 1 or the above condition 2 in the step 2Y-1 is carried out. Therefore, in a case where the chiral agent Y has a helical twisting power exceeding the above-mentioned predetermined range at the temperature $T_{11}$, it is preferable that the composition Y includes a chiral agent that induces a helix in a direction opposite to that of the chiral agent Y (hereinafter, also referred to as "chiral agent YA") at the temperature $T_{11}$, and the helical twisting power of the chiral agent Y is offset to almost zero in the step 2Y-1 (that is, the weighted average helical twisting power of the chiral agent in the composition layer is set to the above predetermined range). In addition, it is preferable that the chiral agent YA has no change in the helical twisting power depending on a change of temperature.

In addition, in a case where the liquid crystal composition includes a plurality of chiral agents Y as the chiral agent and then in a case where the weighted average helical twisting power of the plurality of chiral agents Y is a helical twisting power outside the above-mentioned predetermined range at the temperature $T_{11}$, "another chiral agent YA that induces a helix in a direction opposite to that of the chiral agent Y" is intended to mean a chiral agent that induces a helix in a direction opposite to that of the weighted average helical twisting power of the plurality of chiral agents Y.

In a case where the chiral agent Y alone has no helical twisting power at the temperature $T_{11}$ and has a property of increasing a helical twisting power depending on a change of temperature, the chiral agent YA may not be used in combination therewith.

Hereinafter, various materials included in the composition Y will be described. Of the materials included in the composition Y, the components other than the chiral agent are the same as the materials included in the composition X, and thus the description thereof will be omitted.

Chiral Agent Y Having Helical Twisting Power Changed Depending on Cooling or Heating The chiral agent Y is a compound that induces a helix of a liquid crystal compound, and is not particularly limited as long as it is a chiral agent having a helical twisting power that is increased depending on cooling or heating. The term "cooling or heating" as used herein means a cooling treatment or heating treatment which is carried out in the step 2Y-1. In addition, the upper limit of the cooling or heating temperature is usually about ±150° C. (in other words, a chiral agent whose helical twisting power is increased depending on cooling or heating within ±150° C. is preferable). Above all, a chiral agent whose helical twisting power is increased depending on cooling is preferable.

The chiral agent Y may be liquid crystalline or non-liquid crystalline. The chiral agent can be selected from various known chiral agents (for example, chiral agents described in Liquid Crystal Device Handbook, Chap. 3, Item 4-3, Chiral Agents for Twisted Nematic (TN) and Super Twisted Nematic (STN), p. 199, edited by the 142nd Committee of the Japan Society for the Promotion of Science, 1989). The chiral agent Y generally contains an asymmetric carbon atom. However, an axial asymmetric compound or planar asymmetric compound not containing an asymmetric carbon atom can also be used as the chiral agent Y. Examples of the axial asymmetric compound or planar asymmetric compound include binaphthyl, helicene, paracyclophane, and derivatives thereof. The chiral agent Y may have a polymerizable group.

Above all, from the viewpoint that the difference in the helical twisting power after a change of temperature is large, the chiral agent Y is preferably an isosorbide-based optically active compound, an isomannide-based optically active compound, or a binaphthol-based optically active compound, and more preferably a binaphthol-based optically active compound.

The total content of the chiral agent in the composition Y (the total content of all chiral agents in the composition Y) is preferably 2.0% by mass or more and more preferably 3.0% by mass or more with respect to the total mass of the liquid crystal compound. In addition, from the viewpoint of suppressing the haze of the cholesteric liquid crystal layer, the upper limit of the total content of the chiral agent in the composition Y is preferably 15.0% by mass or less and more preferably 12.0% by mass or less with respect to the total mass of the liquid crystal compound.

A smaller amount of the chiral agent Y used is preferred because it tends not to affect the liquid crystallinity. Therefore, the chiral agent Y is preferably a compound having a strong twisting power in order that the compound could achieve desired twisted alignment of a helical pitch even in a case where the amount thereof used is small.

Chiral Agent YA

The chiral agent YA is preferably a chiral agent which is a compound that induces a helix of a liquid crystal compound and has a helical twisting power (HTP) that is not changed depending on a change of temperature.

In addition, the chiral agent YA may be liquid crystalline or non-liquid crystalline. The chiral agent YA generally contains an asymmetric carbon atom. However, an axial asymmetric compound or planar asymmetric compound not containing an asymmetric carbon atom can also be used as the chiral agent YA. The chiral agent YA may have a polymerizable group.

A known chiral agent can be used as the chiral agent YA.

In a case where the liquid crystal composition includes one type of the chiral agent Y alone and the chiral agent Y has a helical twisting power exceeding a predetermined range (for example, 0.0 to 1.9 $\mu m^{-1}$) at the temperature $T_{11}$, the chiral agent YA is preferably a chiral agent that induces a helix in a direction opposite to that of the above-mentioned chiral agent Y. That is, for example, in a case where the helix induced by the chiral agent Y is right-handed, the helix induced by the chiral agent YA is left-handed.

In addition, in a case where the liquid crystal composition includes a plurality of chiral agents Y as the chiral agent and then the weighted average helical twisting power of the plurality of chiral agents Y exceeds the above-mentioned predetermined range at the temperature $T_{11}$, the chiral agent YA is preferably a chiral agent that induces a helix in a direction opposite to that of the above-mentioned weighted average helical twisting power.

<<Step 2Y-2>>

The step 2Y-2 is a step in which the composition layer obtained in the step 2Y-1 is subjected to a cooling treatment or a heating treatment to change the helical twisting power of the chiral agent Y, and the liquid crystal compound in the composition layer is cholesterically aligned to form a cholesteric liquid crystal layer. Above all, it is preferable to cool the composition layer in the present step.

In a case where the composition layer is cooled, it is preferable to cool the composition layer such that the temperature of the composition layer is lowered by 30° C. or more, from the viewpoint that the reflection anisotropy of the cholesteric liquid crystal layer is more excellent. Above all, from the viewpoint that the above effect is more excellent, it is preferable to cool the composition layer such that the temperature of the composition layer is lowered by 40° C. or more, and it is more preferable to cool the composition layer such that the temperature of the composition layer is lowered by 50° C. or more. The upper limit value of the reduced temperature range of the cooling treatment is not particularly limited, but is usually about 150° C.

In addition, in other words, the cooling treatment is intended to cool the composition layer such that the temperature of the composition layer becomes T–30° C. or lower, in a case where the temperature of the composition layer satisfying the above condition 1 or the above condition 2 obtained in the step 1 before cooling of the composition layer is T° C. (that is, $T_{12} \leq T_{11} - 30$° C. in a case of an aspect shown in FIG. 13).

The cooling method is not particularly limited and may be, for example, a method in which a liquid crystal layer on which the composition layer is arranged is allowed to stand in an atmosphere of a predetermined temperature.

Although there is no limitation on the cooling rate in the cooling treatment, it is preferable to set the cooling rate to a certain rate from the viewpoint that the reflection anisotropy of the cholesteric liquid crystal layer is more excellent.

Specifically, the maximum value of the cooling rate in the cooling treatment is preferably 1° C. or more per second, more preferably 2° C. or more per second, and still more preferably 3C or more per second. The upper limit of the cooling rate is not particularly limited and is often 10° C. or less per second.

Here, in the method for producing a cholesteric liquid crystal layer according to the embodiment of the present invention, in a case where the composition layer is exposed to wind, the surface state of the cholesteric liquid crystal layer to be formed may be uneven. Considering this point, in the method for producing a cholesteric liquid crystal layer according to the embodiment of the present invention, it is preferable that the wind speed of the environment to which the composition layer is exposed is low in all steps of the step 2Y. Specifically, in the method for producing a cholesteric liquid crystal layer according to the embodiment of the present invention, the wind speed of the environment to which the composition layer is exposed is preferably 1 m/s or less in all steps of the step 2Y.

In a case where the composition layer is heated, the upper limit value of the increased temperature range of the heating treatment is not particularly limited, but is usually about 150° C.

<<Curing Treatment>>

In addition, in a case where the liquid crystal compound has a polymerizable group, it is preferable to carry out a curing treatment on the composition layer. The procedure for carrying out the curing treatment on the composition layer is the same as in the method described in the production method 2X, and a suitable aspect thereof is also the same.

Here, in a case of producing a cholesteric liquid crystal layer having two or more types of regions having different arrangement axis directions as shown in FIG. 16, it is preferable that the step 1 includes an alignment treatment step of carrying out at least one of rubbing alignment or photo alignment on a base material for forming a liquid crystal layer on the surface thereof, and in the alignment treatment step, the alignment treatment is carried out such that the alignment direction is different for each predetermined region in the plane.

For example, in a case of producing a cholesteric liquid crystal layer having two types of regions having different arrangement axis directions in a stripe shape as shown in FIG. 16, a rubbing alignment film and a photo alignment film each having a different alignment direction may be formed in the step 1.

Specifically, first, a rubbing alignment film is formed on the substrate. At that time, the rubbing direction is made to coincide with the direction of the arrangement axis $D_4$ of the region $A_4$.

Next, a photo alignment material is applied onto the rubbing alignment film to form a coating layer. Next, the region corresponding to the region $A_4$ is masked and the region corresponding to the region $A_3$ of the coating layer is irradiated with polarized light or non-polarized light. The alignment direction of the region irradiated with light is made to coincide with the direction of the arrangement axis $D_3$ of the region $A_3$.

The rubbing alignment film and the photo alignment film can be produced by known materials and methods.

Thereby, the rubbing alignment film and the photo alignment film each having a different alignment direction can be formed.

After that, the liquid crystal layer is formed using a composition including a disk-like liquid crystal compound by carrying out the above-mentioned step 1-1 and step 1-2, and then in a case where the above-mentioned step 2 is carried out, it is possible to form a cholesteric liquid crystal layer in which the direction of the arrangement axis is different depending on the region.

In the above-mentioned example, both the rubbing alignment and the photo alignment are carried out, but the present invention is not limited thereto. For example, it may be configured such that the rubbing treatment is carried out in different directions for each region. Alternatively, it may be configured such that a photo alignment material is used and a polarization state or the like of the light irradiated to each region is changed to carry out the alignment treatment in different directions for each region.

As another embodiment of the method for producing a cholesteric liquid crystal layer according to the embodiment of the present invention, there is a method for producing a cholesteric liquid crystal layer in which a cholesteric liquid crystal layer is laminated on the above-mentioned cholesteric liquid crystal layer or a cholesteric liquid crystal layer included in a laminate which will be described later (method for producing a laminate).

In a case where a composition layer containing a liquid crystal compound is formed on the cholesteric liquid crystal layer according to the embodiment of the present invention, the liquid crystal compound in the composition layer is tilt-aligned in alignment with the tilted alignment of the liquid crystal composition in the cholesteric liquid crystal layer. Therefore, the liquid crystal compound in the composition layer formed on the cholesteric liquid crystal layer is subjected to a cholesteric alignment treatment to form a cholesteric liquid crystal layer, whereby the cholesteric liquid crystal layer according to the embodiment of the present invention can be formed on the cholesteric liquid crystal layer.

The composition and the like of the composition in a case where a composition layer containing a liquid crystal compound is formed on the cholesteric liquid crystal layer according to the embodiment of the present invention to form a new cholesteric liquid crystal layer are the same as those for the above-mentioned liquid crystal composition.

[Laminate]

Hereinafter, the laminate according to the embodiment of the present invention will be described.

The laminate according to the embodiment of the present invention includes a liquid crystal layer formed using a disk-like liquid crystal compound, and the above-mentioned cholesteric liquid crystal layer arranged to be in contact with the liquid crystal layer.

Figure 15:
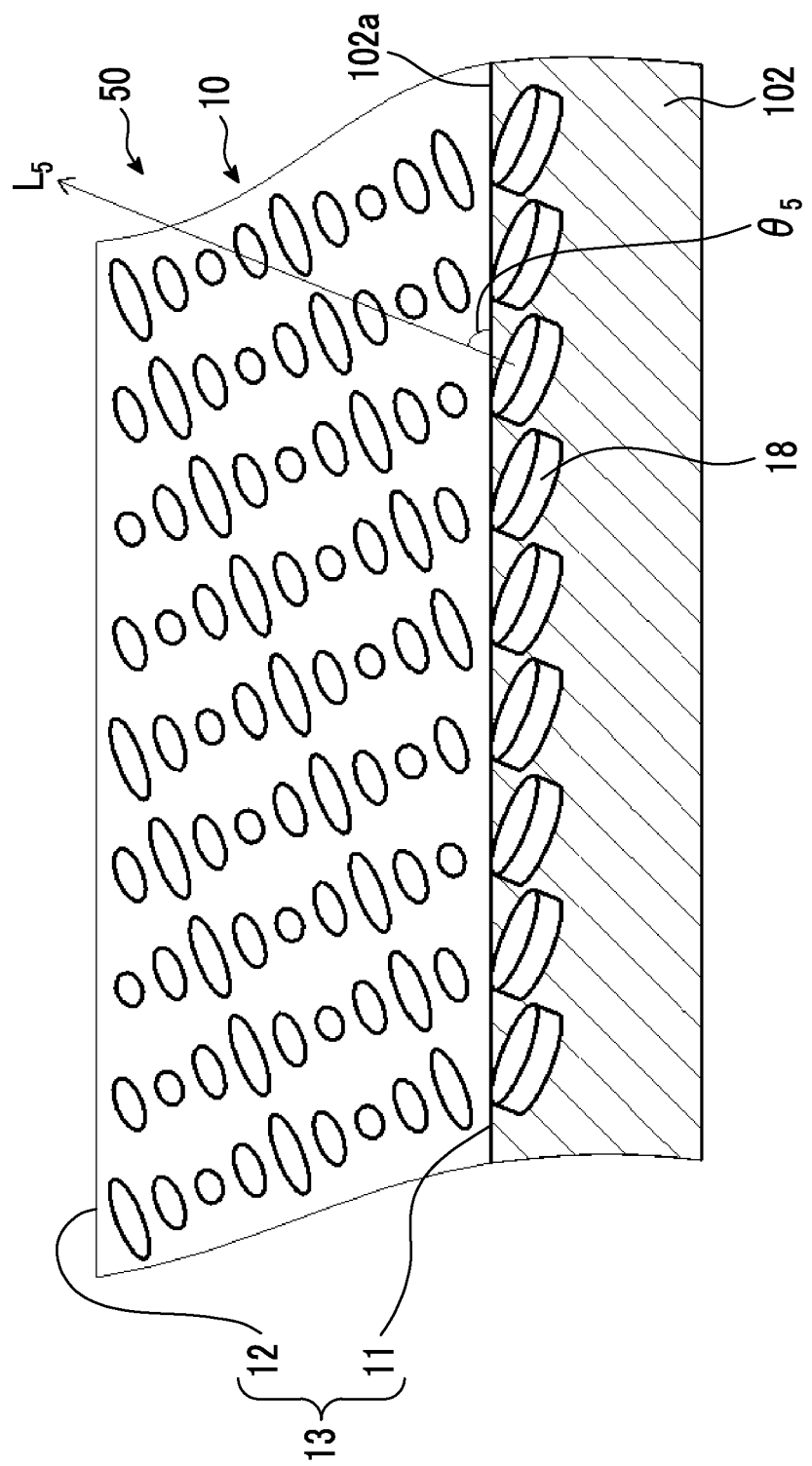
FIG. 15 is a schematic cross-sectional diagram of a laminate 50.

FIG. 15 shows a schematic cross-sectional diagram of the laminate of the present embodiment.

A laminate 50 shown in FIG. 15 includes a liquid crystal layer 102 formed using a disk-like liquid crystal compound 18, and a cholesteric liquid crystal layer 10 arranged to be in contact with the liquid crystal layer 102.

The liquid crystal layer 102 has, on the surface in contact with the cholesteric liquid crystal layer 10, a tilt alignment surface 102a in which the molecular axis $L_5$ of the disk-like liquid crystal compound 18 is tilted with respect to the surface of the liquid crystal layer 102 (which also corresponds to the main plane 11 and the main plane 12 of the cholesteric liquid crystal layer 10 (X-Y plane). That is, on the tilt alignment surface 102a, the disk-like liquid crystal compound 18 is aligned such that its molecular axis $L_5$ is tilted with respect to the surface of the liquid crystal layer 102.

On the tilt alignment surface 102a of the liquid crystal layer 102, the average tilt angle $\theta_4$ of the disk-like liquid crystal compound 18 with respect to the surface of the liquid crystal layer 102 (average value of angles $\theta_5$ formed by the surface of the liquid crystal layer 102 and the disk-like liquid crystal compound 18) is, for example, preferably 20 to 90°, more preferably 20 to 80°, still more preferably 30 to 80°, and particularly preferably 30 to 65°.

The average tilt angle $\theta_5$ of the disk-like liquid crystal compound 18 with respect to the surface of the liquid crystal layer 102 in the tilt alignment surface 102a of the liquid crystal layer 102 can be measured by observing a cross section of the liquid crystal layer with a polarizing microscope. The average tilt angle is a value obtained by measuring angles formed by the molecular axis $L_5$ of the disk-like liquid crystal compound 18 and the surface of the liquid crystal layer 102 at any 5 or more points in the observation of the cross section of the liquid crystal layer with a polarizing microscope, and then arithmetically averaging the measured values.

In addition, the azimuthal angle regulating force of the tilt alignment surface 102a of the liquid crystal layer 102 is, for example, 0.00030 J/m² or less, preferably less than 0.00020 J/m², more preferably 0.00010 J/m² or less, and still more preferably 0.00005 J/m² or less. The lower limit thereof is not particularly limited and is, for example, 0.00000 J/m² or more.

The azimuthal angle regulating force of the liquid crystal layer 102 on the tilt alignment surface 102a can be measured by the method described in J. Appl. Phys. 1992, 33, L1242.

Although it is described in FIG. 15 that the helical axis of the cholesteric liquid crystal layer and the molecular axis of the disk-like liquid crystal compound are tilted in the opposite directions, the tilt directions may be the same.

In addition, in the laminate 50, it is sufficient that the disk-like liquid crystal compound 18 retains its alignment state in the layer, and finally the composition in the layer does not need to exhibit liquid crystallinity.

The cholesteric liquid crystal layer 10 has already been described above.

Another embodiment of the laminate according to the embodiment of the present invention is a laminate in which two or more layers of the above-mentioned cholesteric liquid crystal layer 10 are laminated.

The two cholesteric liquid crystal layers of the two or more laminated cholesteric liquid crystals may have the same or opposite rotation direction (sense) of the helical axis derived from the cholesteric liquid crystalline phase.

In a case where the rotation directions of the helical axes of the two cholesteric liquid crystal layers are the same, the tilt directions of the bright portions and dark portions (bright-dark lines) derived from the cholesteric liquid crystalline phase observed by SEM in cross sections perpendicular to the main planes of the two cholesteric liquid crystal layers are the same.

By laminating the cholesteric liquid crystal layers whose bright-dark lines are tilted in the same direction, a color and/or an image can be detected from only one direction. In addition, by laminating cholesteric liquid crystal layers having different selective reflection wavelengths, the reflection wavelength range as a laminate can be widened.

In addition, in a case where the rotation directions of the helical axes of the two cholesteric liquid crystal layers are in opposite directions, the tilt directions of the bright portions and dark portions (bright-dark lines) derived from the cholesteric liquid crystalline phase observed by SEM in cross sections perpendicular to the main planes of the two cholesteric liquid crystal layers are in opposite directions.

By laminating cholesteric liquid crystal layers whose bright-dark lines are tilted in opposite directions, a color and/or an image can be detected from two directions.

The laminate according to the embodiment of the present invention may have other layers.

For example, the laminate according to the embodiment of the present invention may have an absorption layer that absorbs at least a part of light having a wavelength transmitting through the cholesteric liquid crystal layer (light absorption layer).

Including the absorption layer makes it possible to improve the visibility of the reflected light reflected by the cholesteric liquid crystal layer.

A material that absorbs light in a predetermined wavelength range may be used as the absorption layer. Alternatively, the absorption layer may have a configuration in which a light absorbing material is contained in a resin.

For example, in a case where the light to be absorbed is visible light, a colored (particularly black) resin material, paper, inorganic material, or the like can be used as the absorption layer.

The light absorbing material is not limited, and a known light absorbing material can be used depending on the wavelength range to be absorbed. For example, in a case where the light to be absorbed is visible light, it is possible to use a known light absorbing agent, including, for example, an inorganic pigment such as carbon black or iron black, an organic pigment such as an insoluble azo pigment, and a dye such as azo or anthraquinone.

The type and concentration of the light absorbing material may be appropriately selected according to the dispersibility in the resin to be dispersed, the solubility, the absorption wavelength, the absorption coefficient, the thickness of the support, and the like.

In addition, in a case of having two or more cholesteric liquid crystal layers, another layer may be provided between any cholesteric liquid crystal layers of two or more of the cholesteric liquid crystal layers. For example, a liquid crystal layer, a rubbing alignment layer, or a photo alignment layer may be included between the cholesteric liquid crystal layers.

[Anti-Counterfeit Medium]

The cholesteric liquid crystal layer according to the embodiment of the present invention and the laminate having the cholesteric liquid crystal layer described above can be used as an anti-counterfeit medium for determining authenticity of an article.

The anti-counterfeit medium may have one cholesteric liquid crystal layer or may have a plurality of cholesteric liquid crystal layers. In a case of having a plurality of cholesteric liquid crystal layers, the plurality of cholesteric liquid crystal layers may be laminated in a thickness direction or may be arranged in a plane direction.

In addition, in a case of having a plurality of cholesteric liquid crystal layers, the anti-counterfeit medium may have a configuration which has different types of cholesteric liquid crystal layers (that is, at least one of a selective reflection wavelength, an angle between an incidence ray direction and a reflected light direction, or a sense is different). Alternatively, the anti-counterfeit medium may have a configuration in which the cholesteric liquid crystal layers of the same type are provided and are laminated or arranged by changing the direction of the arrangement axis, that is, the direction of reflecting light.

In addition, a cholesteric liquid crystal layer may be cut out into a certain shape and then used as the anti-counterfeit medium. Further, the anti-counterfeit medium may have a configuration in which a plurality of cholesteric liquid crystal layers are cut out into different shapes and arranged in a plane direction.

Hereinafter, the operation in a case where the cholesteric liquid crystal layer according to the embodiment of the present invention is used as an anti-counterfeit medium will be described by explaining a determination method for determining authenticity of an article using the above-mentioned anti-counterfeit medium.

[Determination Method]

The determination method according to the embodiment of the present invention is a determination method for determining authenticity of an article using the above-mentioned anti-counterfeit medium, including detecting reflected light and/or transmitted light from at least one direction with respect to the anti-counterfeit medium.

As described above, since the cholesteric liquid crystal layer according to the embodiment of the present invention included in the anti-counterfeit medium has a configuration in which the arrangement direction of the bright portion and the dark portion derived from the cholesteric liquid crystalline phase observed by SEM in a cross section perpendicular to the main plane is tilted with respect to the main plane of the cholesteric liquid crystal layer, the incidence ray is reflected in a direction different from the incident direction.

Therefore, the anti-counterfeit medium having the cholesteric liquid crystal layer according to the embodiment of the present invention makes it possible to determine the authenticity of an article using the angle of the reflected light (or the wavelength or light amount of the reflected light at a certain angle), in addition to the wavelength, sense, and circular polarization degree of the light reflected by the cholesteric liquid crystal layer as parameters. That is, broad light is applied to the anti-counterfeit medium, the wavelength, sense, and light amount of the reflected light are detected from a predetermined angle, and in a case where the detected wavelength, sense, and light amount have correct values (in a case where such factors are within a predetermined range), it is determined that the article is true, and in a case where those factors are within a range different from the predetermined range, it is determined that the article is false. Alternatively, it is possible to determine the authenticity of an article by applying light of a predetermined wavelength and sense and detecting the light amount of reflected light from a predetermined angle. Alternatively, the wavelength, sense, and light amount of the reflected light may be detected from a plurality of angles, and then the angle at which the light amount is maximized may be used as the parameter.

Alternatively, the authenticity of an article can be determined by detecting the light transmitted through the anti-counterfeit medium. That is, it is possible to determine the authenticity of an article using the transmittance at a predetermined wavelength, the sense of transmitted light, the circular polarization degree, and the like as parameters.

In addition, both the reflected light and the transmitted light from the anti-counterfeit medium may be detected, and then the authenticity of an article may be determined based on the parameters described above.

In addition, as described above, in a case where the anti-counterfeit medium has a plurality of cholesteric liquid crystal layers, and in a case where the cholesteric liquid crystal layer is cut out into a certain shape and then used, the authenticity of an article may be determined by detecting the in-plane pattern of at least one of the reflected light or the transmitted light.

Specifically, the wavelength, sense, and light amount of the reflected light are detected at a plurality of positions within a plane having a predetermined angle, and the then authenticity of the parameters is determined based on the cholesteric liquid crystal layer corresponding to each measurement point, whereby it is possible to determine the authenticity of an article.

Furthermore, in a case of detecting the reflected light and/or the transmitted light from the anti-counterfeit medium, the authenticity of an article may be determined based on the change in the detection result depending on the presence or absence of a circular polarization filter or by the difference in the type of the circular polarization filter by observing the light through the circular polarization filter.

As described above, since the reflected light from the cholesteric liquid crystal layer and the transmitted light at the selective reflection wavelength are circularly polarized light, the detection result (light amount) changes depending on the presence or absence of the circular polarization filter or the difference in the type of the circular polarization filter.

EXAMPLES

Hereinafter, the present invention will be described in more detail with reference to Examples. The materials, the used amount, the ratio, the contents of a treatment, and the procedures of a treatment described in Examples below may be suitably modified without departing from the spirit of the present invention. Accordingly, the scope of the present invention should not be limitatively interpreted by Examples described below.

[Various Components]

Hereinafter, first, various components used in Examples and Comparative Examples will be described.
<Chiral Agent A>
<Synthesis of Compound CD-1>

The compound CD-1 was synthesized by a general method according to the following synthetic procedure.

The compound CD-1 is a chiral agent whose helical direction is left-handed and whose helical twisting power is not changed depending on a change of temperature or irradiation with light.

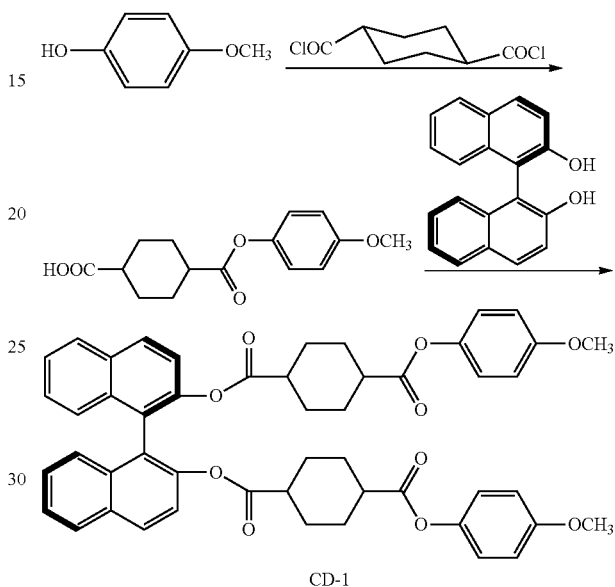

CD-1

(Synthesis of Compound CD-2)

The following compound CD-2 used was synthesized according to JP2002-338575A. The compound CD-2 is a chiral agent whose helical direction is right-handed and whose helical twisting power is changed depending on irradiation with light (which corresponds to the chiral agent X).

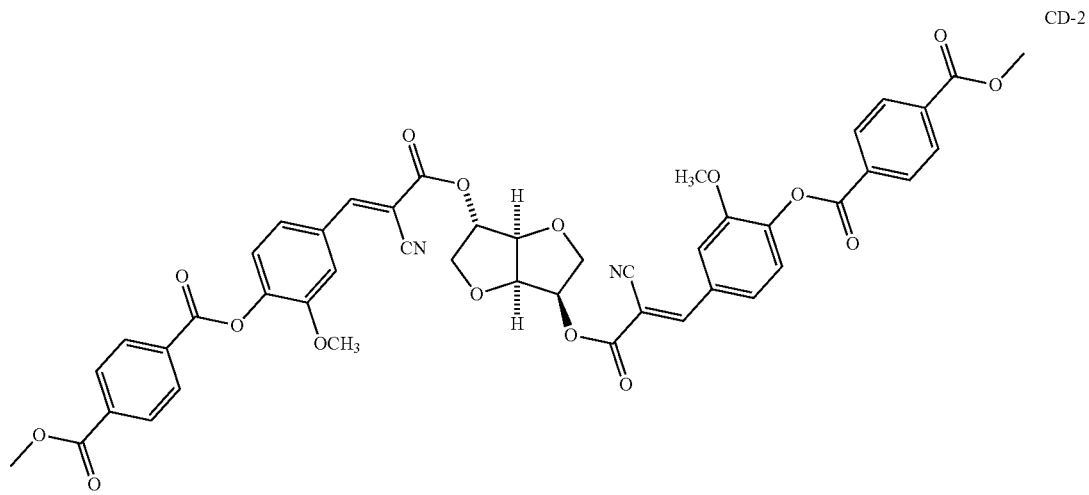

CD-2

(Synthesis of Compound CD-2A)

The following compound CD-2A used was synthesized according to JP2002-338575A. The compound CD-2A is a chiral agent whose helical direction is right-handed and whose helical twisting power is changed depending on irradiation with light (which corresponds to the chiral agent X).

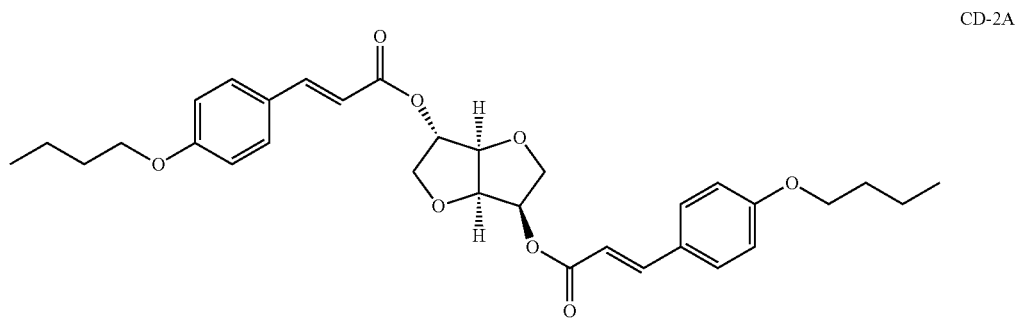 [SMILES: CCCCOc1ccc(/C=C/C(=O)O[C@H]2CO[C@H]3[C@@H]2OC[C@H]3OC(=O)/C=C/c2ccc(OCCCC)cc2)cc1]

CD-2A

<Disk-Like Liquid Crystal Compound>
(Disk-Like Liquid Crystal Compound D-1)

As the disk-like liquid crystal compound, the following disk-like liquid crystal compound D-1 described in JP2007-131765A was used.

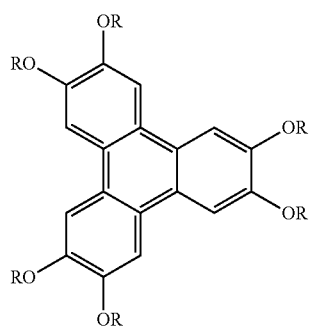

D-1

-continued

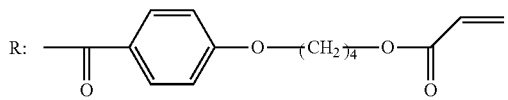

<Surfactant>
(Surfactant S-1)

Surfactant S-1 and surfactant S-2 were used as the surfactant.

The surfactant S-1 is a compound described in JP5774518B and has the following structure. In addition, one synthesized by the synthesis method which will be described later was used as the surfactant S-2.

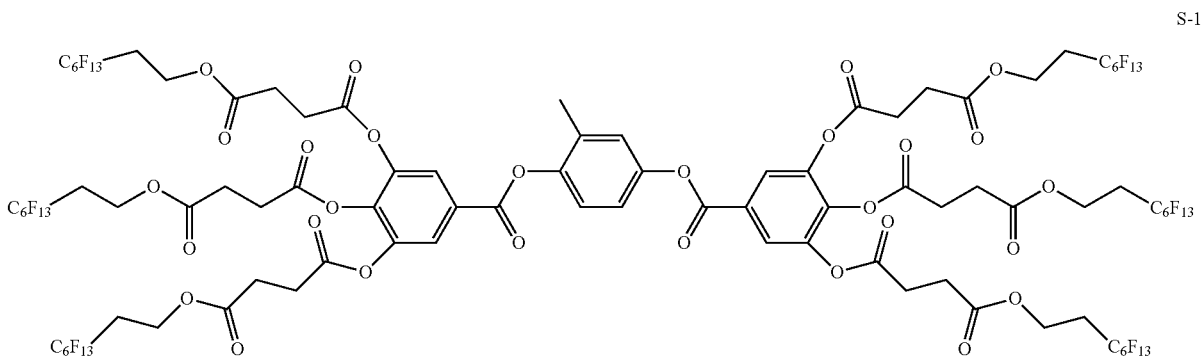

S-1

(Synthesis of Surfactant S-2)

The surfactant S-2 was obtained by polymerizing 2.5 g of FAAC-6 (manufactured by Unimatec Co., Ltd.) and 2.5 g of acrylic acid (manufactured by Wako Pure Chemical Industries, Ltd.) by a conventional radical polymerization method.

Example 1

<Step 1: Production of Liquid Crystal Layer 1>
(Preparation of Sample Solution)
A sample solution having the following composition was prepared.

Compound D-1 100 parts by mass
Initiator IRG-907 (manufactured by BASF SE) 3.0 parts by mass
Solvent (methyl ethyl ketone (MEK)/cyclohexanone=90/10 (mass ratio)) an amount that makes a solute concentration 30% by mass (Production of Liquid Crystal Layer 1)
Then, a glass substrate coated with polyimide SE-130 (manufactured by Nissan Chemical Corporation) was subjected to a rubbing treatment to produce a substrate with an alignment film. 30 L of the sample solution was spin-coated on the rubbing-treated surface of this alignment film under the conditions of a rotation speed of 1000 rpm for 10 seconds, followed by aging at 120° C. for 1 minute. Subsequently, the coating film was cured by irradiation with UV (ultraviolet ray) at an irradiation amount of 500 mJ/cm$^2$ in a nitrogen atmosphere at 30° C. to obtain a liquid crystal layer 1.

(Measurement of Azimuthal Angle Regulating Force)
With respect to the obtained liquid crystal layer 1, the azimuthal angle regulating force was determined by the method described in J. Appl. Phys. 1992, 33, L1242.

For the measurement of the azimuthal angle regulating force of the liquid crystal layer 1, ZLI-5080 (manufactured by Merck & Co., Inc.) was used as the liquid crystal compound for measurement, and 5-811 (manufactured by Merck & Co., Inc.) was used as the chiral agent for measurement.

<Step 2: Production of Cholesteric Liquid Crystal Layer 1>

(Preparation of Sample Solution)
A sample solution having the following composition was prepared.

(Measurement of Weighted Average Helical Twisting Power)

After the solvent of the sample solution was distilled off, the helical pitch was measured by a trial wedge method (Liquid Crystal Handbook, published by Maruzen, pp. 196 to 197), and the helical twisting power was calculated from Expression (1A).

The helical twisting power calculated by the above-mentioned method also matches the weighted average helical twisting power obtained from Expression (1C).

(Production of Cholesteric Liquid Crystal Layer 1)
Next, 40 μL of the sample solution was spin-coated on the liquid crystal layer 1 under the conditions of a rotation speed of 1500 rpm for 10 seconds to form a composition layer, and then the composition layer was aged at 90° C. for 1 minute. Subsequently, the composition layer after aging was ultraviolet-irradiated with 365 nm light from a light source (2UV TRANSILLUMINATOR, manufactured by UVP, LLC) at an irradiation intensity of 2 mW/cm$^2$ and at 90° C. for 60 seconds. This was followed by UV (ultraviolet ray) irradiation at an irradiation amount of 500 mJ/cm$^2$ in a nitrogen atmosphere at 30° C. to carry out a polymerization reaction of the liquid crystal compound, thereby obtaining a cholesteric liquid crystal layer 1 in which a cholesteric alignment state was fixed.

Through the above steps, a laminate 1 having the liquid crystal layer 1 and the cholesteric liquid crystal layer 1 arranged on the liquid crystal layer 1 was produced.

The following evaluations were carried out on the cholesteric liquid crystal layer 1 in the obtained laminate 1.

(Cross-Sectional SEM Observation)
As a result of cross-sectional SEM observation (cross-sectional SEM micrograph) of the cholesteric liquid crystal layer 1, it was confirmed that the arrangement directions of the bright portions and the dark portions derived from the cholesteric liquid crystalline phase are tilted in one direction with respect to both main planes of the cholesteric liquid crystal layer 1 (the interface side surface with the liquid crystal layer 1 and the air interface side surface).

Furthermore, on both main planes of the cholesteric liquid crystal layer 1, the average tilt angles formed by the line formed by the dark portion derived from the cholesteric liquid crystalline phase and the main plane of the cholesteric liquid crystal layer was measured, and the difference therebetween was calculated (refer to the column of "Difference

| | |
|---|---|
| Liquid crystalline compound LC-1 represented by the following structure: | 100 parts by mass |
| Compound S-1 | 0.1 parts by mass |
| Compound CD-1 | 5.5 parts by mass |
| Compound CD-2 | 5.5 parts by mass |
| Initiator IRG-907 (manufactured by BASF SE) | 2.0 parts by mass |
| Solvent (methyl ethyl ketone (MEK)/ cyclohexanone = 90/10 (mass ratio)) | an amount that makes a solute concentration 30% by mass |

LC-1

[°] between average tilt angles of bright-dark lines on both main planes" in the table.). That is, the average tilt angle formed by the line formed by the air-side dark portion of the cholesteric liquid crystal layer 1 and the air-side surface of the cholesteric liquid crystal layer 1, and the average tilt angle formed by the line formed by the dark portion of the cholesteric liquid crystal layer 1 on the liquid crystal layer 1 side and the surface of the cholesteric liquid crystal layer 1 on the liquid crystal layer 1 side were measured, and the difference therebetween was calculated. The results are shown in Table 1.

(Measurement of Tilt Angle)

The cholesteric liquid crystal layer 1 was cut with a microtome, and the cross section thereof was observed under a polarizing microscope to measure the average tilt angle of the disk-like liquid crystal compound present on the surface of the liquid crystal layer 1 in contact with the cholesteric liquid crystal layer 1 and the average tilt angle of the liquid crystal compound in the cholesteric liquid crystal layer 1. The results are shown in Table 1.

In the liquid crystal layer 1, the disk-like liquid crystal compound present on the surface on the side in contact with the cholesteric liquid crystal layer 1 was tilted by 40° with respect to the surface of the liquid crystal layer 1 on the cholesteric liquid crystal layer 1 side. In addition, the liquid crystal compound in the cholesteric liquid crystal layer 1 was tilted by 20° with respect to the main plane of the cholesteric liquid crystal layer 1.

(Measurement of Arrangement of Molecular Axes)

Only the cholesteric liquid crystal layer 1 was peeled from the laminate 1, and the molecular axis pattern on the surface thereof was observed by observation with a reflection polarizing microscope. In a case of being observed from both main planes of the cholesteric liquid crystal layer 1, periodic bright-dark lines derived from the arrangement of molecular axes were observed. Furthermore, it was confirmed that the molecular axis continuously rotates along one in-plane direction since the bright-dark lines continuously move by rotating a polarizer in the observation with a reflection polarizing microscope. The arrangement of the molecular axis was evaluated by the following indexes. The results are shown in Table 1.

"A": The molecular axis continuously rotates along one in-plane direction on both main planes.

"B": The molecular axis continuously rotates along one in-plane direction only on one of both main planes.

"C": The molecular axis is not continuously rotated along one in-plane direction on both main planes.

(Measurement of Coefficient of Variation of Period Λ)

The interval between the bright-dark lines in the observation with a reflection polarizing microscope corresponds to a period Λ until the molecular axis of the liquid crystal molecule rotates by 180°. This period Λ was measured at each of 10 points on both main planes of the cholesteric liquid crystal layer, and the coefficient of variation thereof was calculated. The results are shown in Table 1.

(Evaluation of Reflection Anisotropy and Haze)

<<Confirmation of Reflection Anisotropy>>

From the measurement of the transmittance, it was found that the central reflection wavelength of the cholesteric liquid crystal layer 1 was 550 nm. As a result of the incidence of 550 nm light from the normal direction of the cholesteric liquid crystal layer 1, since the reflection intensity in one oblique direction was strong, the reflection surface was tilted with respect to the main plane of the cholesteric liquid crystal layer 1 (that is, the arrangement direction of the bright portion and the dark portion derived from the cholesteric liquid crystalline phase was tilted with respect to the main plane of the cholesteric liquid crystal layer 1), thus confirming that the cholesteric liquid crystal layer 1 had reflection anisotropy.

In addition, the arrangement direction of the bright portion and the dark portion derived from the cholesteric liquid crystalline phase was substantially parallel to the direction of the molecular axis of the disk-like liquid crystal compound present on the surface of the liquid crystal layer 1 in contact with the cholesteric liquid crystal layer 1, and was substantially orthogonal to the direction of the molecular axis of the rod-like liquid crystal compound in the cholesteric liquid crystal layer.

<<Haze Measurement>>

The haze value of the cholesteric liquid crystal layer 1 was measured using a haze meter NDH-4000 (manufactured by Nippon Denshoku Industries Co., Ltd.).

<<Evaluation>>

Then, the reflection anisotropy and haze were evaluated by the following indexes. The results are shown in Table 1.

"A": There is reflection anisotropy, and haze is less than 2.0.

"B": There is reflection anisotropy, and haze is 2.0 or more and less than 2.5.

"C": There is reflection anisotropy, and haze is 2.5 or more and less than 3.0.

"D": There is reflection anisotropy, and haze is 3.0 or more.

"E": There is no reflection anisotropy.

(Measurement of Circular Polarization Degree at Oblique Incidence)

The incidence angle was set such that the reflected light was emitted most strongly in the normal direction of the cholesteric liquid crystal layer 1, and the circular polarization degree of the reflected light at that time was measured. Specifically, using an automatic absolute reflectance measuring system (manufactured by JASCO Corporation), the reflectance was measured with a dextrorotatory circularly polarizing plate and a levorotatory circularly polarizing plate placed in front of a detector to calculate the circular polarization degree. The results are shown in Table 1.

"A": The circular polarization degree is 99% or more.

"B": The circular polarization degree is 97% or more and less than 99%.

"C": The circular polarization degree is less than 97%.

"D": The cholesteric liquid crystal layer 1 does not have reflection anisotropy, and reflected light in the normal direction cannot be measured.

Examples 2 to 5

Laminates 2 to 5 having cholesteric liquid crystal layers 2 to 5 (Examples 2 to 5) were produced and evaluated in the same manner as in Example 1, except that, as shown in Table 1, a surfactant was added to the sample solution used for producing the liquid crystal layer 1.

Example 6

A laminate 6 having a cholesteric liquid crystal layer 6 (Example 6) was produced and evaluated in the same manner as in Example 1, except that the surface of the produced liquid crystal layer 1 was subjected to a rubbing treatment.

Example 7

A laminate 7 having a cholesteric liquid crystal layer 7 (Example 7) was produced and evaluated in the same manner as in Example 1, except that, as shown in Table 1, no surfactant was used in the sample solution used for producing the cholesteric liquid crystal layer 1.

Example 8

A laminate 8 having a cholesteric liquid crystal layer 8 (Example 8) was produced and evaluated in the same manner as in Example 1, except that, as shown in Table 1, the surfactant in the sample solution used for producing the cholesteric liquid crystal layer 1 was changed.

Example 9

A laminate 9 having a cholesteric liquid crystal layer 9 (Example 9) was produced and evaluated in the same manner as in Example 1, except that a substrate C1 produced by the following method was used in place of the liquid crystal layer 1 as the substrate.
<Production of Substrate C1>
A glass substrate coated with polyimide SE-130 (manufactured by Nissan Chemical Corporation) was subjected to a rubbing treatment to produce a substrate with an alignment film.

Example 10

A laminate 10 having a cholesteric liquid crystal layer 10 (Example 10) was produced and evaluated in the same manner as in Example 1, except that a substrate C2 produced by the following method was used in place of the liquid crystal layer 1 as the substrate.
<Production of Substrate C2>
(Preparation of Sample Solution)
A sample solution having the following composition was prepared.

| | |
|---|---|
| Compound LC-1 described above | 100 parts by mass |
| Initiator IRG-907 (manufactured by BASF SE) | 3.0 parts by mass |
| Solvent (methyl ethyl ketone (MEK)/cyclohexanone = 90/10 (mass ratio)) | an amount that makes a solute concentration 30% by mass |

(Production of Substrate C2)
Then, a glass substrate coated with polyimide SE-130 (manufactured by Nissan Chemical Corporation) was subjected to a rubbing treatment to produce a substrate with an alignment film. 30 μL of the sample solution was spin-coated on the rubbing-treated surface of this alignment film under the conditions of a rotation speed of 1000 rpm for 10 seconds, followed by aging at 120° C. for 1 minute. Subsequently, the coating film was cured by irradiation with UV (ultraviolet ray) at an irradiation amount of 500 mJ/cm² in a nitrogen atmosphere at 30° C. to obtain a substrate C2.

Examples 11 to 15

Laminates 11 to 15 having cholesteric liquid crystal layers 11 to 15 (Examples 11 to 15) were produced and evaluated in the same manner as in Example 1, except that, as shown in Table 1, the formulation amount of the chiral agent in the sample solution used for producing the cholesteric liquid crystal layer 1 was changed.

Comparative Example 1

A liquid crystal layer X was produced in the same manner as in Example 1, except that, as shown in Table 1, a surfactant was added to the sample solution used for producing the liquid crystal layer 1.
A laminate X including the cholesteric liquid crystal layer X of Comparative Example (Comparative Example 1) was produced and evaluated in the same manner as in Example 1, except that the obtained liquid crystal layer X was used.

Comparative Example 2

A cholesteric liquid crystal layer Y was produced by the method described in Example 1 of JP2006-317656A and evaluated in the same manner as in Example 1.
The results are shown in Table 1 and Table 2.

| | | Substrate | | | | | Cholesteric liquid crystal layer | | | | | |
|---|---|---|---|---|---|---|---|---|---|---|---|---|
| | | Liquid crystal layer | | | | | | | | | | |
| | | Disk-like liquid crystal compound | | Surfactant | | | | Chiral agent | | Chiral agent | | Surfactant | |
| | Laminate | Type | Addition amount (parts by mass) | Type | Addition amount (parts by mass) | Rubbing treatment | Non-liquid crystal layer | Type | Addition amount (parts by mass) | Type | Addition amount (parts by mass) | Type | Addition amount (parts by mass) |
| Example 1 | Laminate 1 | D-1 | 100.0 | — | — | Not rubbed | — | CD-1 | 5.50 | CD-2 | 5.50 | S-1 | 0.1 |
| Example 2 | Laminate 2 | D-1 | 100.0 | S-1 | 0.1 | Not rubbed | — | CD-1 | 5.50 | CD-2 | 5.50 | S-1 | 0.1 |
| Example 3 | Laminate 3 | D-1 | 100.0 | S-1 | 0.2 | Not rubbed | — | CD-1 | 5.50 | CD-2 | 5.50 | S-1 | 0.1 |
| Example 4 | Laminate 4 | D-1 | 100.0 | S-1 | 0.5 | Not rubbed | — | CD-1 | 5.50 | CD-2 | 5.50 | S-1 | 0.1 |
| Example 5 | Laminate 5 | D-1 | 100.0 | S-2 | 0.5 | Not rubbed | — | CD-1 | 5.50 | CD-2 | 5.50 | S-1 | 0.1 |
| Example 6 | Laminate 6 | D-1 | 100.0 | — | — | Rubbed | — | CD-1 | 5.50 | CD-2 | 5.50 | S-1 | 0.1 |
| Example 7 | Laminate 7 | D-1 | 100.0 | — | — | Not rubbed | — | CD-1 | 5.50 | CD-2 | 5.50 | — | — |
| Example 8 | Laminate 8 | D-1 | 100.0 | — | — | Not rubbed | — | CD-1 | 5.50 | CD-2 | 5.50 | S-2 | 0.1 |
| Example 9 | Laminate 9 | | — | | | | Substrate C1 | CD-1 | 5.50 | CD-2 | 5.50 | S-1 | 0.1 |
| Example 10 | Laminate 10 | | — | | | | Substrate C2 | CD-1 | 5.50 | CD-2 | 5.50 | S-1 | 0.1 |
| Example 11 | Laminate 11 | D-1 | 100.0 | — | — | Not rubbed | — | CD-1 | 5.41 | CD-2 | 5.50 | S-1 | 0.1 |
| Example 12 | Laminate 12 | D-1 | 100.0 | — | — | Not rubbed | — | CD-1 | 5.39 | CD-2 | 5.50 | S-1 | 0.1 |

-continued

| | | Substrate | | | | | | | | | | |
|---|---|---|---|---|---|---|---|---|---|---|---|---|
| | | Liquid crystal layer | | | | | Cholesteric liquid crystal layer | | | | | |
| | | Disk-like liquid crystal compound | | Surfactant | | | | Chiral agent | | Chiral agent | | Surfactant | |
| | Laminate | Type | Addition amount (parts by mass) | Type | Addition amount (parts by mass) | Rubbing treatment | Non-liquid crystal layer | Type | Addition amount (parts by mass) | Type | Addition amount (parts by mass) | Type | Addition amount (parts by mass) |
| Example 13 | Laminate 13 | D-1 | 100.0 | — | — | Not rubbed | — | CD-1 | 5.28 | CD-2 | 5.50 | S-1 | 0.1 |
| Example 14 | Laminate 14 | D-1 | 100.0 | — | — | Not rubbed | — | CD-1 | 5.24 | CD-2 | 5.50 | S-1 | 0.1 |
| Example 15 | Laminate 15 | D-1 | 100.0 | — | — | Not rubbed | — | CD-1 | 5.17 | CD-2 | 5.50 | S-1 | 0.1 |
| Comparative Example 1 | Laminate X | D-1 | 100.0 | S-2 | 2.0 | Not rubbed | — | CD-1 | 5.50 | CD-2 | 5.50 | S-1 | 1.0 |
| Comparative Example 2 | Laminate Y | | | | | | Method described in JP2006-317656A | | | | | | |

TABLE 2

| | | Various properties | | | | | | | | | | |
|---|---|---|---|---|---|---|---|---|---|---|---|---|
| | | Substrate | Cholesteric liquid crystal layer | | | | | | | | Evaluation | |
| | | Average tilt angle [°] of disk-like liquid crystal compound present on surface in contact with cholesteric liquid crystal layer | Azimuthal angle regulating force [J/m²] | Weighted average helical twisting power [μm⁻¹] in composition layer | Average tilt angle [°] of liquid crystal compound | Tilt of arrangement direction of bright portion and dark portion in cross-sectional SEM obsevation | Arrangement of molecular axis | Difference [°] between average tilt angles of bright-dark lines on both main planes | Coefficient of variation of period Λ at substrate-side interface | Coefficient of variation of period Λ at air interface | Reflection anisotropy Haze | Circular polarization degree of reflected light |
| | Laminate | | | | | | | | | | | |
| Example 1 | Laminate 1 | 40 | 0.00005 | 0.0 | 20 | Tilted in one direction | A | 0 | 0 | 0 | A | A |
| Example 2 | Laminate 2 | 60 | 0.00003 | 0.0 | 15 | Tilted in one direction | A | 0 | 0.1 | 0.1 | A | A |
| Example 3 | Laminate 3 | 70 | 0.00001 | 0.0 | 10 | Tilted in one direction | A | 5 | 0.2 | 0.2 | B | B |
| Example 4 | Laminate 4 | 80 | 0.00000 | 0.0 | 5 | Tilted in one direction | A | 5 | 0.3 | 0.2 | B | B |
| Example 5 | Laminate 5 | 20 | 0.00010 | 0.0 | 30 | Tilted in one direction | A | 5 | 0.4 | 0.3 | B | B |
| Example 6 | Laminate 6 | 40 | 0.00020 | 0.0 | 20 | Tilted in one direction | A | 10 | 0.5 | 0.5 | C | B |
| Example 7 | Laminate 7 | 40 | 0.00005 | 0.0 | 25 | Tilted in one direction | A | 5 | 0.4 | 0.4 | B | B |
| Example 8 | Laminate 8 | 40 | 0.00005 | 0.0 | 30 | Tilted in one direction | A | 10 | 0.6 | 0.5 | C | B |
| Example 9 | Laminate 9 | — | 0.00030 | 0.0 | 5 | Tilted in one direction | B | 15 | — | 0.7 | D | C |
| Example 10 | Laminate 10 | — | 0.00030 | 0.0 | 5 | Tilted in one direction | B | 15 | — | 0.7 | D | C |
| Example 11 | Laminate 11 | 40 | 0.00005 | 0.5 | 20 | Tilted in one direction | A | 0 | 0.1 | 0.1 | A | A |
| Example 12 | Laminate 12 | 40 | 0.00005 | 0.6 | 20 | Tilted in one direction | A | 5 | 0.2 | 0.2 | B | B |
| Example 13 | Laminate 13 | 40 | 0.00005 | 1.3 | 20 | Tilted in one direction | A | 5 | 0.3 | 0.3 | B | B |
| Example 14 | Laminate 14 | 40 | 0.00005 | 1.5 | 20 | Tilted in one direction | A | 5 | 0.4 | 0.3 | B | B |

TABLE 2-continued

| | | Substrate Average tilt angle [°] of disk-like liquid crystal compound present on surface in contact with cholesteric liquid crystal layer | Cholesteric liquid crystal layer | | | | | | | Evaluation | |
|---|---|---|---|---|---|---|---|---|---|---|---|
| | | | Azimuthal angle regulating force [J/m²] | Weighted average helical twisting power [μm⁻¹] in composition layer | Average tilt angle [°] of liquid crystal compound | Tilt of arrangement direction of bright portion and dark portion in cross-sectional SEM obsevation | Arrangement of molecular axis | Difference [°] between average tilt angles of bright-dark lines on both main planes | Co-efficient of variation of period Λ at substrate-side interface | Co-efficient of variation of period Λ at air interface | Reflection anisotropy Haze | Circular polarization degree of reflected light |
| | Laminate | | | | | | | | | | | |
| Example 15 | Laminate 15 | 40 | 0.00005 | 1.3 | 20 | Tilted in one direction | A | 10 | 0.6 | 0.5 | C | C |
| Comparative Example 1 | Laminate X | 0 | 0.00030 | 0.0 | 10 | Tilted randomly | C | — | — | — | E | D |
| Comparative Example 2 | Laminate Y | — | 0.00040 | — | 10 | Tilted randomly | C | — | — | — | E | D |

From Table 1 and Table 2, it was apparent that, according to the cholesteric liquid crystal layers of the Examples, cholesteric liquid crystal layers having an excellent reflection anisotropy, a low haze, and a high circular polarization degree of reflected light could be obtained.

In addition, from the comparison of Example 1, Example 6, Example 9, and Example 10, it was confirmed that, in a case where the azimuthal angle regulating force on the surface of the substrate in contact with the cholesteric liquid crystal layer is 0.00020 J/m² or less, the obtained cholesteric liquid crystal layer had a more excellent arrangement of the molecular axes in the main plane. As a result, it was confirmed that the obtained cholesteric liquid crystal layer had a lower haze and a higher circular polarization degree of reflected light. In addition, it was confirmed that, in a case where the azimuthal angle regulating force on the surface of the substrate in contact with the cholesteric liquid crystal layer was less than 0.00020 J/m₂ (preferably 0.0005 J/m₂ or less), the difference between the average tilt angles of the bright-dark lines on both main planes (both surfaces) of the cholesteric liquid crystal layer was smaller (in other words, the linearity of the bright-dark lines was better), and as a result, the obtained cholesteric liquid crystal layer had a lower haze. In particular, it was confirmed that the haze was lower in a case where the difference between the average tilt angles of the bright-dark lines on both main planes (both surfaces) of the cholesteric liquid crystal layer was 0 to 3°.

In addition, from the comparison of Examples 1 to 5, it was confirmed that, in a case where the average tilt angle of the disk-like liquid crystal compound in the liquid crystal layer was 30 to 65°, the difference between the average tilt angles of the bright-dark lines on both main planes (both surfaces) of the cholesteric liquid crystal layer was small (the difference in average tilt angle was preferably 0 to 3°), and as a result, the obtained cholesteric liquid crystal layer had a lower haze and a higher circular polarization degree of reflected light. Further, from the comparison of Examples 1 to 5, it was confirmed that, in a case where the average tilt angle of the rod-like liquid crystal compound in the cholesteric liquid crystal layer was 12 to 22°, the difference between the average tilt angles of the bright-dark lines on both main planes (both surfaces) of the cholesteric liquid crystal layer was small (the difference in average tilt angle was preferably 0 to 3°), and the obtained cholesteric liquid crystal layer had a lower haze and a higher circular polarization degree of reflected light.

In addition, from the comparison of Example 1 and Examples 11 to 15, it was confirmed that, in a case where the absolute value of the weighted average helical twisting power in the composition layer satisfying the condition 1 or the condition 2 obtained in the step 2-1 was smaller (in a case where the absolute value of the weighted average helical twisting power was preferably 0.0 to 1.5 and more preferably 0.0 to 0.5), the obtained cholesteric liquid crystal layer had a lower haze and a higher circular polarization degree of reflected light.

In addition, from the comparison of Examples 1 to 10, it was confirmed that, in a case where the coefficient of variation of the period Λ at which the molecular axes of the liquid crystal molecules rotate by 180° at the interfaces on the substrate side and the air side was smaller (in a case where the coefficient of variation was preferably 0.0 to 0.6, more preferably 0.0 to 0.4, and still more preferably 0.0 to 0.1), the obtained cholesteric liquid crystal layer had a lower haze and a higher circular polarization degree of reflected light.

In addition, none of the cholesteric liquid crystal layers of Comparative Examples satisfied the desired requirements.

The period Λ of the Comparative Examples could not be measured because the molecular axes of the liquid crystal molecules did not rotate continuously.

Example 16

A laminate 16 having a cholesteric liquid crystal layer 16 (Example 16) was produced and evaluated in the same manner as in the laminate 1 of Example 1, except that the production method of the cholesteric liquid crystal layer 1 in the step 2 was changed to the production method of a cholesteric liquid crystal layer 16 shown below. Hereinafter, the method for producing the cholesteric liquid crystal layer 16 will be described.

<Step 2: Production of Cholesteric Liquid Crystal Layer 16>
(Preparation of Sample Solution)
A sample solution having the following composition was prepared.

| | |
|---|---|
| Liquid crystalline compound LC-1 represented by the structure described above | 100 parts by mass |
| Compound S-1 represented by the structure described above | 0.1 parts by mass |
| Compound CD-1 represented by the structure described above | 5.5 parts by mass |
| Compound CD-2A represented by the structure described above | 5.5 parts by mass |
| Initiator IRG-907 (manufactured by BASF SE) | 2.0 parts by mass |
| Solvent (methyl ethyl ketone (MEK)/cyclohexanone = 90/10 (mass ratio)) | an amount that makes a solute concentration 30% by mass |

(Production of Cholesteric Liquid Crystal Layer 16)
40 μL of the sample solution was spin-coated on the liquid crystal layer 1 (the production method of the liquid crystal layer 1 is the same as the procedure of the step 1 in the production method of the laminate 1 as described above) under the conditions of a rotation speed of 1500 rpm for 10 seconds to form a composition layer, and then the composition layer was aged at 90° C. for 1 minute. Subsequently, the composition layer after aging was ultraviolet-irradiated with 315 nm light at 30° C. for 60 seconds through a slit mask having a width of 100 μm at an illuminance of 30 mW/cm$^2$. In the slit mask, the illuminance of the light transmitted through the masked portion was 1/10 of the illuminance of the light transmitted through the non-masked portion.

This was followed by aging at 90° C. for 1 minute, and then UV (ultraviolet ray) irradiation at an irradiation amount of 500 mJ/cm$^2$ in a nitrogen atmosphere at 30° C. to carry out a polymerization reaction of the liquid crystal compound, thereby obtaining a cholesteric liquid crystal layer 16 in which a cholesteric alignment state was fixed.

Through the above steps, a laminate 16 having the liquid crystal layer 1 and the cholesteric liquid crystal layer 16 arranged on the liquid crystal layer 1 was produced.

The same evaluation as in Example 1 was carried out on the cholesteric liquid crystal layer 16 in the obtained laminate 16. The results are shown in Table 3 and Table 4.

Further, the following evaluation was carried out on the cholesteric liquid crystal layer 16 in the obtained laminate 16.

(Cross-Sectional SEM Observation)
As a result of cross-sectional SEM observation (cross-sectional SEM micrograph) of the cholesteric liquid crystal layer 16, it was confirmed that the tilt directions of the bright portions and the dark portions derived from the cholesteric liquid crystalline phase were tilted by 12° with respect to both main planes of the cholesteric liquid crystal layer 16 (the interface side surface with the liquid crystal layer 16 and the air interface side surface).

Further, the cholesteric liquid crystal layer 16 had a structure in which a region having a relatively narrow interval between the lines formed by the bright portions derived from the cholesteric liquid crystalline phase and a region having a relatively wide interval between the lines formed by the bright portions derived from the cholesteric liquid crystalline phase alternately appear at a width of about 100 μm. From this result, it is apparent that the cholesteric liquid crystal layer 16 had a structure in which a region where the helical pitch is relatively narrow and a region where the helical pitch is relatively wide alternately appear at a width of about 100 μm. The reflection wavelength range was 450 to 550 nm in the region where the helical pitch was relatively narrow, and 550 nm to 650 nm in the region where the helical pitch was relatively wide.

Example 17

A laminate 17 having a cholesteric liquid crystal layer 17 (Example 17) was produced and evaluated in the same manner as in the laminate 16 of Example 16, except that a substrate 17 shown below was used in place of the SE-130 rubbing substrate used for producing the liquid crystal layer 1 in the step 1. Hereinafter, the method for producing the cholesteric liquid crystal layer 17 will be described. The evaluation results are shown in Table 3 and Table 4.

(Production of Substrate 17)
A sample solution 17c having the following composition was prepared.

| | |
|---|---|
| Compound SD-1 represented by the following structure | 100 parts by mass |
| Solvent (N,N-dimethylformamide (mass ratio)) | an amount that makes a solute concentration 1% by mass |

HO—⟨benzene⟩—N=N—⟨benzene, SO$_3$Na⟩—⟨benzene, NaO$_3$S⟩—N=N—⟨benzene, COOH⟩—OH
HOOC

SD-1

Then, a glass substrate coated with polyimide SE-130 (manufactured by Nissan Chemical Corporation) was subjected to a rubbing treatment. The rubbing direction was set to one predetermined direction.

Next, 30 μL of the sample solution 17c was spin-coated at a rotation speed of 2000 rpm for 10 seconds, followed by aging at 120° C. for 1 minute. Subsequently, a slit mask having 100 m wide slits at 100 μm intervals was placed on the coating layer of the sample solution 17c such that the angle formed by the longitudinal direction of the slits and the rubbing direction was 45°, followed by irradiation with UV (ultraviolet rays) at an irradiation amount of 500 mJ/cm$^2$ and at 30° C. At that time, UV irradiation was carried out from an angle of 450 in the longitudinal direction of the slit and an angle of 90° in the rubbing direction (see FIG. 16).

The substrate 17 was produced as described above.
(Measurement of Arrangement of Molecular Axes)
Only the cholesteric liquid crystal layer 17 was peeled from the laminate 17, and the molecular axis pattern on the surface thereof was observed by observation with a reflection polarizing microscope. In a case of being observed from both main planes of the cholesteric liquid crystal layer 17, periodic bright-dark lines derived from the arrangement of molecular axes were observed. Further, it was observed that the arrangement direction of the bright-dark lines was different between the masked portion and the non-masked portion at the time of UV exposure in a case of producing the substrate 17. That is, the cholesteric liquid crystal layer 17 has a configuration in which two regions having different arrangement axis directions are formed in a stripe shape, as shown in FIG. 16.

It was confirmed that the molecular axis continuously rotates along one in-plane direction since the bright-dark lines continuously move by rotating a polarizer in the observation with a reflection polarizing microscope.

(Cross-Sectional SEM Observation)
The cross-sectional SEM observation (cross-sectional SEM micrograph) was carried out by cutting the cholesteric liquid crystal layer 17 in parallel with the arrangement direction of the bright-dark lines observed in the measurement of the arrangement of the molecular axes. In the cross-sectional SEM observation, it was confirmed that the bright-dark lines derived from the cholesteric liquid crystalline phase were tilted by 12° with respect to both main planes of the cholesteric liquid crystal layer 16 (the interface side surface with the liquid crystal layer 16 and the air interface side surface).

TABLE 3

| | | Substrate | | | | | | | | | | | |
|---|---|---|---|---|---|---|---|---|---|---|---|---|---|
| | | | Liquid crystal layer | | | | | | | | | | |
| | | | Disk-like liquid crystal compound | | Surfactant | | | | Cholesteric liquid crystal layer | | | | |
| | | | | | | | | | Chiral agent | | Chiral agent | | Surfactant |
| | Laminate | Substrate | Type | Addition amount (parts by mass) | Type | Addition amount (parts by mass) | Rubbing treatment | Non-liquid crystal layer | Type | Addition amount (parts by mass) | Type | Addition amount (parts by mass) | Type | Addition amount (parts by mass) |
| Example 16 | Laminate 16 | SE-130 rubbed | D-1 | 100.0 | — | — | Not rubbed | — | CD-1 | 5.50 | CD-2A | 5.50 | S-1 | 0.1 |
| Example 17 | Laminate 17 | Substrate 17 | D-1 | 100.0 | — | — | Not rubbed | — | CD-1 | 5.50 | CD-2A | 5.50 | S-1 | 0.1 |

TABLE 4

Various properties — Non-masked portion

| | Substrate | | | | | | | | |
|---|---|---|---|---|---|---|---|---|---|
| | Average tilt angle [°] of disk-like liquid crystal compound present on surface in contact with cholesteric liquid crystal layer | Azimuthal angle regulating force [J/m²] | Weighted average helical twisting power [μm⁻¹] in composition layer | Average tilt angle [°] of liquid crystal compound | Tilt of arrangement direction of bright portion and dark portion in cross-sectional SEM observation | Arrangement of molecular axis | Difference [°] between average tilt angles of bright-dark lines on both main planes | Coefficient of variation of period Λ at substrate-side interface | Coefficient of variation of period Λ at air interface |
| Example 16 | 40 | 0.00005 | 0.0 | 12 | Tilted in one direction | A | 0 | 0 | 0 |
| Example 17 | 40 | 0.00005 | 0.0 | 12 | Tilted in one direction | A | 0 | 0 | 0 |

Various properties — Masked portion

| | Average tilt angle [°] of disk-like liquid crystal compound present on surface in contact with cholesteric liquid crystal layer | Azimuthal angle regulating force [J/m²] | Weighted average helical twisting power [μm⁻¹] in composition layer | Average tilt angle [°] of liquid crystal compound | Tilt of arrangement direction of bright portion and dark portion in cross-sectional SEM observation | Arrangement of molecular axis | Difference [°] between average tilt angles of bright-dark lines on both main planes | Evaluation: Coefficient of variation of period Λ at substrate-side interface | Evaluation: Coefficient of variation of period Λ at air interface |
|---|---|---|---|---|---|---|---|---|---|
| Example 16 | | 0.0 | 12 | Tilted in one direction | A | 0 | 0.1 | 0.1 | A | A |
| Example 17 | | 0.0 | 12 | Tilted in one direction | A | 0 | 0.1 | 0.1 | B | B |

Example 18

(Preparation of Sample Solution)
A sample solution having the following composition was prepared.

| | |
|---|---|
| Liquid crystalline compound LC-1 represented by the structure described above | 100 parts by mass |
| Compound S-1 represented by the structure described above | 0.1 parts by mass |
| Compound CD-1 represented by the structure described above | 3.7 parts by mass |
| Initiator IRG-907 (manufactured by BASF SE) | 2.0 parts by mass |
| Solvent (methyl ethyl ketone (MEK)/cyclohexanone = 90/10 (mass ratio)) an amount that makes a solute concentration 30% by mass | |

(Production of Cholesteric Liquid Crystal Layer 18)

40 L of the sample solution was spin-coated on the laminate 1 under the conditions of a rotation speed of 1500 rpm for 10 seconds to form a composition layer, and then the composition layer was aged at 90° C. for 1 minute. This was followed by UV (ultraviolet ray) irradiation at an irradiation amount of 500 mJ/cm$^2$ in a nitrogen atmosphere at 30° C. to carry out a polymerization reaction of the liquid crystal compound, thereby obtaining a cholesteric liquid crystal layer 18 in which a cholesteric alignment state was fixed.

The laminate 18 produced by the above step includes the liquid crystal layer 1, the cholesteric liquid crystal layer 1 arranged on the liquid crystal layer 1, and the cholesteric liquid crystal layer 18 arranged on the cholesteric liquid crystal layer 1.

Example 19

(Preparation of Sample Solution)
A sample solution having the following composition was prepared.

| | |
|---|---|
| Liquid crystalline compound LC-1 represented by the structure described above | 100 parts by mass |
| Compound S-1 represented by the structure described above | 0.1 parts by mass |
| Compound CD-2A represented by the structure described above | 3.7 parts by mass |
| Initiator IRG-907 (manufactured by BASF SE) | 2.0 parts by mass |
| Solvent (methyl ethyl ketone (MEK)/cyclohexanone = 90/10 (mass ratio)) an amount that makes a solute concentration 30% by mass | |

(Production of Cholesteric Liquid Crystal Layer 19)

40 μL of the sample solution was spin-coated on the laminate 1 under the conditions of a rotation speed of 1500 rpm for 10 seconds to form a composition layer, and then the composition layer was aged at 90° C. for 1 minute. This was followed by UV (ultraviolet ray) irradiation at an irradiation amount of 500 mJ/cm$^2$ in a nitrogen atmosphere at 30° C. to carry out a polymerization reaction of the liquid crystal compound, thereby obtaining a cholesteric liquid crystal layer 19 in which a cholesteric alignment state was fixed.

The laminate 19 produced by the above step includes the liquid crystal layer 1, the cholesteric liquid crystal layer 1 arranged on the liquid crystal layer 1, and the cholesteric liquid crystal layer 19 arranged on the cholesteric liquid crystal layer 1.

Evaluation and the following cross-sectional SEM observation were carried out on the cholesteric liquid crystal layers 18 and 19 in the obtained laminates 18 and 19.

(Cross-Sectional SEM Observation)

As a result of cross-sectional SEM observation (cross-sectional SEM micrograph) of the cholesteric liquid crystal layers 18 and 19, it was confirmed that the bright-dark lines derived from the cholesteric liquid crystalline phase were tilted by 18° with respect to both main planes of the cholesteric liquid crystal layer (the interface side surface with the lower cholesteric liquid crystal layer and the air interface side surface).

Further, it was confirmed that the cholesteric liquid crystal layer 18 was tilted in the same direction and the cholesteric liquid crystal layer 19 was tilted in the opposite direction as compared with the lower cholesteric liquid crystal layer.

TABLE 5

| | Cholesteric liquid crystal layer | Lami-nate | Substrate | Chiral agent Type | Chiral agent Addition amount (parts by mass) | Surfactant Type | Surfactant Addition amount (parts by mass) | Average tilt angle [°] of liquid crystal compound | Tilt of arrangement direction of bright portion and dark portion in cross-sectional SEM observation |
|---|---|---|---|---|---|---|---|---|---|
| Example 18 | Cholesteric liquid crystal layer 18 | Lami-nate 18 | Cholesteric liquid crystal layer 1 | CD-1 | 3.70 | S-1 | 0.1 | 18 | Tilted in one direction in the opposite direction to cholesteric liquid crystal layer 1 |
| Example 19 | Cholesteric liquid crystal layer 19 | Lami-nate 19 | Cholesteric liquid crystal layer 1 | CD-2A | 3.70 | S-1 | 0.1 | 18 | Tilted in one direction in the opposite direction to cholesteric liquid crystal layer 1 |

| | Various properties | | | | Evaluation (for cholesteric liquid crystal layer 18 and 19) | |
|---|---|---|---|---|---|---|
| | Arrangement of molecular axis | Difference [°] between average tilt angles of bright-dark lines on both main planes | Coefficient of variation of period Λ at substrate-side interface | Coefficient of variation of period Λ at air interface | Reflection anisotropy Haze | Circular polarization degree of reflected light |
| Example 18 | A | 0 | 0 | 0 | A | A |
| Example 19 | A | 0 | 0 | 0 | A | A |

Example 20

(Production of Optically Anisotropic Body 20)

Figure 20:
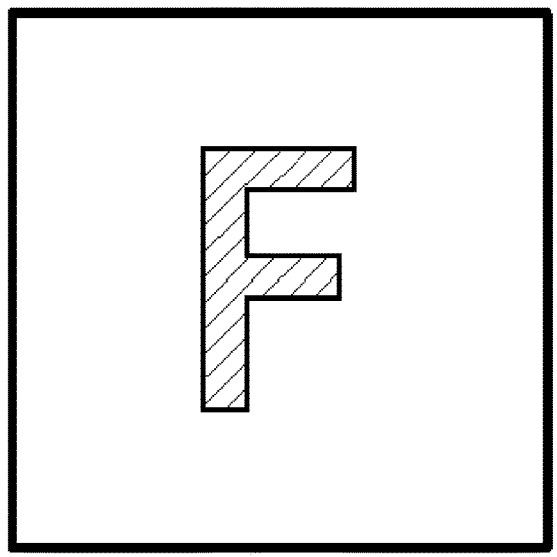
FIG. 20 is a schematic diagram for describing a configuration of Example 20.
Figure 21:
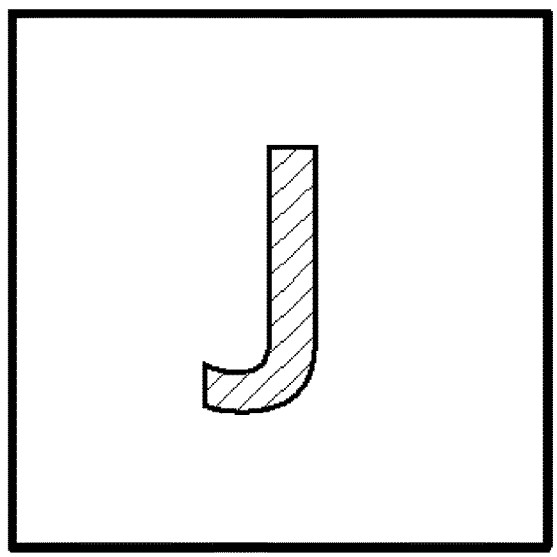
FIG. 21 is a schematic diagram for describing the configuration of Example 20.
Figure 22:
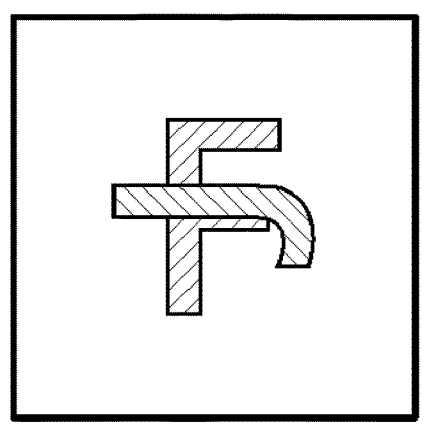
FIG. 22 is a schematic diagram for describing the configuration of Example 20.

The cholesteric liquid crystal layer 1 was cut into a pattern shown in FIG. 20 and FIG. 21 and then attached as shown in FIG. 22 to produce an optically anisotropic body 20 having regions that reflect light of different wavelengths and regions that reflect light in different directions.

The optically anisotropic body 20 has a reflection angle, a reflection wavelength, and an angle dependency of the reflection wavelength, and therefore the image of FIG. 20 or FIG. 21 can be detected as reflected light or transmitted light only from a specific direction. In addition, it was confirmed that the image was changed by holding the left and right circular polarization filters over and observing, which was thus suitable as an anti-counterfeit medium.

In addition, as a result of laminating black paper as an absorption layer on the obtained optically anisotropic body 20, it was confirmed that the visibility of reflected light was improved.

Example 21

Laminates 21-1 to 21-3 were produced in the same manner as in Example 1, except that the addition amounts of the chiral agents CD-1 and CD-2 were changed. The results are shown in Table 6 and Table 7.

It was confirmed by the measurement of the transmittance that the laminates 21-1 to 21-3 have central reflection wavelengths at 450 nm, 550 nm, and 650 nm, respectively. It was confirmed that a laminate 21 reflecting visible light of 450 to 650 nm at the same angle is obtained by attaching each of the laminates 21-1 to 21-3 with an OCA film.

TABLE 6

| | | Substrate | | | | | Cholesteric liquid crystal layer | | | | | |
|---|---|---|---|---|---|---|---|---|---|---|---|---|
| | | Liquid crystal layer | | | | | | | | | | |
| | | Disk-like liquid crystal compound | | Surfactant | | | | Chiral agent | | Chiral agent | | Surfactant | |
| | Laminate | Type | Addition amount (parts by mass) | Type | Addition amount (parts by mass) | Rubbing treatment | Non-liquid crystal layer | Type | Addition amount (parts by mass) | Type | Addition amount (parts by mass) | Type | Addition amount (parts by mass) |
| Example 21 | Laminate 21-1 | D-1 | 100.0 | — | — | Not rubbed | — | CD-1 | 5.50 | CD-2 | 5.50 | S-1 | 0.1 |
| | Laminate 21-2 | D-1 | 100.0 | — | — | Not rubbed | — | CD-1 | 4.50 | CD-2 | 4.50 | S-1 | 0.1 |
| | Laminate 21-3 | D-1 | 100.0 | — | — | Not rubbed | — | CD-1 | 3.80 | CD-2 | 3.80 | S-1 | 0.1 |

TABLE 7

Various properties

| | Laminate | Substrate Average tilt angle [°] of disk-like liquid crystal compound present on surface in contact with cholesteric liquid crystal layer | Cholesteric liquid crystal layer Azimuthal angle regulating force [J/m²] | Weighted average helical twisting power [μm⁻¹] in composition layer | Average tilt angle [°] of liquid crystal compound | Tilt of arrangement direction of bright portion and dark portion in cross-sectional SEM obsevation | Arrangement of molecular axis | Difference [°] between average tilt angles of bright-dark lines on both main planes | Coefficient of variation of period Λ at substrate-side interface | Coefficient of variation of period Λ at air interface | Evaluation Reflection anisotropy Haze | Circular polarization degree of reflected light |
|---|---|---|---|---|---|---|---|---|---|---|---|---|
| Example 21 | Laminate 21-1 | 40 | 0.00005 | 0.0 | 20 | Tilted in one direction | A | 0 | 0 | 0 | A | A |
| | Laminate 21-2 | 40 | 0.00005 | 0.0 | 20 | Tilted in one direction | A | 0 | 0 | 0 | A | A |
| | Laminate 21-3 | 40 | 0.00005 | 0.0 | 20 | Tilted in one direction | A | 0 | 0 | 0 | A | A |

EXPLANATION OF REFERENCES

10, 20, 30, 40, 60: cholesteric liquid crystal layer
11, 12, 13, 21, 22, 23, 31, 32, 41, 42, 43: main plane
14, 24, 34, 44: liquid crystal compound
$L_1, L_2, L_3, L_4, L_5$: molecular axis
$D_1, D_2, D_3, D_4$: arrangement axis
$\theta_2, \theta_5, \theta_{10}, \theta_{20}, \theta_{a1}, \theta_{a2}, \theta_{a3}, \theta_{b1}, \theta_{b2}, \theta_{b3}$: angle
$C_1, C_2, C_3$: helical axis derived from cholesteric liquid crystalline phase
$T_1, T_2, T_3$: reflection surface
15, 25: bright portion
16, 26: dark portion
18: disk-like liquid crystal compound
$P_1, P_2$: arrangement direction in which bright portions and dark portions are alternately arranged
50: laminate
100: composition layer
102: liquid crystal layer
102a: tilt alignment surface
A, $A_3, A_4$, B: region
$T_{11}$: temperature at which alignment treatment of liquid crystal compound is carried out in step 2-1 (step 2Y-1)
$T_{12}$: temperature at which cooling treatment of step 2-2 (step 2Y-2) is carried out
$R_1$: thickness direction
$I_1, I_2, I_3, I_4$: reflected light

What is claimed is:

1. A cholesteric liquid crystal layer formed using a liquid crystal compound,
wherein, in at least one main plane out of a pair of main planes of the cholesteric liquid crystal layer, a direction of a molecular axis of the liquid crystal compound as viewed from a direction perpendicular to the main surface changes while continually rotating along at least one in-plane direction and while rotating only in one direction,
the molecular axis of the liquid crystal compound is tilted with respect to the main plane of the cholesteric liquid crystal layer, and
an arrangement direction of bright portions and dark portions derived from the cholesteric liquid crystalline phase, as observed under a scanning electron microscope in a cross section perpendicular to the main plane, is tilted with respect to the main plane of the cholesteric liquid crystal layer.

2. The cholesteric liquid crystal layer according to claim 1,
wherein an average tilt angle formed by a line formed by the dark portion derived from the cholesteric liquid crystalline phase, as observed under a scanning electron microscope in a cross section perpendicular to the main plane, and one main plane of the cholesteric liquid crystal layer, and an average tilt angle formed by a line formed by the dark portion and the other main plane of the cholesteric liquid crystal layer are the same.

3. The cholesteric liquid crystal layer according to claim 1,
wherein, in the main plane in which the direction of the molecular axis of the liquid crystal compound changes while continually rotating along at least one in-plane direction, a coefficient of variation of Λ is 0.6 or less in a case where a length by which the direction of the molecular axis of the liquid crystal compound rotates by 180° is defined as one period Λ.

4. The cholesteric liquid crystal layer according to claim 1,
wherein there are a plurality of regions having different intervals between the lines formed by the bright portions derived from the cholesteric liquid crystalline phase, as observed under a scanning electron microscope in a cross section perpendicular to the main plane.

5. The cholesteric liquid crystal layer according to claim 1,
wherein the cholesteric liquid crystal layer has, in at least one main plane thereof, two or more regions among which one direction along which the direction of the molecular axis of the liquid crystal compound changes while continuously rotating in the plane is different, and reflects light in different directions in the two or more regions.

6. The cholesteric liquid crystal layer according to claim 1,
wherein the cholesteric liquid crystal layer has two or more regions having different pitches of helical axes derived from the cholesteric liquid crystalline phase, and
reflects light having different wavelengths in the two or more regions.

7. A laminate comprising two or more cholesteric liquid crystal layers according to claim 1, which are laminated,
wherein at least two cholesteric liquid crystal layers among the two or more cholesteric liquid crystal layers have the same rotation direction of helical axes derived from the cholesteric liquid crystalline phase, and
bright portions and dark portions derived from the cholesteric liquid crystalline phase, as observed under a scanning electron microscope in a cross section perpendicular to the main plane, have the same tilt direction.

8. A laminate comprising two or more cholesteric liquid crystal layers according to claim 1, which are laminated,
wherein any two cholesteric liquid crystal layers among the two or more cholesteric liquid crystal layers have opposite rotation directions of helical axes derived from the cholesteric liquid crystalline phase, and
bright portions and dark portions derived from the cholesteric liquid crystalline phase, as observed under a scanning electron microscope in a cross section perpendicular to the main plane, have opposite tilt directions.

9. A laminate comprising two or more cholesteric liquid crystal layers according to claim 1, which are laminated,
wherein a liquid crystal layer, a rubbing alignment layer, or a photo alignment layer is provided between any cholesteric liquid crystal layers of two or more of the cholesteric liquid crystal layers.

10. A laminate comprising:
a liquid crystal layer formed of a disk-like liquid crystal compound; and
the cholesteric liquid crystal layer according to claim 1 arranged to be in contact with the liquid crystal layer,
wherein a molecular axis of the disk-like liquid crystal compound is tilted with respect to a surface of the liquid crystal layer, on the surface of the liquid crystal layer on a side in contact with the cholesteric liquid crystal layer.

11. A method for producing the cholesteric liquid crystal layer formed using a liquid crystal compound,
wherein, in at least one main plane out of a pair of main planes of the cholesteric liquid crystal layer, a direction of a molecular axis of the liquid crystal compound changes while continually rotating along at least one in-plane direction,
the molecular axis of the liquid crystal compound is tilted with respect to the main plane of the cholesteric liquid crystal layer, and
an arrangement direction of bright portions and dark portions derived from the cholesteric liquid crystalline phase, as observed under a scanning electron microscope in a cross section perpendicular to the main plane, is tilted with respect to the main plane of the cholesteric liquid crystal layer,
a step 1 of forming a liquid crystal layer in which a molecular axis of a disk-like liquid crystal compound is tilted with respect to a surface on at least one surface, using a composition including the disk-like liquid crystal compound; and
a step 2 of forming the cholesteric liquid crystal layer on the liquid crystal layer, using a liquid crystal composition including a liquid crystal compound.

12. The method for producing a cholesteric liquid crystal layer according to claim 11, further comprising, in the step 2:
a step 2-1 of forming a composition layer satisfying the following condition 1 or the following condition 2 on the liquid crystal layer; and
a step 2-2 of subjecting the liquid crystal compound in the composition layer to a cholesteric alignment treatment to form a cholesteric liquid crystal layer:
condition 1: at least a part of the liquid crystal compound in the composition layer is tilt-aligned with respect to a surface of the composition layer; and
condition 2: the liquid crystal compound is aligned such that a tilt angle of the liquid crystal compound in the composition layer continuously changes along a thickness direction.

13. The method for producing a cholesteric liquid crystal layer according to claim 12,
wherein the liquid crystal composition includes two or more chiral agents,
at least one of the chiral agents is any chiral agent selected from the group consisting of a chiral agent X having a helical twisting power changed depending on irradiation with light and a chiral agent Y having a helical twisting power changed depending on a change of temperature,
in a case where the liquid crystal composition includes the chiral agent X, a treatment for cholesterically aligning the liquid crystal compound in the step 2-2 is a light irradiation treatment, and
in a case where the liquid crystal composition includes the chiral agent Y, a treatment for cholesterically aligning the liquid crystal compound in the step 2-2 is a cooling treatment or a heating treatment.

14. The method for producing a cholesteric liquid crystal layer according to claim 12,
wherein the liquid crystal composition includes one chiral agent,
the chiral agent is a chiral agent X having a helical twisting power changed depending on irradiation with light or a chiral agent Y having a helical twisting power changed depending on a change of temperature,
in a case where the liquid crystal composition includes the chiral agent X, the treatment for cholesterically aligning the liquid crystal compound in the step 2-2 is the light irradiation treatment, and
in a case where the liquid crystal composition includes the chiral agent Y, the treatment for cholesterically aligning the liquid crystal compound in the step 2-2 is the cooling treatment or the heating treatment.

15. The method for producing a cholesteric liquid crystal layer according to claim 11, wherein the liquid crystal composition further includes a surfactant.

16. The method for producing a cholesteric liquid crystal layer according to claim 12, further comprising:

a step 3 of carrying out a curing treatment for fixing a cholesteric alignment state at the time of the step 2-2 to form a cholesteric liquid crystal layer in which the cholesteric alignment state is fixed, or a curing treatment for fixing a cholesteric alignment state after the step 2-2 to form a cholesteric liquid crystal layer in which the cholesteric alignment state is fixed, wherein the liquid crystal composition contains a polymerizable liquid crystal compound.

17. The method for producing a cholesteric liquid crystal layer according to claim 16, wherein the curing treatment is a light irradiation treatment.

18. An anti-counterfeit medium comprising:
the cholesteric liquid crystal layer according to claim 1.

19. A determination method for determining authenticity of an article using the anti-counterfeit medium according to claim 18, comprising:

detecting at least one of reflected light or transmitted light from at least one direction with respect to the anti-counterfeit medium to determine the authenticity of an article.

20. The determination method according to claim 19, further comprising:

detecting an in-plane pattern of at least one of reflected light or transmitted light to determine the authenticity of an article.

21. The determination method according to claim 19, further comprising:

observing at least one of reflected light or transmitted light from the anti-counterfeit medium through a circular polarization filter; and determining the authenticity of an article based on the change in the detection result depending on the presence or absence of a circular polarization filter or the difference in the type of the circular polarization filter.

22. The cholesteric liquid crystal layer according to claim 1, wherein in at least one main plane out of a pair of main planes of the cholesteric liquid crystal layer, a direction of a molecular axis of the liquid crystal compound as viewed from a direction perpendicular to the main surface changes while continually rotating along at least one in-plane direction and while rotating only in one direction in an entire region in a surface direction of the cholesteric liquid crystal layer.

* * * * *